(12) United States Patent
Smith et al.

(10) Patent No.: US 10,841,307 B2
(45) Date of Patent: Nov. 17, 2020

(54) USER ID CODES FOR ONLINE VERIFICATION

(71) Applicant: Civic Technologies, Inc., San Francisco, CA (US)

(72) Inventors: Jonathan Smith, Oakland, CA (US); Vinodan Lingham, Los Altos, CA (US); Zachary Bush, Palo Alto, CA (US); Juan Pablo Bedoya, Berkeley, CA (US)

(73) Assignee: CIVIC TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 16/534,548

(22) Filed: Aug. 7, 2019

(65) Prior Publication Data

US 2020/0021589 A1 Jan. 16, 2020

Related U.S. Application Data

(63) Continuation of application No. 16/117,965, filed on Aug. 30, 2018.
(Continued)

(51) Int. Cl.
*H04L 29/06* (2006.01)
*H04L 9/32* (2006.01)

(52) U.S. Cl.
CPC ........ *H04L 63/0884* (2013.01); *H04L 9/3265* (2013.01); *H04L 9/3268* (2013.01)

(58) Field of Classification Search
CPC ... H04L 9/3213; H04L 9/3265; H04L 9/3268; H04L 2209/38; H04L 63/04–0421; H04W 12/02
See application file for complete search history.

(56) References Cited

U.S. PATENT DOCUMENTS

| | | | |
|---|---|---|---|
| 9,448,980 B1 * | 9/2016 | Ellingson | G06F 16/9535 |
| 2009/0228702 A1 * | 9/2009 | Rosenberg | H04L 63/126 |
| | | | 713/155 |

(Continued)

OTHER PUBLICATIONS

International Search Report and Written Opinion of the International Searching Authority on PCT/US2019/031892 dated Sep. 24, 2019.

*Primary Examiner* — Daniel B Potratz
(74) *Attorney, Agent, or Firm* — Foley & Lardner LLP

(57) ABSTRACT

Methods and systems for establishing a chain of relationships are disclosed. An identity verification platform receives a first request for registration comprising an identification of a first user, identification of an entity, and a relationship between the first user and the entity; verifies the identity of the first user and the relationship between the first user and the entity; and verifies that the entity is legitimate. Once a relationship between a first individual, invited by the first user, and the entity is confirmed, the platform creates a custom badge representing the relationship between the first individual and the entity for display on the entity's website. The platform receives an identification of a selection by an end user of the custom badge and, responsive to receiving the identification of the selection, renders, on a domain controlled by the identity verification platform, a verification that the relationship between the first individual and the entity is valid.

20 Claims, 40 Drawing Sheets

Related U.S. Application Data

(60) Provisional application No. 62/670,664, filed on May 11, 2018.

(56) References Cited

U.S. PATENT DOCUMENTS

| | | | |
|---|---|---|---|
| 2014/0012908 A1* | 1/2014 | Manry | G06Q 10/10 709/204 |
| 2016/0162897 A1 | 6/2016 | Feeney | |
| 2017/0222814 A1 | 8/2017 | Oberhauser et al. | |
| 2017/0316390 A1* | 11/2017 | Smith | G06Q 20/3278 |
| 2017/0316409 A1 | 11/2017 | Smith et al. | |

* cited by examiner

| Level | P |
|---|---|
| 10,000 | 99.99% |
| 1,000 | 99.90% |
| 100 | 99.00% |
| 13.52 | 92.60% |
| 2.5 | 60.00% |

```
Receiving a request for registration of an entity from a user
1210
                            ↓
Verifying the identity of the user and the relationship
between the user and the entity
1220
                            ↓
Verifying that the entity is legitimate
1230
                            ↓
Receiving from the user an invitation for a relationship
between the entity and an individual
1240
                            ↓
Transmitting, to the individual, a request for approval of the
relationship between the entity and the individual
1250
                            ↓
Receiving approval of the relationship from the individual
1260
                            ↓
Transmitting confirmation of the relationship to the user
1270
                            ↓
Creating a custom badge representing the relationship
between the individual and the entity
1280
```

```
Send an invitation for a relationship between an entity and
an individual
1310
         │
         ▼
Receive approval notification of the relationship between
the entity and the individual
1320
         │
         ▼
Export code for individual's badge
1330
         │
         ▼
Import code for individual's badge on entity website
1340
         │
         ▼
Render individual's badge representing the relationship
between the individual and the entity
1350
```

FIG. 13

Welcome to ID Codes
Complete your profile information

LEGAL NAME
JOHN DOE

EMAIL ADDRESS
john.doe@email.com

PHONE NUMBER
+1 555 555 5555

PLEASE PROVIDE THESE OPTIONAL DETAILS

DIPLAY NAME
JOHN DOE

JOB TITLE

LINKEDIN PROFILE
linkedin.com/in/john.doe

TWITTER PROFILE
twitter.com/johndoe

FIG. 18

USER ID CODES FOR ONLINE VERIFICATION

CROSS-REFERENCE TO RELATED APPLICATIONS

This application is a continuation of, and claims priority to and the benefit of U.S. patent application Ser. No. 16/117,965, titled "USER ID CODES FOR ONLINE VERIFICATION," and filed Aug. 30, 2018, which claims priority to and the benefit of U.S. Provisional Application No. 62/670,664, titled "USER ID CODES FOR ONLINE VERIFICATION," and filed on May 11, 2018, the contents all of which are hereby incorporated herein by reference in its entirety for all purposes.

FIELD OF THE DISCLOSURE

The present disclosure generally relates to systems and methods for managing the identity of users and identifying users to third parties using user ID codes in an online verification platform.

BACKGROUND

Banks and financial institutions have long been required to verify the identity of a customer and to verify the authenticity of information provided by that customer when the customer seeks access to a new product or service, for example when opening a new account or applying for a loan. This trend has quickly spilled over into other sectors, particularly considering the rise in e-commerce and our increasingly digital lives. The result of this trend is that digitized personal information is constantly increasing, as are security breaches and data theft.

The ability to store and share information digitally offers many benefits, and the digitization of data has increasingly grown. However, alongside the advantages of cost and convenience, a new set of concerns has developed. The ability to copy and share data has raised questions about the security and privacy of personal data. There have been many high-profile hacks, leaks, and theft of personal information, as well as cases where unencrypted data has simply been lost or left vulnerable to theft. In 2016 alone, 15.4 million adults in the U.S. were victims of identity fraud, an increase of 16% over 2015, and victims suffered losses amounting to $16 billion. Personal identifiable information (PII) was the most common form of data stolen, accounting for almost 43% of data breaches, and the services industry was most affected by data breaches, accounting for almost double the occurrence of the finance, insurance, and real estate sectors combined.

Inefficiencies in the identify verification industry have both financial and social costs. Without proof of identity, an individual may be unable to exercise a range of legal rights, including the ability to vote, access health care, and receive social welfare. Lack of identity documentation and the high costs of obtaining it means that many individuals globally are wholly or partially denied access to banking facilities. In low-income countries, new births often go unregistered because parents struggle to acquire the necessary documentation to have verified and recorded reliably by the relevant authorities. Individuals or companies may misrepresent their identity or their relationship to one another, which can cause investors, consumers, and the general public to be misled into believe a false assertion, which may cause them personal, reputational, and financial harm.

Identify verification processes are often intrusive or time-consuming to individuals, and they come at a significant cost to those required to carry them out as a matter of law and to avoid commercial and reputational losses due to fraud. It may cost a financial institution such as a bank $15 or more to on-board a single customer and verify their identity and personal information. This process gets repeated every time the same consumer tries to access another product or service, despite the process being similar, if not identical, for most organizations. The time it takes to initially validate information has a detrimental impact on customer relations and invariably also impacts customer acquisition and conversion rates for the sales of products where verification of consumer identity or information is required. Consumers are forced to fill in lengthy application forms and provide extensive personal information, and institutions are being forced to collect sensitive data that they arguably don't need to transact with a customer.

The same overhead and inefficiencies are present in other sectors where highly sensitive data may need to be verified, including in background checks for employment. The sharing economy, which relies heavily on trust and on the verification of identity and personal information, grew an average of 32.4% per annum from 2014 to 2016 and now includes 27 million adults in the U.S., demonstrating the growth and scale driving demand for identify verification services beyond the financial sector.

In the online world today, there are many situations where companies or individuals claim a relationship to another person or entity on websites and a third-party user has no way to know the authenticity of that relationship. This may take the form of "Mr. Jones is an advisor to our business", "Ms. Smith has endorsed our product", etc. There is significant value to the company to be able to demonstrate the claimed relationship is genuine. There is significant value to the individual with whom the relationship is claimed as it protects their own reputation from misuse. There is significant value to a third party visiting the web site as they may make decisions based upon the claimed relationship, endorsement or recommendation presented to them.

In an effort to combat identity theft, systems and methods for identifying users to third parties have been developed. In a common two factor application, a user presents a bank card or credit card in addition to the personal identification number ("PIN") corresponding to the card. In other systems, a user provides a password to identify himself/herself and may be given a Short Message Service (SMS) test message or a phone call with a unique code that the user must recite for access. In still other systems, a user may be given challenge questions to verify his/her identity. Each of these systems, however, is subject to attack and ultimate defeat from a basic security breach.

An identity verification system manages trusted digital identities and enables the use of those trusted digital identities to facilitate interactions between people in society. Digital identities include a collection of attributes and their values which can be used to identify the entities of a system and allow those entities to make identity claims. Identity management includes many aspects including creation of an identity, validation of an identity, storage of the identity, maintenance and updates to the identity, and protection of the identity from theft and unauthorized use. Use of identities allow a person or a computer to recognize other entities involved in an interaction and based on that to determine a role, scope of access, scope of authorization, and scope of actions that an entity can perform.

There have been various other ways to perform certifications on online systems. Security certifications have been used to issue badges, only rendering these badges on specific domains. These badges cannot be used for individuals. LinkedIn profile integrations are possible to verify an individual in an online system however these are not secure and are easy to fake.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 7 illustrates sample levels of different validators, according to some implementations;

FIG. 12 depicts a method in an identity verification platform used to generate user ID codes for online verification, according to some implementations;

FIG. 13 depicts a method for creating and exporting a verified individual's badge on an entity's website, according to some implementations;

FIG. 18 illustrates an interface for a user to enter profile information using an identity verification platform, according to some implementations;

DETAILED DESCRIPTION

Figure 1:
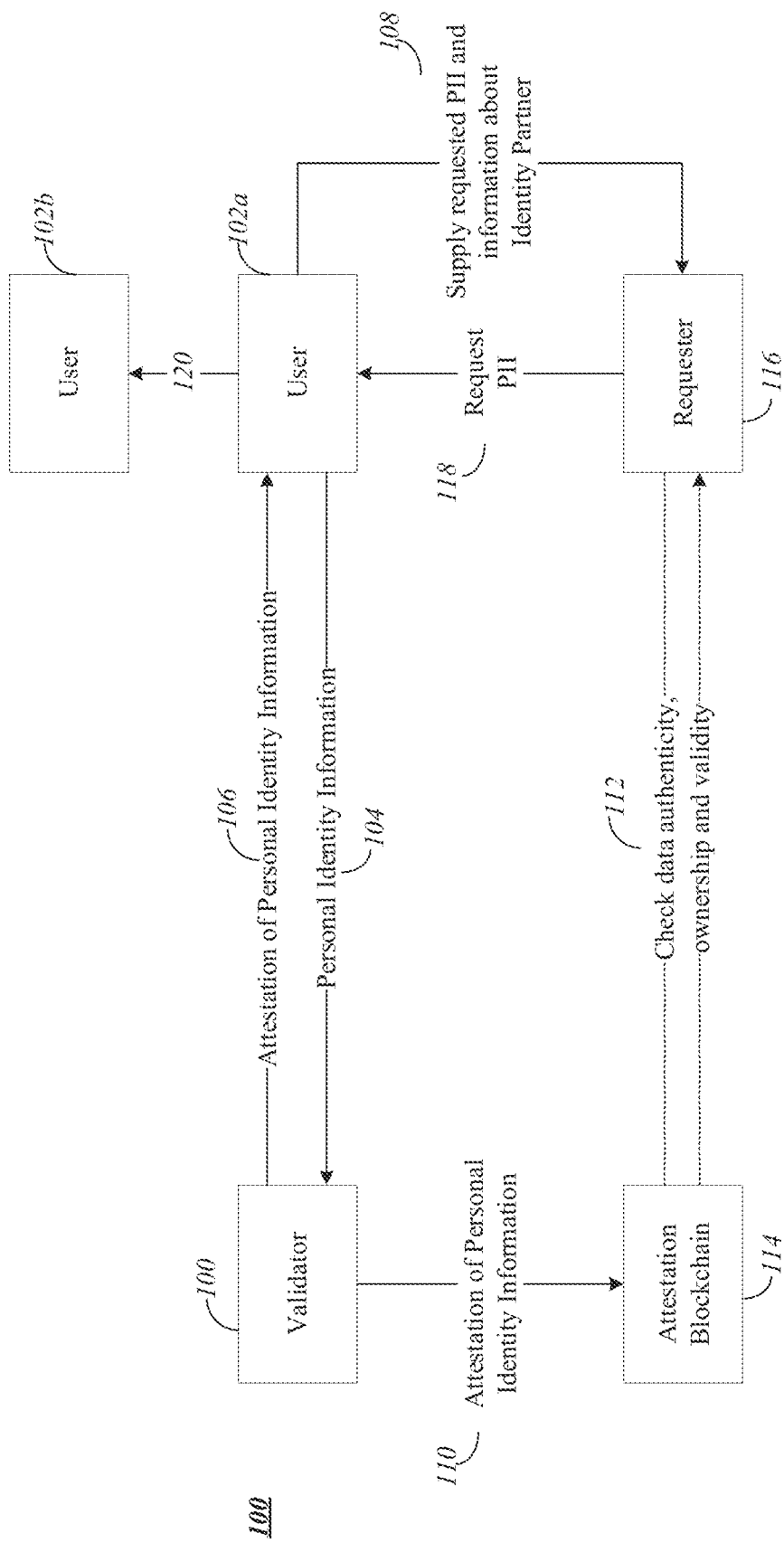
FIG. 1 shows a digital identity verification system from the viewpoints of a validator and requester that individuals can use to have a fingerprint of their digital identity authenticated and stored on a blockchain and on their device, according to some implementations.

For purposes of reading the description of the various embodiments below, the following descriptions of the sections of the specifications and their respective contents may be helpful:

Section A describes a network environment and computing environment which may be useful for enabling an identity management marketplace.

Section B describes a network environment and computing environment which may be useful for practicing embodiments described herein.

Section C describes embodiments of systems and methods useful increasing for generating ID codes for online verification.

Prior to discussing specific implementations, it may be helpful to briefly discuss some concepts and systems utilized by the disclosed systems and methods.

Blockchain

Most identity management systems are in large, centralized databases or server repositories that are centrally managed. Such a centralized database or server represents a single point of trust, and a single point of failure. All participants in a system that relies on such a centralized database must place a high level of trust in the correct operation and accuracy of the data stored in the centralized database. Additionally, malicious actors have a centralized point to focus an attack on, and a security breach or leak would have significant scale and impact. Centralized security services typically require users' sensitive and secret data, including secret keys and passwords, to be stored in repositories. Even when hashed or encrypted for security, most people do not have strong passwords, and existing breaches can be used to discover hashed passwords and keys.

Typical identity management systems that centrally store a user's explicit identifying attributes and their sensitive security credentials cannot provide privacy and anonymity of users or of user's data or of user's transactions. There is nothing to stop an identity management system from collecting personal and transaction data and sharing this data in unauthorized ways and without user consent, for example to consumer intelligence and consumer behavior analytics companies.

A blockchain, which is a peer-to-peer network also known as a distributed ledger, offers a compelling solution to the problem of combining accessibility with privacy and security. Records can be held securely and yet openly authenticated, referenced and documented so that data can be trusted as reliable. A blockchain represents an archive of data and transactions that are performed in a data processing system.

A blockchain enables peer-to-peer online transaction of information with overall consensus without the need for a trusted intermediary. This was achieved by contriving a system in which it is difficult (from the standpoint of computational resources) to add transactions to the blockchain, but easy for anyone to check whether transactions are valid. The difficulty means that there is a cost involved in attempting to process transactions, and rewards for doing so legitimately in the form of new currency or transaction fees. Fraudulent transactions are quickly identified and discarded from the blockchain. Attempting to add a fraudulent transaction is costly, entails foregoing the financial incentives for acting honestly, and is highly unlikely to succeed because no single party in the overall network has more than a small proportion of the overall 'authority' to validate transactions. In practice, it is simpler and more profitable to act honestly. Because the blockchain is maintained by a large network of participants, no one actor can easily gain enough influence to submit a fraudulent transaction or successfully alter recorded data (although possible in theory with enough resources, it would be prohibitively expensive in practice, particularly for larger blockchain implementations). Any change that a party attempts to make to the blockchain is recognized and rejected by the majority. Everything that takes place on the blockchain is visible to anyone. It is possible to see everything that has ever been recorded on the blockchain.

Blockchain addresses are strings of random characters that cannot intrinsically be associated with a specific individual. While it is easy for the owner to prove they control an address if they wish, and it is often possible to build up a picture of transaction relationships due to the transparent nature of the blockchain, the address itself does not contain the owner's PII. This enables a high degree of privacy when required.

Blockchain is promising for identity management because the data stored in a distributed ledger are all public and therefore not vulnerable to theft. Data integrity is protected and therefore not vulnerable to illegal or accidental modifications, and the data is time-stamped so that its provenance can be validated. Data is sequenced in a cryptographic time chain so illegal insertions of false data is impossible. These ledgers operate without the need for a trusted third-party and without the need to trust any component of the system overall. The blockchain is policed by every member of the network and its integrity checked and agreed by the network on an ongoing basis. Because of this immutability, a transaction that has been accepted into the network cannot be reversed. With no trusted intermediary to act on behalf of the user or control the movement of their funds, blockchain transactions are immune to chargebacks and are like paying in physical cash, but online.

Bitcoin

Bitcoin is a peer-to-peer currency that was launched in January of 2009 as blockchain's first application. Bitcoin's innovation was solving the so-called 'double-spend' problem in online financial transfers: the issue that data is readily copied, and that it is therefore impossible to prevent the same funds from being sent to more than one recipient unless there is a trusted intermediary to keep accounts. This centralized model was used by all banks and payment processor who dealt with electronic funds transfers. Such a centralized approach always involves trust, because there must be an authority whose job it is to organize the transfer of money from one account to another. In the physical world, money is handed over directly from one person to another person. Online, however, there must be intermediaries. Rather than transferring funds from their account directly to the recipient, the user instructs the intermediary to move funds on the user's behalf.

This centralized system has a number of potential drawbacks. The trusted intermediary may prove untrustworthy, they have control over the user's funds, and they can ultimately block or reverse transactions. The centralized nature of online banking and other online money transfer protocols leaves users vulnerable to intervention by these trusted intermediaries and comes with security risks, because there is always a single point of failure. Centralized databases can be hacked, and their administrators compromised or coerced by a range of actors.

The bitcoin blockchain was designed for peer-to-peer online transfers of value, effectively acting as digital cash. It achieves this not by moving money from one address to another, but by maintaining and updating the ledger to reflect how much money is registered to each address. The same approach to recording data transparently, securely and immutably by consensus of the entire network can be extended to many other applications (since the financial value in the bitcoin network is simply information about who owns what). For example, messages can be stored on the blockchain, either encrypted or in plain text. Additionally, secondary tokens representing assets, such as shares in a business, securities, commodities, and other currencies, can be secured on the blockchain.

Smart Contract Platforms

It is also possible to create a system that takes a similar approach to the execution of computer code. Software has historically been run on a single computer or centralized server, just as online money transfers have historically been centralized. Smart contracts are code that is executed on the blockchain, called decentralized applications, or 'dApps'. Once uploaded to the blockchain, these are stored immutably and run when the required conditions are met.

Smart contracts are also known as self-executing contracts, blockchain contracts, or digital contracts, are stored and replicated on a distributed ledger and supervised by the network of computers that run the distributed ledger. In this format, contracts are converted to computer code that can execute a function when invoked. A smart contract between parties is written as code into the blockchain. The parties involved are anonymous, but the contract is in the public ledger. A triggering event takes place and the contract executes itself according to the coded terms. In contrast to the Bitcoin blockchain, which is designed to execute the specific function of transferring value in BTC, a smart contract platform is a general purpose blockchain. Examples of general purpose blockchains which can support smart contract platforms include ETHEREUM, provided by Ethereum Foundation of Zug, Switzerland, ROOTSTOCK (RSK) provided by Rootstock Cloud ERP of San Ramon, Calif., EOS provided by EOS of Livonia, Mich., NEO provided by NEO of Shanghai, Conn., and DFINITY provided by DFINITY of Palo Alto, Calif. Blockchains requires that transaction fees are paid in the native currency of the blockchain, for example bitcoin ('BTC') for the Bitcoin blockchain, and ether ('ETH') for the Ethereum blockchain. Fees for executing transactions on the Ethereum blockchain are related to computational complexity, bandwidth, and storage needs (in a system known as "gas"). Gas units each have a price that can be specified in a transaction. Smart contract platforms allow for the creation of separate tokens that are distinct from the native currency. As noted previously, these tokens are digital assets, cryptographically secured upon the blockchain, which can represent whatever the issuer wants and is prepared to back (if necessary), and which can play whatever role in the system that its rule-set determines. These tokens can be transferred on a peer-to-peer basis for a transaction fee, just like native currency (e.g. ETH). They can be incorporated into smart contracts as an integral part of the system.

The identify verification industry has grown in response to the changing cultural, societal, and regulatory landscape concerning personal data, and a number of service providers now offer easy API access to multiple sources of consumer data for identify verification purposes. This largely ad hoc approach has resulted in an outdated, costly, and inefficient system. Accordingly, there is a need for a transformative solution that allows individuals and organizations to easily, securely, and cost effectively obtain proof that identity verification information has been authenticated by a trusted institution without organizations sharing any PII between them, leveraging blockchain and smart contracts technology.

Game Theory

In game theory, a non-cooperative game is a game with competition between individual players and in which only self-enforcing alliances are possible due to the absence of external means to enforce cooperative behavior. Non-cooperative game theory focuses on predicting which coalitions will form, the joint actions that groups take and the resulting collective payoffs. A Nash equilibrium is a solution concept of a non-cooperative game involving two or more players in which each player is assumed to know the equilibrium strategies of the other players, and no player has anything to gain by changing only their own strategy. If each player has chosen a strategy and no player can benefit by changing strategies while the other players keep theirs unchanged, then the current set of strategy choices and the corresponding payoffs constitute a Nash equilibrium. The Nash equilibrium provides a way of predicting what will happen if two parties are making decisions at the same time, and if the outcome depends of the decisions of each other.

A. Computing and Network Environment for Identity Management Marketplace

In a general overview FIG. 1 is an illustration of an identity validation system 100, including user 102a, requester 116, validator 100, and attestation blockchain 114.

Referring to FIG. 1 in more detail, any member of the system can be an incentivizing party to introduce new users to the system. For example, in step 120, user 102a may introduce new user 102b to the system. Introduction to new users may happen on an incentivization mechanism with tokens that other participants collectively provide to accelerate the overall adoption of the system. Validator 100 may be, an individual, a group of individuals, an entity or service provider that is trusted to validate a user's PII. Examples of validators 100 include but are not limited to financial institutions such as s banks, a government entities, other companies such as utility providers, and verification providers, such as biometrics, network solutions, and device identification providers. User 102a's PII may include elements such as name, phone number, e-mail address, address (street, city, country, post code), SSN or FEIN or other government identification number, date of birth, advisory board, number of employees, and any other information that is personal or tied to a specific user.

In some embodiments, user's PII may be structured in a hierarchy. In some embodiments, the structure of user 102a PII may follow a defined model. In some embodiments, the structure of user 102a PII may follow an industry standard for a container or framework for personal data. In some embodiments, the negotiation of the interchangeable structure of user 102*a* PII and the attestation may be dynamic between participants in the system.

In an embodiment, the probability of a portion of the PII in an attestation is achieved by organizing the PII into a Merkle tree, also known as a hash tree. Hash trees allow efficient and secure verification of the contents of large data structures. In some embodiments, a cryptographic hash function such as SHA-2 (National Security Agency, United States) is used for the hashing. The main difference between a hash tree and a hash list is that one branch of the hash tree can be verified independent of the rest of the tree. This is advantageous in an identity verification application since the data structure containing the PII can be split up into smaller data blocks containing a subset of the PII, so that a user 102*a* may share only the PII that the requester 116 has asked for, without sharing PII that is not needed or was not requested. In addition, if user 102*a* wants to update only a portion of their PII, they can revoke and change only this portion of the PII, while not having to revoke and have re-attested the entirety of the PII that is stored. For example, if user 102*a* moves and has a new physical address, but their other PII has stayed the same, validator 100 may be used to authenticate the new physical address and then revoke the node of the existing attestation that contained user 102*a*'s previous physical address. A new node is then added with the attested new physical address.

In some examples, for example when implemented on the bitcoin blockchain, each node in the hash tree represents an element of the user PII (for example, name) and contains a hash of its content and a hash of the hashes of its child nodes (for example, first name and last name). The resulting 'root hash' (also known as the Merkle root) can be used as a fingerprint for the PII being attested to. In step 110, validator 100 writes the attestation on the attestation blockchain 114 in the form of a root hash which is signed by validator 100 using the validator's private key. Validator 100 records an attestation of user 102*a* PII by creating a derived address (an 'attestation address') where small amounts of cryptocurrency (e.g. "dust", or a smallest allowed non-zero value) can be spent. The root hash is converted to a valid bitcoin blockchain address using the additive property of elliptic curve cryptography ('ECC'):

$$k_{priv}+h=k_{attest}$$

Where $k_{priv}$ is the private key of the validator, h is the root hash, and '+' represents addition in the ECC sense. This blockchain address makes it unfeasible to determine the user 102*a* and validator 100 associated with the blockchain address, which is essential to protecting the privacy of the participants. If user 102*a* does not wish to reveal all of the underlying PII that was attested to, portions of the hash tree can selectively be revealed, with only hashes provided for any elements user 102*a* prefers not to reveal.

Using smart contract platform, the system would store the signed root hash at a discoverable location. Revocation status may in this case also not be represented by unspent currency, but rather modeled as a parameter of the attestation. A participant in the system may reproduce the hash by creating it from the original PII information or from partial information of the original PII if the user 102*a* provides intermediate hashes of the Merkle tree. This allows user 102*a* to share PII information with another participant in the system and prove that it is the same data that was previously attested to by validator 100. Should validator 100 or user 102*a* wish to revoke an attestation for any reason, this revocation is reflected in an associated blockchain transaction, but the details of the attestation can never otherwise be changed.

In step 106, validator 100 sends the attestation of the user 102*a*'s PII to user 102*a* to store on the user's device. The transmission of the PII from the user 102*a* to the validator 104, and the transmission of the attestation of the PII from the validator 100 to user in step 106 may be secured using end to end encryption or transport encryption as is known in the art. In some embodiments, user 102*a* stores the PII on their device. The PII may be encrypted locally on the device before it is stored, for example using biometric data or locks such that only the user may be able to access the plain text PII. The attestation of the PII from validator 100 may be stored on the user's device. Metadata or other information about validator 100 may additionally be stored on the user's device. In some embodiments, information such as name, address, identification number (SSN or FEIN for example) and contact details of validator 100 are stored on the user's device 306. In some embodiment, a trust level or reputation of the validator 100 is stored on the user's device 306. The specific attestation that validator 100 issued and metadata to it are also stored on the user's device, ad user sends this information to the requester when the requester presents PII.

These properties of a validator 100 may be validated against the attestation blockchain 114 in order for a third party to determine its authenticity. In some embodiments, the identify verification system operator or a government entity may attest the information that the user 102*a* claims about the validator 100. The attestation and its metadata which includes the public key of the validator 100 may also be stored on the user's device 306 as the user 102*a* has to provide this information to the requester 116 to be able to validate PII against the attestation blockchain 114.

User 102*a* may try to initiate an interaction with requester 116. For example, requester 116 may be a car rental agency and user 102*a* may request to rent a car. To proceed with the interaction, in step 118, requester 116 may request PII from user 102*a*. Requester may request the user's first and last name, date of birth, credit card number, credit card expiry date, credit card security number, and billing address for the user's credit card. In some examples, requester 116 may request additional information, such an accident history of user 102*a*, or insurance claim information for user 102*a*. In some embodiments, requester 116 may provide to user 102*a* a list of validators that requester 116 trusts.

In some examples, user 102*a* has the data that requester 116 requires in attested form, from a validator 100 that requester 116 trusts. In step 108, user 102*a* may supply the requested PII in readable form to requester 116, along with information about validator 100 that authenticated the data. In some examples, the information about validator 100 includes the validator's public key. In some examples, information about validator 100 includes information about the hashing algorithm used by validator 100. In some examples, user 102*a* uses end to end encryption when sending PII to the requester 116 to make sure that the PII is not visible to other parties if it were to be intercepted. In some examples, user 102*a* sends the PII in attestation form created by the validator 100 to requester 116.

In step 112, requester 116 may use the requested PII from user 102*a* and the information about validator 100 to check the data authenticity, ownership, and validity of the PII on attestation blockchain 114. In some examples, requester 116 uses the information about validator 100 to create a hash of the plain text PII sent from user 102*a* using the same technique, hashing algorithm, and public key that validator 100 used to create the attestation on attestation blockchain 114. In some examples, requester 116 creates the attest key using the hashed user PII and the validator's public key, and this attest key is an address on attestation blockchain 114. If requester 116 is able to find the transaction for user 102a at this address on blockchain 114, then requester 116 can be certain that the plain text PII sent to them by user 102a has been attested to and can be trusted, and requester 116 may proceed with the transaction that user 102a initiated.

Figure 2:
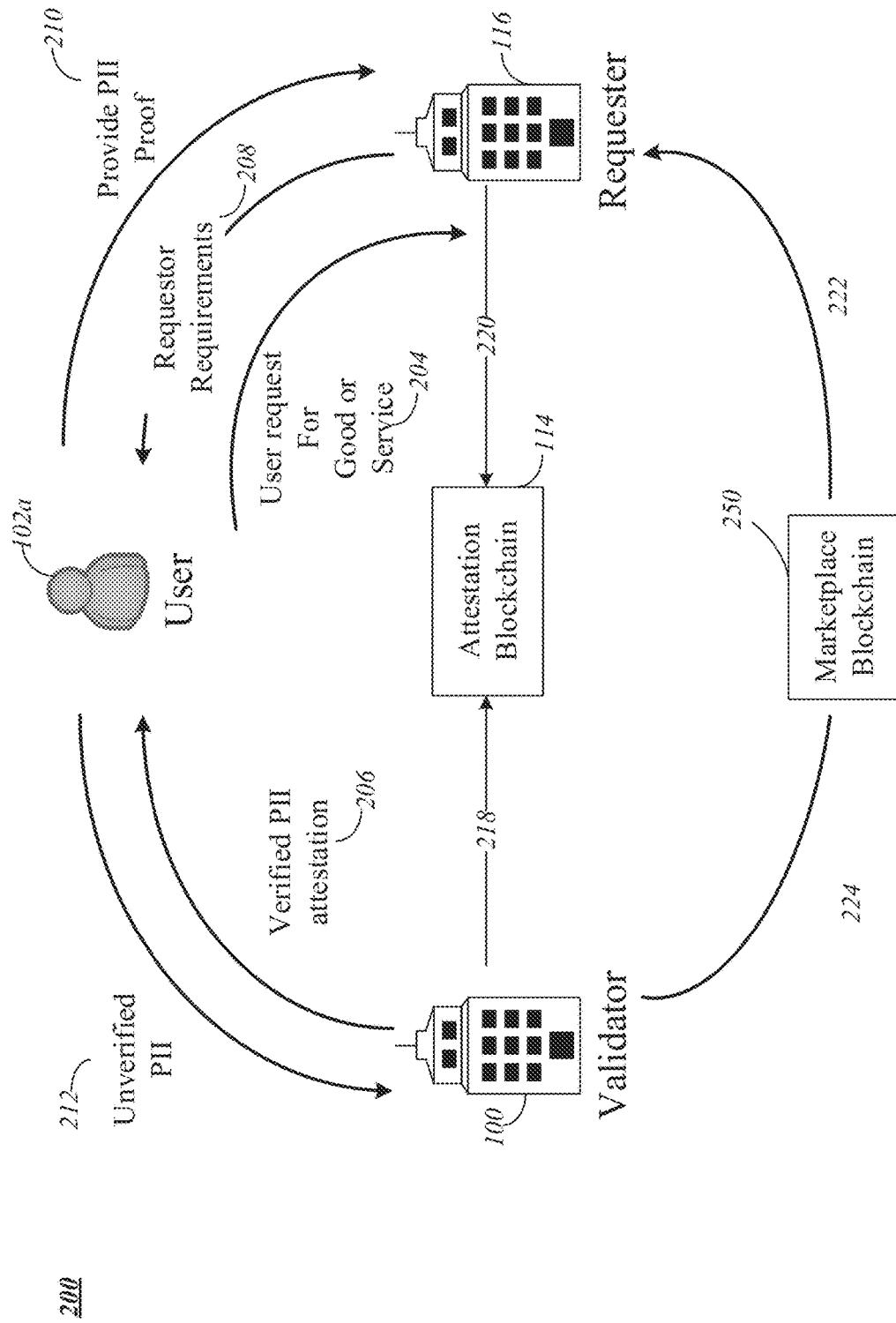
FIG. 2 shows a simplified diagram illustrating how a user, validator, requester, attestation blockchain, and marketplace blockchain interact in the token economy system for identify verification services, according to some implementations.

In a general overview, FIG. 2 is an illustration of the token economy system including user 102a, requester 116, validator 100, attestation blockchain 114, and marketplace blockchain 250.

Describing FIG. 2 in more detail, the token economy system ensures that users remain in control over their PII, as the user must give consent before any identify verification transaction between validator 100 and requester 116 can be completed. In some embodiments, in step 204, user 102a approaches requester 116 to use a service or purchase a good. Other interactions between user 102a and requester 116 such as voting, and trading of securities are also supported. In step 208, requester 116 sends user 102a a list of requirements. In some embodiments, requester 116 sends user 102a a list of validators 110 acceptable to requester 116, and the user PII that is required. If user 102a has the required PII attested to by a validator 100 that requester 116 has indicated is acceptable, the requester 116 and validator 110 mutually agree a price for the attested PII. Once the price has been agreed, requester 116 places tokens into an escrow smart contract within the marketplace blockchain 250, then in step 210, user 102a sends the PII to requester 116 in readable form and sends the attestation and associated metadata (e.g. the validator's public key and other metadata about validator 100) that is required for requester 116 to be able to verify the attestation independently from the plain text PII.

In some embodiments, user 102a does not have a suitable attestation. In one example, some of user 102a'a PII that requester 116 has required has been attested to by a trusted validator, but some of the user PII that requester 116 has required has not been attested to by a trusted validator. In some examples, all of the user PII that requester 116 has required has been attested to, but none of the user PII has been attested to by a validator that requester 116 accepts. In some examples, none of the user PII that requester 116 has required has been attested to by any validator. In these and other cases where user 102a does not have a suitable attestation of the PII that requester 116 has required, user 102a will be asked to approach a validator that is accepted by requester 116 with the required and unverified PII. In step 212, user 102a sends unverified PII to validator 100, where validator 100 is a trusted validator for requester 116. Once validator 100 is satisfied with the authenticity of the PII, it will attest to the accuracy and provenance of this information. This attestation, which in some embodiments may be referred to as a fingerprint of the PII, is recorded onto the attestation blockchain 114 in step 218. In step 206, validator 100 sends verified PII attestation and associated metadata to user 102a for storage on the user's device 306. In some embodiments, the original PII, the attestation, and metadata is stored on the user's mobile device 306 in an encrypted form. Encryption on the mobile device is an independent layer of security that protects against compromise if user's device is lost or stolen. In some embodiments, stored on the user's device are the encrypted raw PII plus the attestation of the PII and the metadata of the attestation, such that the user is able to issues this information to requester 116 if required.

Requester 116 takes user 102a PII and the information about validator 100 and recreates the hash of the user's PII. Requester 116 is not able to reproduce an attestation, but he is able to reproduce the hash of the PII and verify this against the attestation. In step 220, requester 116 inspects the attestation and the attestation blockchain 114 to see if the attestation is found on the attestation blockchain 114 at the attest address that requester 116 created from the user PII. If requester 116 finds the attestations on the attestation blockchain 114 at the attest address and it has not been revoked, then the PII from user 102a is verified, and the requester provides the user with the desired service. When this happens, the smart contract running on a marketplace blockchain 250 causes the tokens from requester 116 that are held in escrow to be released. In some embodiments the smart contract running on the marketplace blockchain 250 causes the tokens from requester 116 that are held in escrow to be released to be released to the validator 100 irrespective of whether the requester provides the user with the desired service. In some embodiments, the user 102a releases the tokens held in escrow as soon as he successfully transmitted the PII, the attestation, and the metadata to the requester. In some embodiments, some tokens are released to the validator 100, the user 102a, or the system operator. In some embodiments, all of the tokens in escrow may be released to either of validator 100 or user 102a.

Figure 3:
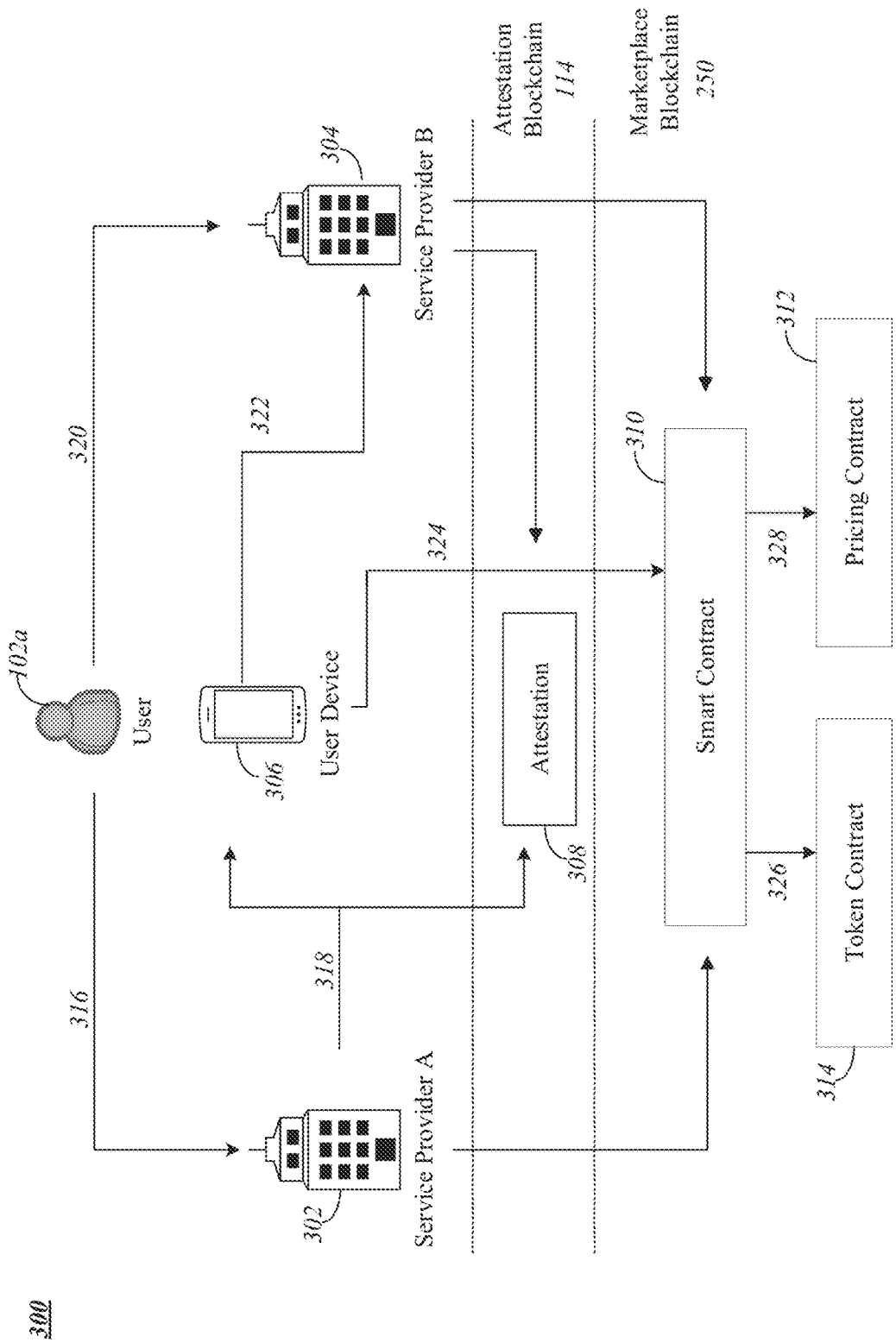
FIG. 3 shows a simplified block diagram of a system for attestations to be shared between service providers, according to some implementations.

FIG. 3 shows a simplified block diagram of a system 300 for attestations to be shared between identify verification service providers. In a general overview, in some examples, system 300 includes one or more users 102a. User 102a may have a device 306. In some examples, system 300 includes one or more service providers 302 and 304. In some examples, system 300 includes an attestation 308 which may be stored on the attestation blockchain 114. In some embodiments, system 300 may utilize a marketplace blockchain 250. One or more smart contracts 310 may be stored on the marketplace blockchain 250. In some embodiments, system 300 may include a token contract 314 and in some embodiments, system 300 may include a pricing contract 312. A token contract may indicate who owns how many tokens. An escrow contract may encode the transaction of tokens between a requester 116 and other system participants, such as a user and a validator. A pricing contract may contain the listing price that a validator asks for a one-time transmission of certain PII between user and requester. In some embodiments, an ontology contract may define what kind of pre-defined PII are traded in the system. In some examples, an identity verification registry may define what validators are registered in the system as well as a fingerprint of their associated metadata, public key, etc.

Referring to FIG. 3 in more detail, service provider A 302 and service provider B 304 may take on different roles in system 300. The roles that service provide A 302 and service provider B 304 may take on are the same, and in the detailed discussion of these roles, the term service provider will be used generally to refer to any service provider in system 300, including service provider A 302 and service provider B 304. Service provider in system 300 may take on the role of a user in the system. When acting as a requester 116 in the system, service provider may desire to have some information about the service provider attested to by a validator 100 in system 300, for example so that a different service provider in system 300 may be able to verify aspects of the identity of the service provider. When acting as a validator 100 in the system, service provider may be trusted by a user and/or a requester 116 to validate the authenticity and provenance of PII. When acting as a requester 116 in system 300, a service provider may have a requirement to verify PII from a user 120a in system 300 and may make a request to the user for PII and may make a request to a trusted validator in the system to use an existing attestation of the PII to verify the user 102a. System 300 may have any number of service providers, and any of the service providers in system 300 make take on any of the roles described. At different times, service provider A may act like a user 102a, a validator 100, or a requester 116.

In some examples, user 102a in system 300 may have control over the user's device 306. In some embodiments, user device 306 may be a personal computer or a laptop computer. In some embodiments, user device 306 may be a portable computing device such as a tablet or a smartphone. User device 306 may be a shared device on which user 102a has a user profile which is accessible to user 102a by entering a password or pin or other code which is private and known only to user 102a. In some examples, user device 306 may be a smart watch which may have direct connectivity to a network or may have connectivity to a network through a separate device controlled by user 102a, such as a smartphone. User device 306 may be a connected car. In general, user device 306 may be any connected device for which all or a partition of the device is solely under control of the user 102a. In some embodiments, an identity verification application, or any other application, may execute on user device 306, the identify verification application configured to execute instructions that enable functionality of system 300.

Attestation 308 represents a hash of PII of user 102a that is signed by the validator 100 and recorded on the attestation blockchain 114. Attestation 308 is created by a validator 100 that has checked and verified that authenticity and provenance of the PII, and once assured of its accuracy has created an attestation 308. In some examples, the attestation 308 may include supporting metadata. The supporting metadata may include the verification level of the validator, and the supporting metadata may include details related to the validator's process of verification. In some examples, the supporting metadata may reference any applicable standards that have been used to structure, organize, or encode the user PII in the attestation 308.

In some embodiments, smart contract 310 is used to capture details of an agreement between a validator 100 and a requester 116. In some examples, service provider A 302 is a validator 100 and may have previously attested to the PII that is required from service provider B 304 which is a requester 116, and service provider B 304 trusts service provider A as a trusted validator. In some examples, service provider B 304 acting as requester offers a price to service provider A 302 acting as validator for its attestation of the user's PII. In some examples, the price offered is represented in tokens that are used in system 300. The agreement between service provider B 304 acting as requester and service provider A 302 acting as validator may be captured in smart contract 310. Service provider A 302 acting as validator interacts with smart contract 310 and service provider B 304 acting as requester interacts with smart contract 310. In some examples, smart contract 310 may include details of escrow, where the agreed price in tokens is placed pending the completion of the agreement between user 102a and service provider B 304 acting as requester. In some examples, smart contract 310 is an application, module, or other software component or code that is stored on the marketplace blockchain 250 and configured to execute when one or more actions take place in system 300. In some examples, smart contract 310 may be an application, service daemon, routine, or other executable logic. Smart contract 310 may be executed on an operating system or on a virtual machine or may be run in any other appropriate environment. In some embodiments, smart contract 310, when executed, causes a graphical user interface to be displayed on user device 306. In other embodiments, smart contract 310 allows for input through a non-graphical user interface, such as a user interface that accepts text or vocal input without displaying an interactive image. A graphical user interface may be displayed on a screen of user device 306, or a monitor connected to a desktop or laptop computer or on any other display. User 102a may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, Calif.), Microsoft Internet Explorer (Microsoft, Redmond, Wash.), or Mozilla Firefox (Mozilla Foundation of Mountain View, Calif.), or may be any other type of interface.

System 300 may include a token contract 314 and a pricing contract 312 as part of the marketplace blockchain 250. A token contract 314 is a distributed ledger on a smart contract platform that tracks the ownership of every token. A pricing contract 312 contains the listing price that a validator 100 requests for a one-time transmission of PII between the user 102a and requester 116. In some embodiments, other contracts include an escrow contract which encodes the transaction of tokens between the requester 116 and the validator 100 or user 102a, an ontology contract which defines what kind of predefined PII are traded in the system, and an IDV registry which defines what validators are registered in the system as well as a fingerprint of their associated metadata e.g. public key.

Figure 4A:
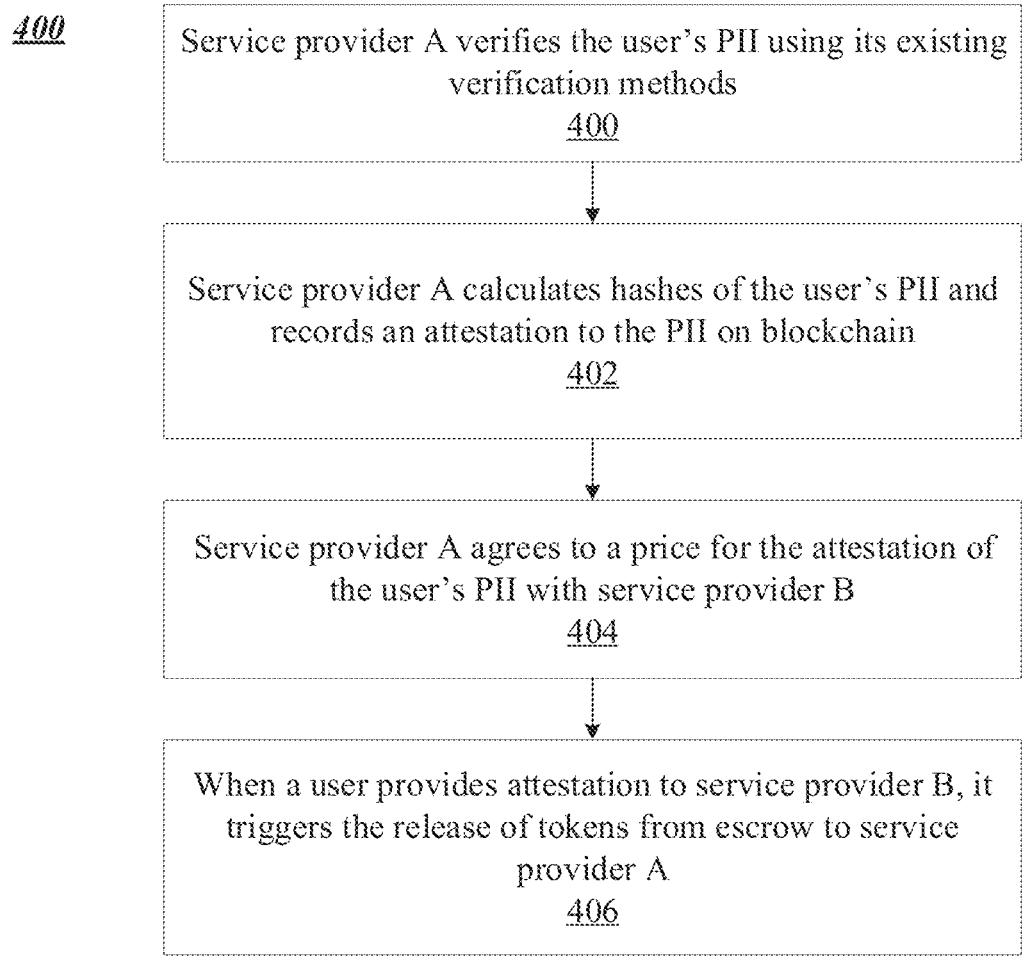
FIG. 4A shows a method performed by a service provider A acting as a validator in the system for attestations, according to some implementations.

In general overview, FIG. 4A illustrates a method that may be performed by service provider A 302 acting as a validator in system 300. In a general overview of FIG. 4A, in step 400, service provider A 302 verifies user 102a's PII using its existing verification method. In step 402, service provider A 302 calculates hashes of the user's PII and records a signed attestation to that PII on the attestation blockchain 114. In step 404, service provider A 302 agrees a price for the attestation of the user's PII with service provider B 304. Following transmission of PII between user and requester 116, in step 406 tokens are released from escrow to service provider A.

Referring to FIG. 4A in more detail, in some embodiments, no prior attestation for PII exists. Service provider A 302 verifies the user's PII using its verification methods. Once verified, service provider A 302 calculates the hashes of that PII and records an attestation to that PII on the attestation blockchain 114. In some embodiments, the attestation may also include supporting metadata, such as its verification level, details related to service provider A's 302 process of verification, or any applicable industry standards. In some embodiments, when implemented on a bitcoin blockchain, the blockchain transaction details of this attestation are then provided to the user 102a from service provider A 302, and the user 102a stores metadata to the attestation on their device and optionally in a cloud-based or remote storage. Metadata to the attestation may reference the transaction details on the blockchain 114.

Figure 4B:
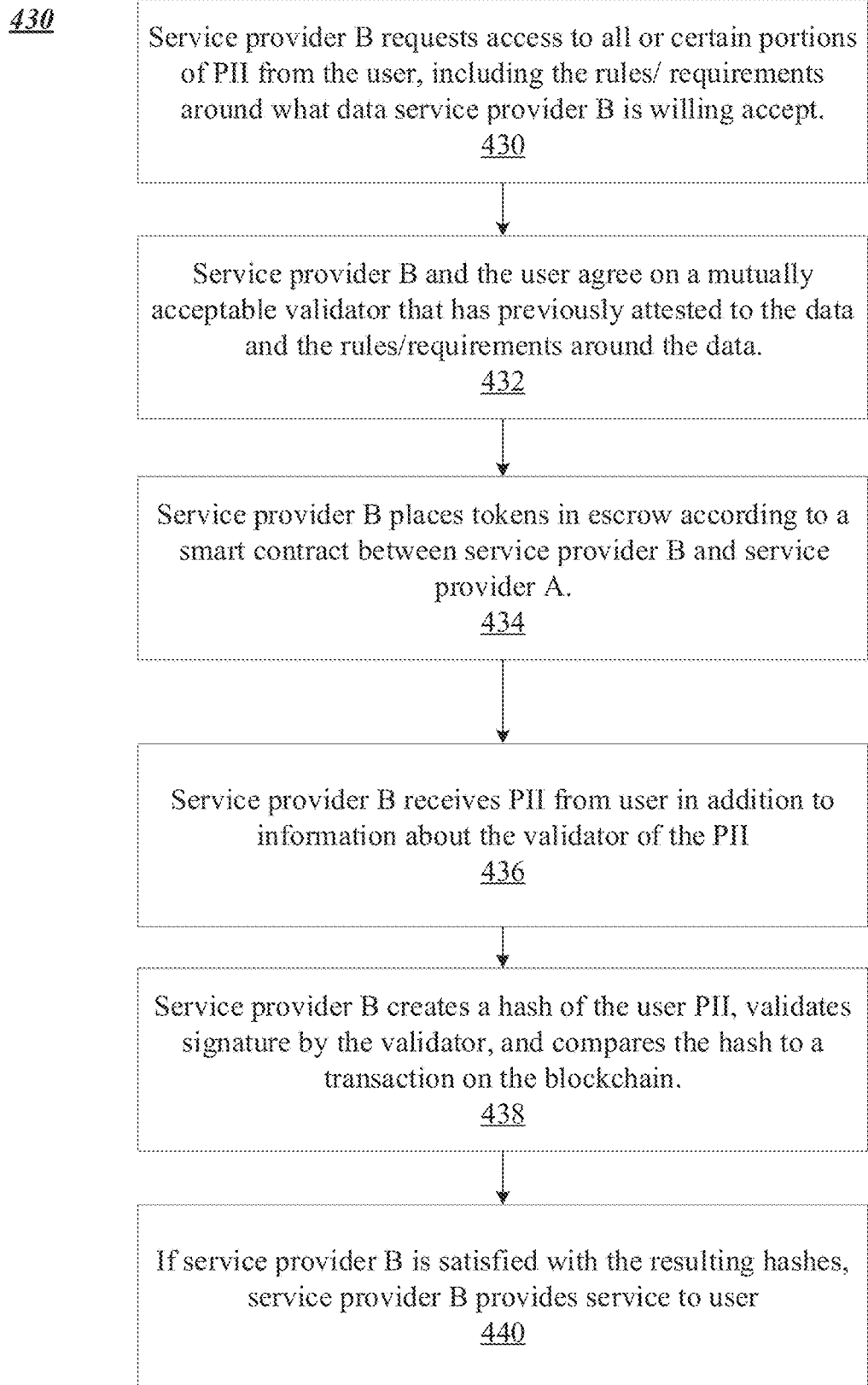
FIG. 4B shows a method performed by a service provider B acting as a requester in the system for attestations, according to some implementations.

In a general overview of FIG. 4B, in step 430, service provider B 304 requests access to all or certain portions of PII from the user 102a, including the rules/requirements around what data service provider B 304 is willing to accept. FIG. 4B illustrates a method that may be performed by service provider B 304 acting as a requester in system 300. In step 432, service provider B 304 and user 102*a* agree on a mutually acceptable validator, service provider A 302, that has previously attested to the data and the rules/requirements around the data. In step 434, service provider B 304 places tokens in escrow according to a smart contract 310 between service provider B 304 and service provider A 302. In step 436, service provider B 304 receives PII from user 102*a* in addition to information about service provider A 302. In step 438, service provider B 304 creates a hash of the user PII, validates signature by the validator 100, verifies that the attestation has not been revoked by the validator 100, and compares the hash to a transaction on the marketplace blockchain 250. In step 440, if service provider B 304 is satisfied with the resulting hashes, service provider B 304 provides the good or service to user 102*a*.

Referring to FIG. 4B in more detail, in step 430, the identify verification application may determine whether these requirements are met with the PII that was previously attested to by service provider A 302. In step 438, the hash created by service provider B 304 may be compared to a transaction on the marketplace blockchain 250, confirming the authenticity of the requested data. In some embodiments, if service provider B 304 is satisfied with the resulting hashes, service provider B 304 can then purchase the attestation from service provider A 302 and the amount of tokens corresponding to the price of that attestation are released from escrow to service provider A. In some embodiments, the tokens are placed into escrow via the smart contract 310 before the user transmits the PII and service provider B is able to validate. If a validation is not successful, service provider B may be able to refund the tokens back to its account.

Figure 4C:
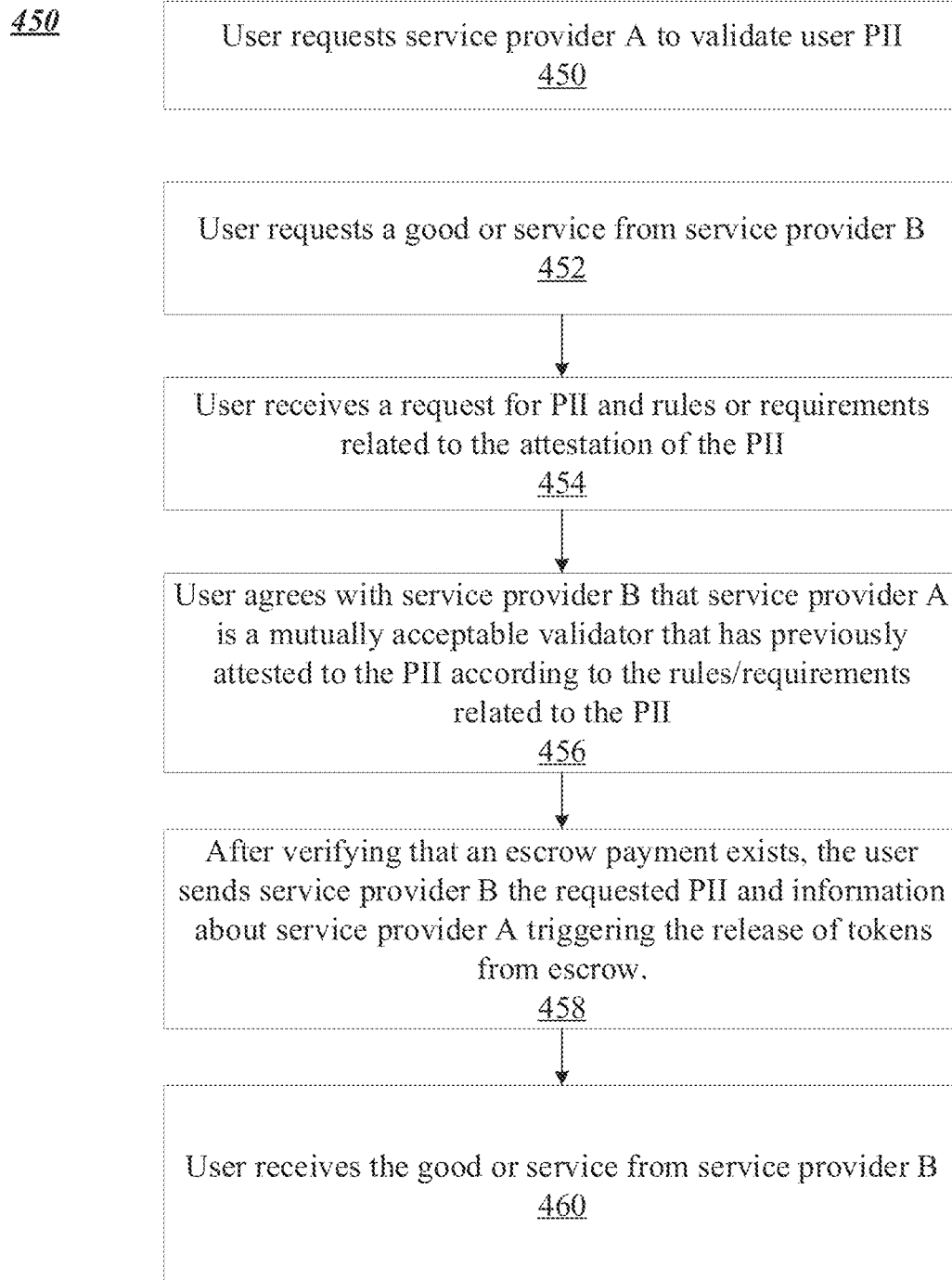
FIG. 4C shows a method performed by a user in the system for attestations, according to some implementations.

In a general overview, FIG. 4C illustrates a method that may be performed by user 102*a* in system 300. In step 450, user 102*a* requests service provider A 302 to validate user PII. In step 452, user 102*a* requests a good or service from service provider B 304. In step 454, user 102*a* receives a request for PII and rules or requirements relates to the attestation of the PII from service provider B 304. In step 456, user 102*a* agrees with service provider B 304 that service provider A 302 is a mutually acceptable validator that has previously attested to the user's PII according to the rules/requirements related to the PII. In step 458, after the user verifies that an escrow payment exists, the user 102*a* sends service provider B 304 the requested PII and information about service provider A 302 which may trigger the release of tokens from escrow. In step 460, user 102*a* receives the good or service from service provider B 304.

Referring to FIG. 4C in more detail, a user 102*a* may apply for a product or service from service provider A 302 and send the required PII from the identity verification application on the user's device 306. In some embodiments, t\in step 458, the user may send service provider B 304 the requested PII and the necessary information (e.g. required attestation metadata) in order for the requester 116 to reconstruct the Merkle root and compare and validate it against the attestation blockchain 114. In some embodiments, once service provider B 304 has paid the tokens into escrow, the user 102*a*, through their identity verification application, can send service provider B 304 the encrypted PII with the necessary information to validate against the blockchain attestation. The requester 116 then reconstructs the Merkle tree hash from the provided attestation and compares it to the attestation on the blockchain. In step 460, the user may receive the goods and services before the tokens are released from escrow. In some embodiments, the tokens may be shared between the user 102*a* and service provider A 302 at a ratio defined by the smart contract 310. In some embodiments, requester puts up a certain price in the escrow contract. The system support takes a fee, the validator fee, etc. The user will only hand out the information once they see that the initial payment was escrowed. The user will only release this information once they have verified from their end that the requester has received the data.

Figure 5:
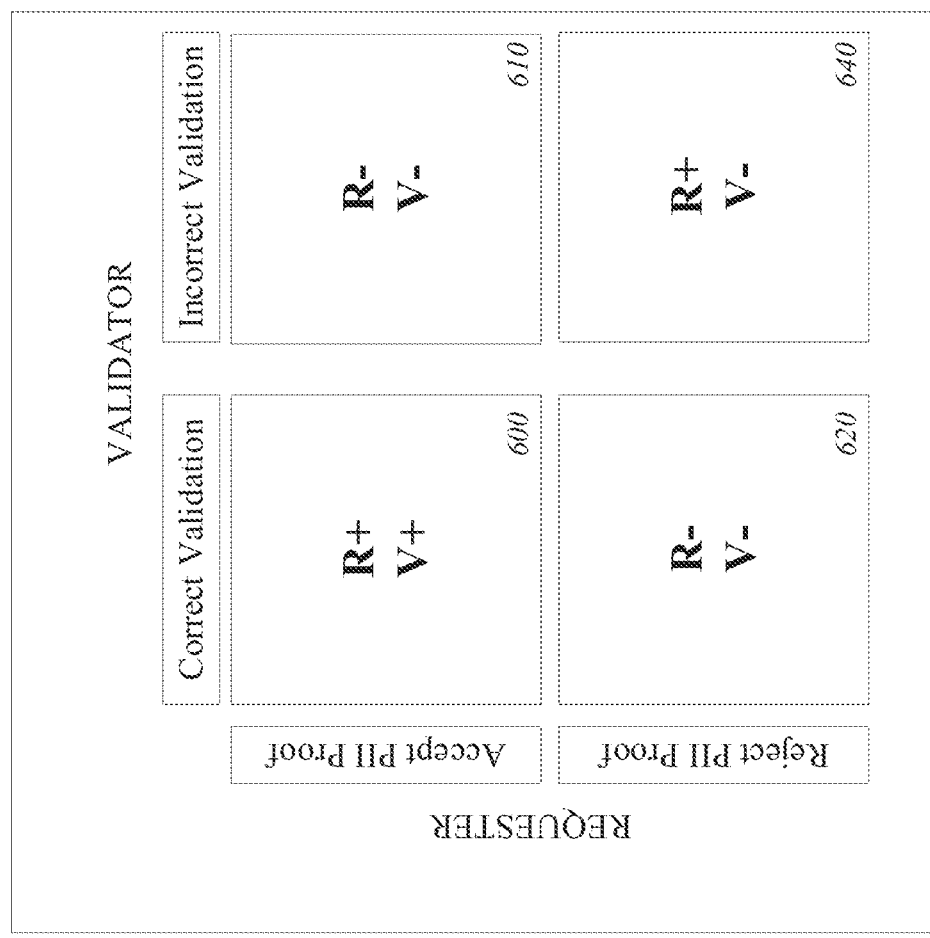
FIG. 5 shows an illustration of the system's goals, according to some implementations.

In general overview, FIG. 5 shows an illustration of the system goals. In one embodiment, incentives are built into the system through a combination of decisions, flags, penalties and rewards in a repeated interaction between the validator and the requester. The validator is incentivized to maintain their self-defined accuracy or level. This is achieved by requiring that the validator pays a penalty to the network if they are flagged to indicate a belief that they have attested erroneously. No independent party validates that the attestation was actually correct, therefore the penalty is linked to the flagging process of a requires. The validator will pay this penalty out of a stake of tokens. The validator must maintain a minimum stake defined by smart contracts 310 or smart rules of tokens to use the network.

Referring to FIG. 5 in more detail, the requester is rewarded when the validator accepts the statement of the requester. A "correct" flag means, the validator accepts the statement of the requester. No independent party can verify the actual status of the attestation of flag. It's just assumed that the attestation was incorrect when the flag gets accepted, but it not incentivized to falsely report correct attestation. At the Nash equilibrium of the game, whereby no participant in the game can gain an advantage by unilaterally changing their strategy if the other participants maintain their strategies, exists in the system when the validator attest a correct attestation and the requester accepts the correct attestation. In FIG. 5, R represents the requester, and V represents the validator. '+' represents a reward for behavior in the system, and '−' represents a penalty for behavior in the system. The purpose of the incentives is to achieve equilibrium states, where correct validations that are accepted by requesters lead to rewards to both parties, while incorrectly validated PII correctly rejected yields requester rewards, increasing the overall system reliability.

Figure 6A:
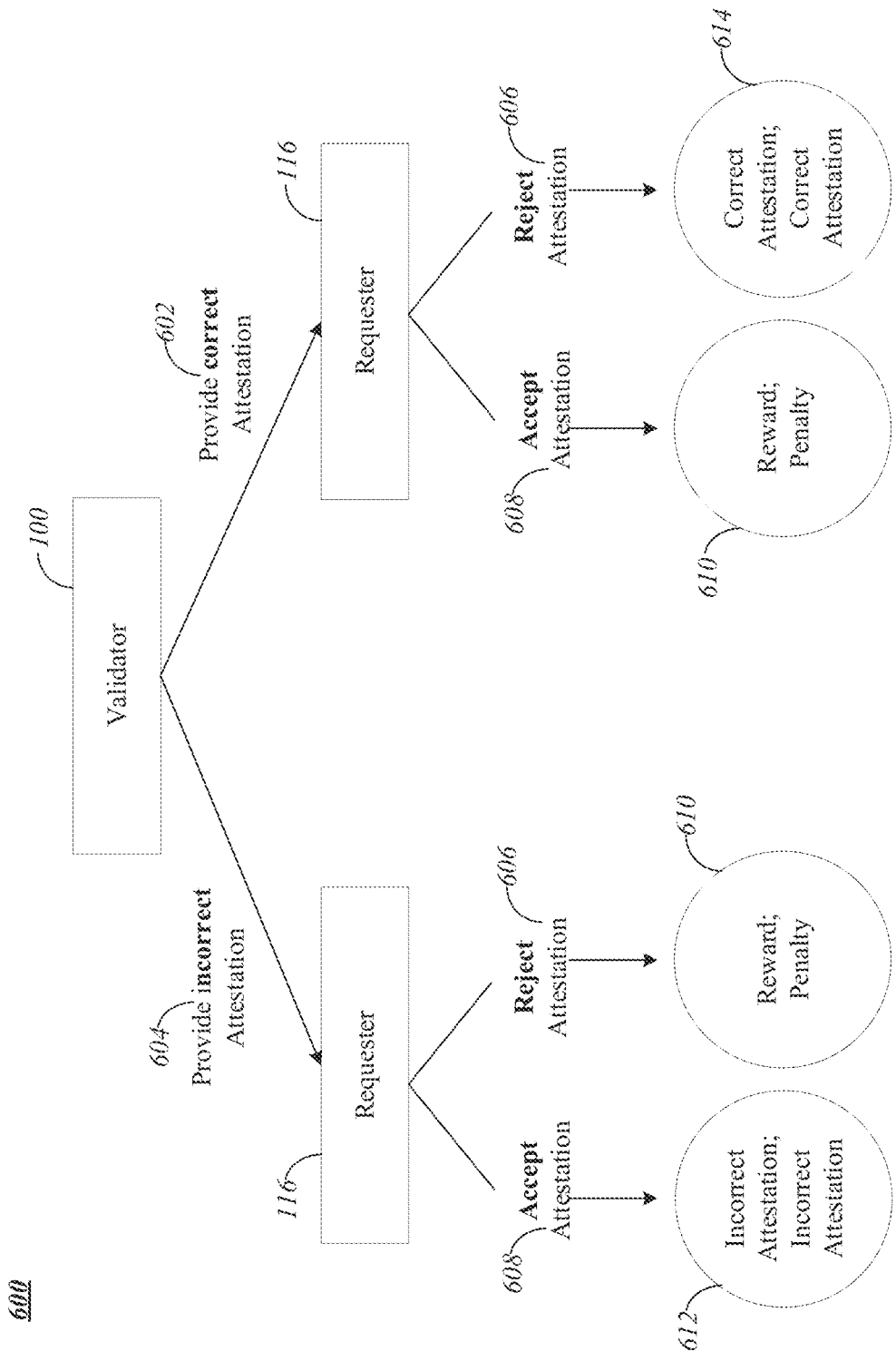
FIG. 6A shows an extensive form of the interaction between requester and validator, according to some implementations.

FIG. 6A shows an extensive form of the interaction between requester 116 and validator 100. To create a decentralized identity management system that exhibits a high level of accuracy, the system makes use of embedded incentives that reward accuracy, and penalties that discourage acting falsely. The accuracy of the system is critical. If the system becomes unreliable or unpredictable, then requesters may avoid using it. The problem is how to decide on whether the information provided by either the requester 116 or the validator 100 is correct or incorrect. In the identity system, there is a second decision to be made by the validator. In the identity system, the user is removed from the design of incentives in the system, because it is assumed that validators treat all user's PII submissions as false, which is why they set out to verify them in the first place. It is the role of the validator alone to ensure the accuracy of their attestations of User PII. This reduces the system to a two-player game comprising a validator and a requester. In this system, the validator provides the requester with an attestation, where the attestation is either correct or incorrect. The requester reviews the attestation and has two options—either to accept or reject it. The requester must be adequately incentivized to reject an incorrect attestation and to accept a correct attestation. In both cases, the outcome is (R (reward); Pe (penalty)). There is no information available regarding whether the validator has provided an incorrect or correct attestation, other than if the requester rejects it. This has the effect that R can never be greater than the utility of a correct attestation ('CA'). The requester should never be rewarded for rejecting an incorrect attestation (i.e. R<CA).

Figure 6B:
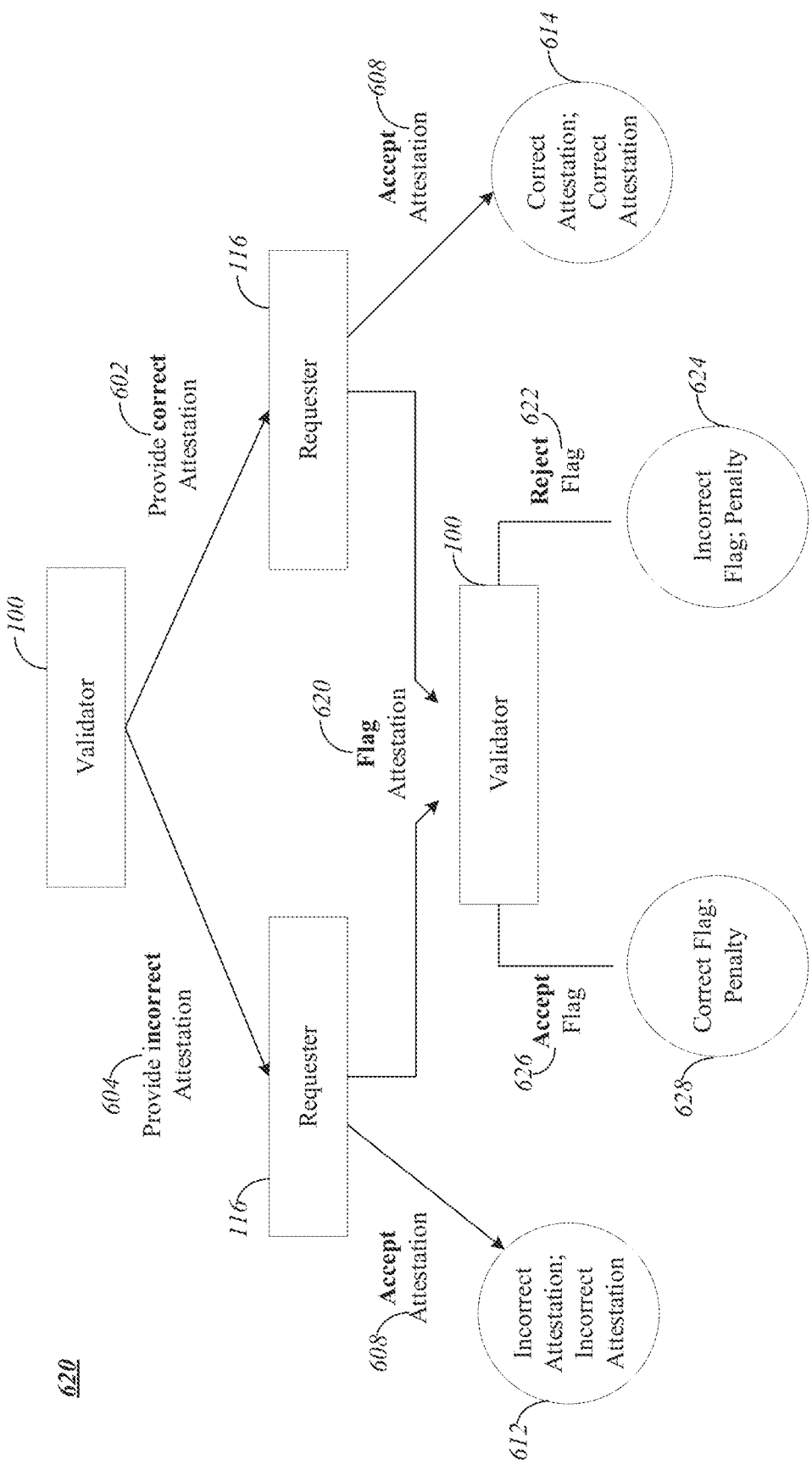
FIG. 6B shows an extensive form of the interaction between requester and validator, according to some implementations.

In general overview, FIG. 6B shows an extensive form of the interaction between requester 116 and validator 100 operating in an outcome space. The requester 116 reviews the validator's 100 attestation and has two options, to either flag the attestation as incorrect or to accept the attestation. If the validator 100 provides an incorrect attestation 604, and the requester 116 accepts this attestation 608, the outcome for both the validator and requester is an incorrect attestation 612. If the validator 100 provides a correct attestation 602 and the requester 116 accepts the attestation 608, the outcome for both the requester and validator is a correct attestation 614. If the requester 116 flags the attestation as incorrect 620, then the validator 100 can either accept 626 or reject the flag 622. The 'correct flag' (CF) is the actual reward for a correct flag and the 'incorrect flag' (IF) is the actual reward for an incorrect flag. If the validator 100 provides an incorrect attestation 604 and the requester 116 flags this attestation 620, the validator 100 accepts this flag 626. The outcome for the requester 116 and validator 100 are a 'correct flag' (CF) and a penalty respectively 628. If the validator 100 provides a correct attestation 602 and the requester 116 flags the attestation 620, the validator 100 rejects the flag 622. The outcome for the requester 116 and validator 100 are an 'incorrect flag' (IF) and a penalty respectively 628.

Referring to FIG. 6B in more detail, the penalty is kept the same regardless of whether a validator 100 accepts or rejects a flag. Assuming the primary non-financial motivation of the validator 100 would be to make its own system more robust, this would incentivize honesty through accepting a flag if it is indeed an incorrect attestation, since it costs the validator 100 the same regardless. The validator 100 may only accept correct flags and only reject incorrect flags. Since the penalty is the same regardless of whether the validator 100 accepts or rejects a flag, the validator 100 could potentially reject correct flags to discourage requesters 116.

The four game outcomes can be reduced into a simplified normal form. An attestation game is a sequential game with two actors, a requester and a validator operating in an outcome space {Correct Attestation; Correct Attestation (CA;CA) 614, Incorrect Attestation; Incorrect Attestation (IA; IA) 612, Correct Flag; Penalty (CF; Pe) 628, Incorrect Flag; Penalty (IF; Pe) 624}. A Fee is given by the requester to the validator for the game to be initiated and CF is the actual reward for a correct flag and IF is the actual reward for an incorrect flag.

The following constraints (Proposition 1) produce an exclusive Nash equilibrium of (CA; CA):

$CA>IF>IA|CA,IF,IA \in \mathbb{R}$ $CF>IA|CF,IA \in \mathbb{R}$ 1. (CA; CA): The requester and validator would remain here. Because CA>IF and CA>IA, this scenario produces more utility for both. Therefore (CA; CA) is a Nash equilibrium.
2. (IF; Pe): The requester would want to move to (CA; CA) to maximize utility given the validator's action and the validator is indifferent given the requester's action. Therefore, this is not a Nash equilibrium.
3. (IA; IA): The requester would want to move to (CA; CA) since CA>IA and so would the validator. Therefore, this is not a Nash equilibrium.
4. (CF; Pe): The requester would want to remain since CF>IA and the validator is indifferent, it cannot be guaranteed he would not want to move to (IF; Pe). Therefore, this is not a Nash equilibrium.

This demonstrates that (CA; CA) is the only Nash equilibrium.

If CF, IF<IA, there is no incentive for the requester to flag the attestation. In a repeated game, if the expected reward from flagging is larger than CA then the requester should flag all attestations. With the addition of additional qualitative constraints:

1. CF, IF≤|Pe|, since the reward is paid out from the penalty Pe.
2. IA>Pe, since this is additional discouragement for the validator to provide an incorrect attestation, as the cost of a penalty is greater than the cost of the incorrect attestation being accepted.
3. Fee<|Pe| to ensure that the penalty a validator faces is always larger than the Fee it charges, disincentivizing it from providing incorrect attestations while still making a profit.

We assume IA<0 since the legal consequences of accepting invalid user data (reputationally and/or financially due to a fine) would outweigh any short-term convenience.

An attestation game is well-posed if the constraints in Proposition 1 and the qualitative constraints are both satisfied. In other words:

CA>IF>0>IA>Pe

CF>IA and CF,IF,Fee≤|Pe|

Given always rational actors in a well-posed attestation game and P(IA) the probability of a validator providing a correct attestation, P(CA)=1−P(IA) the probability of a validator providing an incorrect attestation. Then P(CF):=P((CF; Pe))=P(IA) and P(IF):=P((IF; Pe))=P(CA).

Assuming that the validator provides an incorrect attestation, then the requester's choices are to accept it, for a utility gain of IA or to flag it for a utility gain of CF. Since CF>IA and the requester is always rational, the requester will always choose to flag. Therefore P(CF|IA)=1, so P(CF)=P(CF|IA) P(IA)=P(IA). A similar argument holds for P(IF)=P(CA).

The Reward function Re is a discrete random variable over {(CF; Pe); (IF; Pe)}. With Re((CF; Pe))=CF and Re((IF; Pe))=IF. Its probability mass function is given by $P(CF)=P(IA)$ if Re=CF $P(IF)=P(CA)$ if Re=IF Define R as the expected value of Re, that is $R:=E[Re]=P(CF)CF+P(IF)IF$ A reward function Re (with E[Re]=R) is well-posed if:

IA<R<CA and R<|Pe|

IF and CF are chosen in such a way that Re is well-posed. The required network incentives are created through a proof-of-stake mechanism making use of the token.

P is the probability of a correct attestation (P(CA)) and $$\text{Level} = \frac{1}{1-P}$$

This P is determined by the validator and can also be considered as the validator's accuracy.

In some embodiments, different confidence levels of accuracy are required for different applications. For example, confidence levels greater than 99.9% may be required for critical use cases. Lower confidence levels may be acceptable for less critical use cases. In some examples, it is more costly for a validator to authenticate user PII to a higher confidence level. The system many include many validators that are able to provide different levels of accuracy, with associated adjustments in prices per attestation. In some embodiments, the system includes penalties for validators that create attestations that are not truthful, creating strong incentives for validators to be accurate and truthful.

In general overview, FIG. 7 illustrates sample levels of different validators. Requesters must be confident that validators will maintain a level of accuracy required for their use cases. The identity system of this disclosure is a decentralized system, and the enforcement of accuracy cannot be achieved through a central authority and must instead rely on rewards and penalties. The incentives required to drive the system towards accuracy are created using a branch of game theory called backward induction. In backward induction, the end goal is decided and then a game is designed to attempt to reach this goal.

Rewards and Penalties

Figure 8:
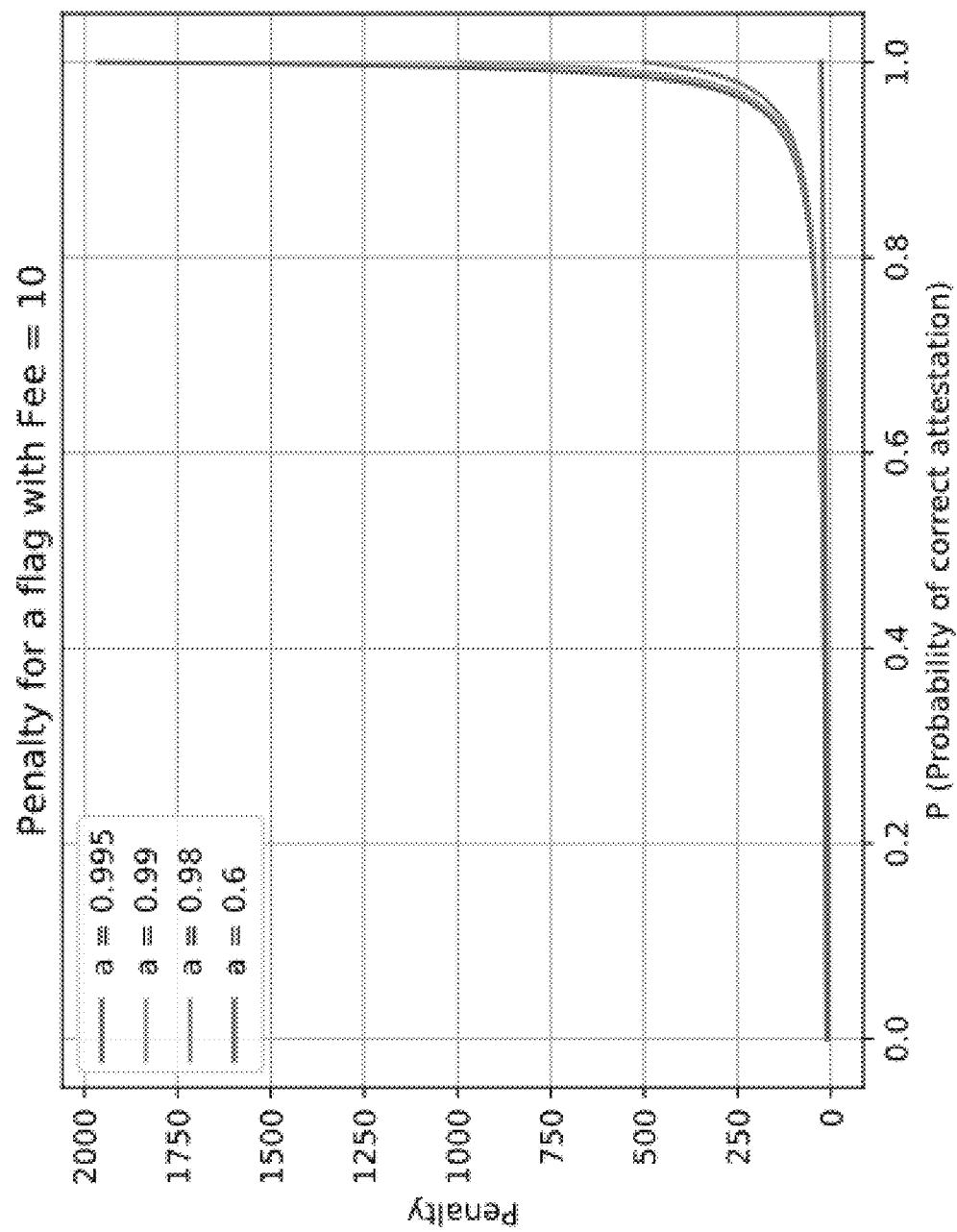
FIG. 8 illustrates the penalty for a flag as the level varies for different values of a system constant (a), according to some implementations.

In general overview, FIG. 8 illustrates the penalty for a flag as the level varies for different values of a system constant (a).

It is proposed that a penalty Pe satisfies the conditions for a well-posed attestation game and subsequently the rewards for a correct flag (CF) and incorrect flag (IF) which produce a well-posed reward function Re.

$$Pe = \frac{\text{Fee}}{1 - aP}, a \in [0, 1]$$

a is a configurable parameter that can be adjusted if observations indicate penalties are too high or too low. Fee<|Pe|, in other words the above Pe is valid for a well-posed attestation game. It is noted that $$0 \leq aP \leq 1 \Rightarrow 0 \leq 1 - aP \leq 1 \Rightarrow \frac{1}{1-aP}.$$

$$\text{So } |Pe| = \frac{\text{Fee}}{1 - aP} \geq \text{Fee}$$

In the rewards CF and IF the process introduces a weighting factor to include a dependence on the flagging history of the requester. Should a requester have a high ratio of previously accepted flags, it should produce a higher reward. This incentivizes the requester to only submit flags if they are likely to be accepted (i.e. incorrect attestations).

AF is defined as the ratio of accepted flags to the total flags in its history. Clearly $0 \leq AF \leq 1$. w is defined as $w \in [0,1]$ as the weight parameter to indicate how much AF should be weighed in the rewards. w is configurable based upon the behavior of the system.

The reward for setting a correct flag CF is defined as $$CF = [w + (1-w)AF] \cdot \frac{|Pe|}{2}$$

and the reward for an incorrect flag IF is $$IF = [w + (1-w)AF] \cdot \frac{|\text{Fee}|}{2}$$

By definition CF, IF≤|Pe| and therefore are valid for a well-posed attestation game. For future purposes express CA=Fee+S where S>0 is any savings gained by using the system. We can see 0<IF<Fee<CA as required. Now Re can be defined and the formula for R=E(Re):

$$R = [w + (1-w)AF] \cdot P(IA) \cdot \frac{|Pe|}{2} + [w + (1-w)AF] \cdot P(CA) \cdot \frac{|\text{Fee}|}{2}$$

This formula can be simplified to $$R = \frac{1}{2}[w + (1-w)AF] \cdot \left[P(IA) \cdot \frac{\text{Fee}}{1-aP} + P(CA) \cdot \text{Fee}\right]$$

R, as defined, can be shown to be well posed:

→ $0 \leq P(CA), P(IA) \leq 1$ as they are probabilities, and also $P(CA) = 1 - P(IA)$ → $w + (1-w)AF \leq w + (1-w)$ since $0 \leq AF \leq 1$ → $w + (1-w)AF \leq w + (1-w) = 1$ since $0 \leq AF \leq 1$ by definition → $aP \leq 1 \rightarrow 1 - P \leq 1 - aP \rightarrow \frac{1}{1-aP} \leq \frac{1}{1-P}$ → $\frac{1}{1-P} = \frac{1}{P(IA)}$ For R to be well posed it needs to satisfy the constraints previously stated:

$IA < R < CA$ and $R < |Pe|$ $$R = \frac{1}{2}[w + (1-w)AF] \cdot \left[P(IA)\frac{\text{Fee}}{1-aP} + P(CA) \cdot \text{Fee}\right]$$

$$\leq \frac{1}{2}\left[P(IA)\frac{\text{Fee}}{1-aP} + P(CA) \cdot \text{Fee}\right]$$

$$\leq \frac{1}{2}[\text{Fee} + P(CA) \cdot \text{Fee}] \leq \frac{1}{2} \cdot 2 \cdot \text{Fee}$$

$$= \text{Fee} < \text{Fee} + S = CA$$

Thus, the constraint R<CA is satisfied. Additionally, since IA<0, then:

$$R = \frac{1}{2}[w + (1-w) \cdot AF] \times \left[P(IA)\frac{\text{Fee}}{1-aP} + P(CA) \cdot \text{Fee}\right]$$

$$\geq 0 \geq IA$$

The final requirement is that R<|Pe|:

$$R \leq \left[P(IA)\frac{\text{Fee}}{1-aP} + P(CA) \cdot \text{Fee}\right]$$

-continued $$\leq \left[P(IA)\frac{\text{Fee}}{1-aP} + P(CA)\frac{\text{Fee}}{1-aP}\right]$$

$$\leq [P(IA) + P(CA)]\frac{\text{Fee}}{1-aP}$$

$$= \frac{\text{Fee}}{1-Ap} = |Pe|$$

The parameter a adjusts the penalty and FIG. 8 illustrates how it influences this.

The reward scales with how many previous flags have been accepted. Therefore the requester is also incentivized to be honest when flagging in a repeated game scenario. Even when a requester has had all its previous flags rejected, it is still incentivized to flag an incorrect attestation as there is a non-zero minimum reward (dictated by the weight parameter w). This is a feedback mechanism i.e. if a requester has a high ratio of accepted flags (due to having a high rate of previously accepted flags), and decides (for whatever reason, even though it will always be lower than CA as shown above) to flag correct attestations, it will be rejected, and future rewards will be lower.

Since $|Pe|>R$ in all scenarios, there will be excess incentive amounts $|Pe|-R$. It is currently proposed that these incentive amounts are locked away separately (not using a centralized solution). In the instance a validator accepts a flag, these incentive amounts will be used to pay out all previous requesters who accepted that attestation or will be distributed to all validators.

In a repeated game, which this is, it can then be shown that regardless of the discount factor (the discount of future game utility), the correct behavior is incentivized.

With a well-posed R in a repeated game with discount factor $\beta<1$, accepting correct attestations (honest) is more profitable than always flagging (dishonest). Proof:

The infinite geometric series identity holds as $\beta<1$ for convergence:

$$\text{Honest total payout: } \sum_{k=0}^{\infty}(CA)(\beta)^k = \frac{CA}{1-\beta}$$

$$\text{Dishonest total payout: } \sum_{k=0}^{\infty}(CA)(\beta)^k = \frac{R}{1-\beta}$$

Staking Mechanism

Figure 9:
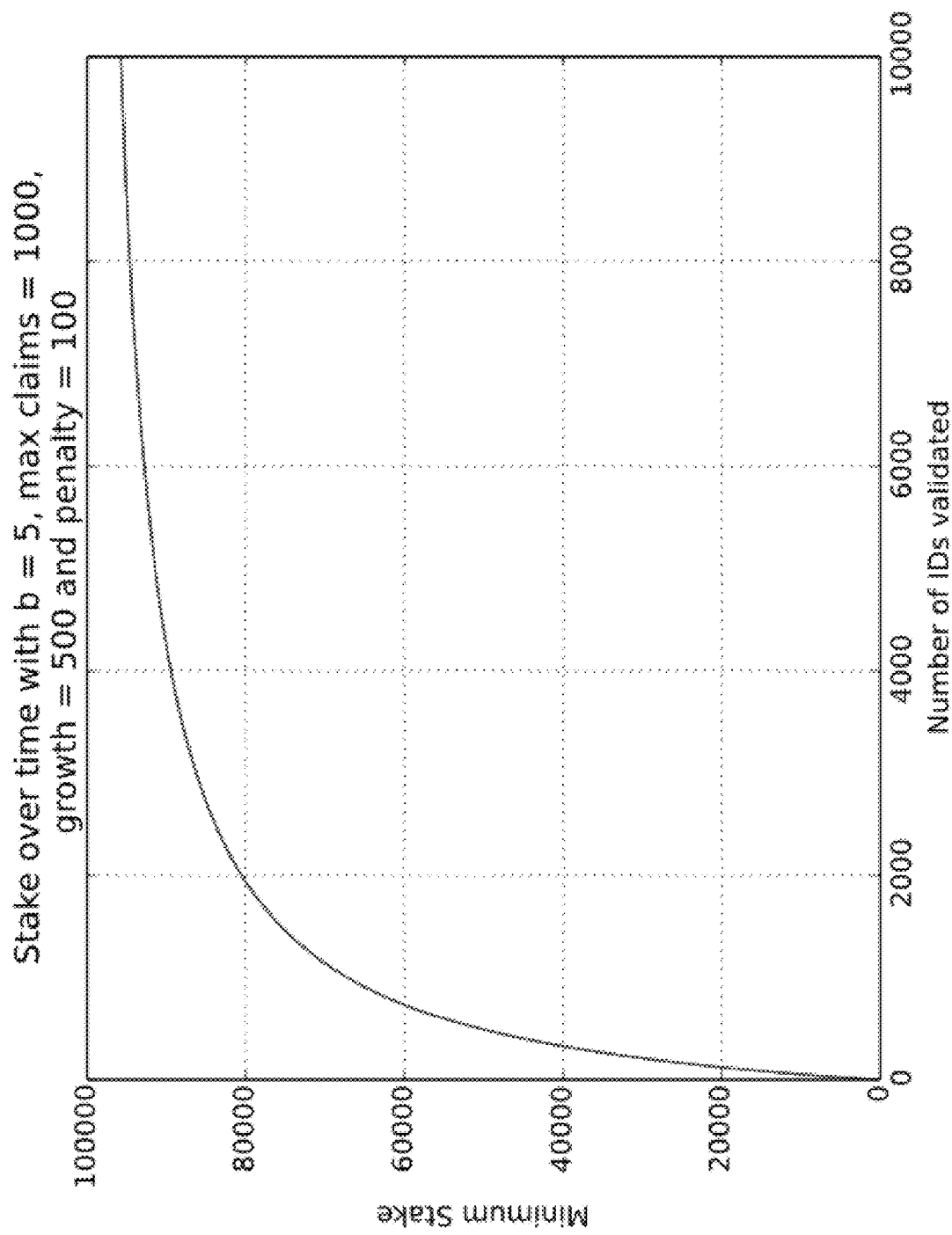
FIG. 9 illustrates an example stake of a validator with a penalty of 100 tokens per flag who performs 10,000 attestations, according to some implementations.

In general overview, FIG. 9 illustrates the minimum required stake as more IDs are validated for a particular set of values. Specifically, the required stake of a validator with a penalty of 100 tokens per flag who performs 10,000 attestations.

Referring to FIG. 9 in more detail, in order to ensure the right incentives are maintained, a staking mechanism is required. The staking mechanism requires a validator 100 to hold a defined minimum amount of tokens in order to be an active participant in the system. To ensure that validators have a stake and can pay, they must maintain a minimum stake that secures them against expected claims. This ensures that CA:CA is the Nash equilibrium in the repeated game. The expected claims are:

$$EC = \frac{\text{Total}_{ID}}{\text{Level}_{average}}$$

Where $\text{Total}_{ID}$ is the number of IDs that the validator has provided to requesters and $\text{Level}_{average}$ is the average level of a validator's IDs.

A stake function $\text{Stake}_{min}: R \to R$ is feasible if:
1. $\text{Stake}_{min}(0) \geq b \cdot |Pe|$, to cover a base amount of flagged attestations b (configurable by the network and related to EC when it is a new validator).

2. $\lim_{x \to \infty} \text{stake}_{min}(x) = |Pe| \cdot \text{Claim}_{max} + 0(b)$, where $\text{Claim}_{max} \in R$ represents the maximum amount of claims expected for a validator to reach.

3. $\frac{d\text{Stake}_{min}}{dx} > 0$ and $\frac{d^2\text{Stake}_{min}}{dx} < 0$ for $x \in (0, \infty)$ In other words, the minimum stake grows with diminishing additional costs to the validator. The current stake of a validator must always be greater than or equal to $\text{Stake}_{min}(\text{total}_{ID})$. C The minimum stake $(\text{Stake}_{min}(\text{total}_{ID}))$ should be:

$$\text{Stake}_{min} = |Pe|\left(b + \frac{\text{Claim}_{max} \cdot \text{Total}_{ID}}{\text{growth} + \text{Total}_{ID}}\right)$$

Where growth $\in (1, \infty)$ modulates how quickly the required stake grows as a function of the total number of attestations of the validator. Proof;

$\text{Stake}_{min}(0) = |Pe| \cdot b$ trivially as required

Let $x = \text{Total}_{ID}$. Then:

$$\lim_{x \to \infty} |Pe| \cdot b \cdot |Pe| \cdot \frac{\text{Claim}_{max}}{\frac{\text{growth}}{x} + 1}$$

$$= |Pe| \cdot b + |Pe| \cdot \text{Claim}_{max}$$

$$= |Pe| \cdot \text{Claim}_{max} + 0(b)$$

$\frac{d}{dx}\frac{1}{1+x} = \frac{1}{(1+x)^2}$ which is positive everywhere for $x \neq 1$ $\frac{d^2}{dx^2}\frac{x}{1+x} = \frac{2x}{(1+x)^3} - \frac{2}{(1+x)^2} = -\frac{2x}{(1+x)^3}$ which is negative $\forall x > 0$ since $a^3 > 0, \forall a > 0$ The stake, through including Pe as a variable, is linearly dependent on fee. This ensures that the stake (and the penalty itself) adjusts to changes in the value of the toke in the system since inflation or deflation of a token may be accompanied by a fee adjustment by a validator. This stake ensures that there is sufficient protection for requesters. If the validator decides to leave the system, the stake decays over time using an exponential function, where more tokens are available to be withdrawn over time in an exponential manner.

The withdrawal stake percentage is defined as $100e^{t-F}$, where t is the time in minutes since the withdrawal was requested, up to 5 years and F is five years in minutes. At 5 years, 100% of the stake will be withdrawn. After say one year, only 1.83% can be extracted by the validator. Both requesters and validators can also choose to use other parties e.g. requesters can decide which validator to use and validators can decide which requesters to accept.

B. Computing and Network Environment of the Current Disclosure

Figure 10A:
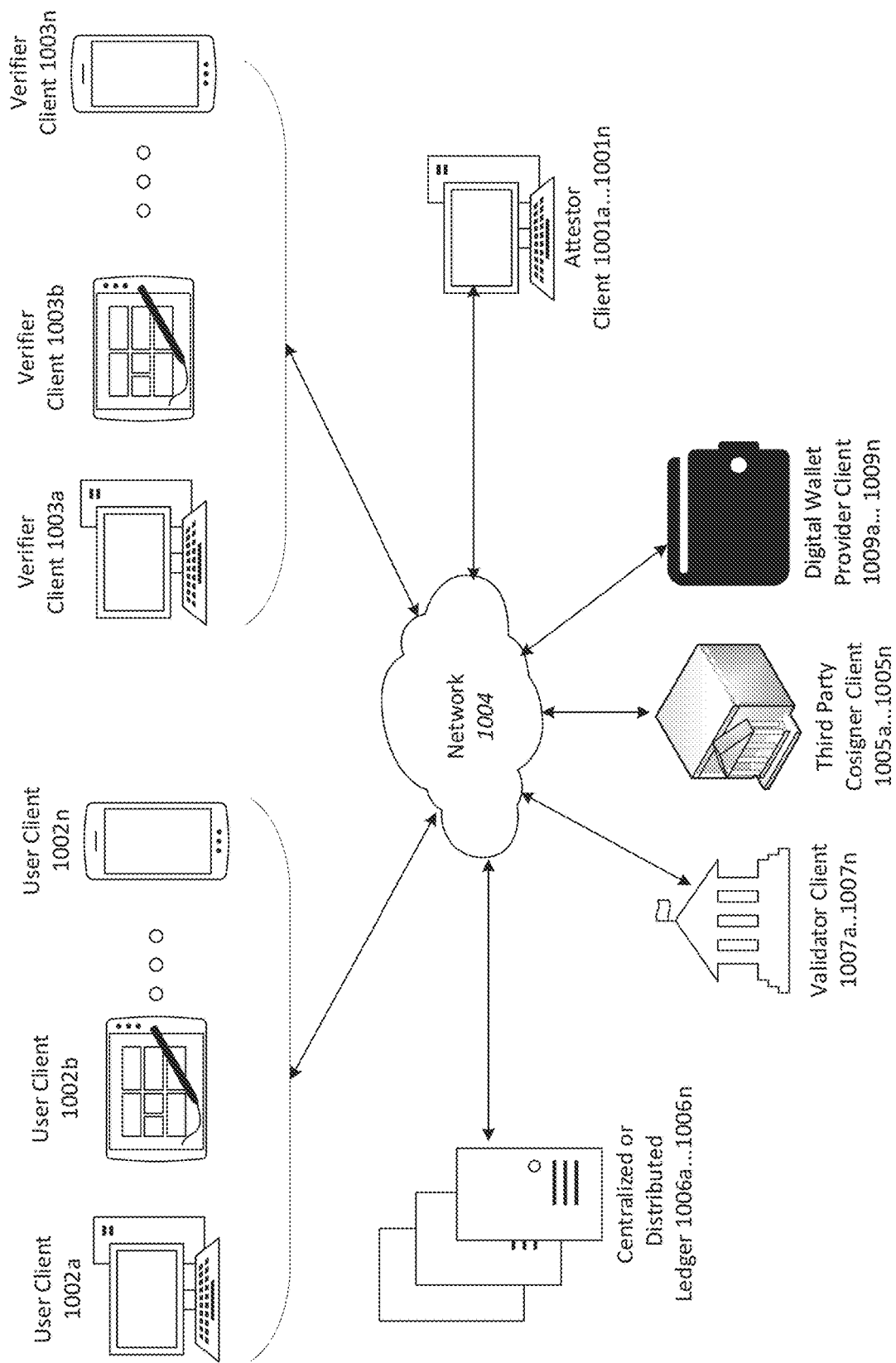
FIG. 10A is a block diagram depicting an embodiment of a network environment comprising an online identity verification system.

Prior to discussing specific embodiments of the present solution, it may be helpful to describe aspects of the operating environment as well as associated system components (e.g. hardware elements) in connection with the methods and systems described herein. Referring to FIG. 10A, an embodiment of a network environment is depicted. In a brief overview, the network environment includes one or more user(s) 1002a-1002n (also generally referred to as local user machines(s) 1002, user client(s) 1002, user client node(s) 1002, user client machine(s) 1002, user client computer(s) 1002, user client device(s) 1002, user endpoint(s) 1002, or user endpoint node(s) 1002) in communication with one or more verifier(s) 1003a-1003n (also generally referred to as local verifier machines(s) 1003, verifier client(s) 1003, verifier client node(s) 1003, verifier client machine(s) 1003, verifier client computer(s) 1003, verifier client device(s) 1003, verifier endpoint(s) 1003, or verifier endpoint node(s) 1003), and one or more third-party cosigner(s) 1005a-1005n (also generally referred to as local third-party cosigner machines(s) 1005, third-party cosigner client(s) 1005, third-party cosigner client node(s) 1005, third-party cosigner client machine(s) 1005, third-party cosigner client computer(s) 1005, third-party cosigner client device(s) 1005, third-party cosigner endpoint(s) 1005, or third-party cosigner endpoint node(s) 1005).

The one or more user(s) 1002a-1002n may be in communication with one or more validator(s) 1003a-1003n (also generally referred to as local validator machines(s) 1003, validator client(s) 1003, validator client node(s) 1003, validator client machine(s) 1003, validator client computer(s) 1003, validator client device(s) 1003, validator endpoint(s) 1003, or validator endpoint node(s) 1003, and one or more centralized or distributed ledger(s) 1006a-1006n (also generally blockchain(s) 1006, centralized or distributed ledger node(s) 1006, blockchain node(s) 1006, centralized or distributed ledger machine(s) 1006, or blockchain machine(s) 1006, via one or more networks 1004. User client(s) 1002a-1002n, verifier client(s) 1003a-1003n, validator client(s) 1007a-1007n, and third-party cosigner client(s) 1005a-1005n may interact with one or more attestor client(s) 1001a-1001n (also generally referred to as local attestor machines(s) 1001, attestor client(s) 1001, attestor client node(s) 1001, attestor client machine(s) 1001, attestor client computer(s) 1001, attestor client device(s) 1001, attestor endpoint(s) 1001, or attestor endpoint node(s) 1001).

In some embodiments, a user client 1002 interfaces with digital wallet provider client 1007. In some embodiments, a user client 1002 has the capacity to function as both a client node seeking verify the identity of a third-party using ID codes. In some embodiments, the user client 1002 has a validated identity profile that can be verified by a third-party using ID codes. In examples, a validator client 1007 may be operable to validate the identity of one or more users 1002. In embodiments, a validator client 1007 may be operable to validate an organization, a user, a company, a site, an object, a person, a group of people, and/or the relationship between any of a user, an organization, a company, a site, an object, a person, and a group of people and any other user, organization, company, site, object, person, and group of people. In some embodiments, a verifier client 1003 may wish to verify the identity of a user, a company, a site, an object, a person, a group of people, and/or the relationship between any of a user, an organization, a company, a site, an object, a person, and a group of people and any other user, organization, company, site, object, person, and group of people, through the use of ID codes.

In some embodiments, one or more third-party cosigner(s) 1005a-1005n, may wish to cosign a validated identity of a user 1002. In examples, third-party cosigner(s) 1005 may digitally sign a record that is recorded on centralized or distributed ledger(s) 1006.

Although FIG. 10A shows a network 1004 between user clients 1002, verifier clients 1003, third-party cosigner clients 1005, attestor clients 1001, validator clients 1007, digital wallet provider clients 1009, and centralized or distributed ledgers 1006, the user clients 1002, verifier clients 1003, third-party cosigner clients 1005, attestor clients 1001, validator clients 1007, digital wallet provider clients 1009, and centralized or distributed ledgers 1006 may be on the same network 1004. In some embodiments, there are multiple networks 1004 between the user clients 1002, verifier clients 1003, third-party cosigner clients 1005, attestor clients 1001, validator clients 1007, digital wallet provider clients 1009, and centralized or distributed ledgers 1006. In one of these embodiments, a network 1004' (not shown) may be a private network and a network 1004 may be a public network. In another of these embodiments, a network 1004 may be a private network and a network 1004' may be a public network. In still another of these embodiments, networks 1004 and 1004' may both be private networks.

The network 1004 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 1004 may be any type and/or form of network. The geographical scope of the network may vary widely and the network 1004 can be a body area network (BAN), a personal area network (PAN), a local-area network (LAN), e.g. Intranet, a metropolitan area network (MAN), a wide area network (WAN), or the Internet. The topology of the network 1004 may be of any form and may include, e.g., any of the following: point-to-point, bus, star, ring, mesh, or tree. The network 1004 may be an overlay network which is virtual and sits on top of one or more layers of other networks 1004'. The network 1004 may be of any such network topology as known to those ordinarily skilled in the art capable of supporting the operations described herein. The network 1004 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 1004 may be a type of broadcast network, a telecommunications network, a data communication network, or a computer network.

In some embodiments, the system may include multiple, logically-grouped servers providing the centralized or distributed ledgers 1006. In one of these embodiments, the logical group of servers may be referred to as a server farm or a machine farm. In another of these embodiments, the servers providing the centralized or distributed ledgers 1006 may be geographically dispersed. In other embodiments, a machine farm may be administered as a single entity. In still other embodiments, the machine farm includes a plurality of machine farms. The servers providing the centralized or distributed ledgers 1006 within each machine farm can be heterogeneous—one or more of the servers or machines can operate according to one type of operating system platform (e.g., Windows, manufactured by Microsoft Corp. of Redmond, Wash.), while one or more of the other servers can operate according to another type of operating system platform (e.g., Unix, Linux, or Mac OSX).

In one embodiment, servers providing the centralized or distributed ledgers 1006 in the machine farm may be stored in high-density rack systems, along with associated storage systems, and located in an enterprise data center. In this embodiment, consolidating the servers providing the centralized or distributed ledgers 1006 in this way may improve system manageability, data security, the physical security of the system, and system performance by locating servers and high-performance storage systems on localized high-performance networks. Centralizing the servers and storage systems and coupling them with advanced system management tools allows more efficient use of server resources.

The servers 1006 of each machine farm providing the centralized or distributed ledgers 1006 do not need to be physically proximate to another server in the same machine farm. Thus, the group of servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection. Additionally, a heterogeneous machine farm may include one or more servers operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers may comprise components, subsystems and modules to support one or more management services for the machine farm providing the centralized or distributed ledgers 1006. In one of these embodiments, one or more servers provide functionality for management of dynamic data, including techniques for handling failover, data replication, and increasing the robustness of the machine farm. Each server may communicate with a persistent store and, in some embodiments, with a dynamic store.

Server providing the centralized or distributed ledgers 1006 may be a file server, application server, web server, proxy server, appliance, network appliance, gateway, gateway server, virtualization server, deployment server, SSL VPN server, or firewall. In one embodiment, a plurality of servers may be in the path between any two communicating servers.

Figure 10B:
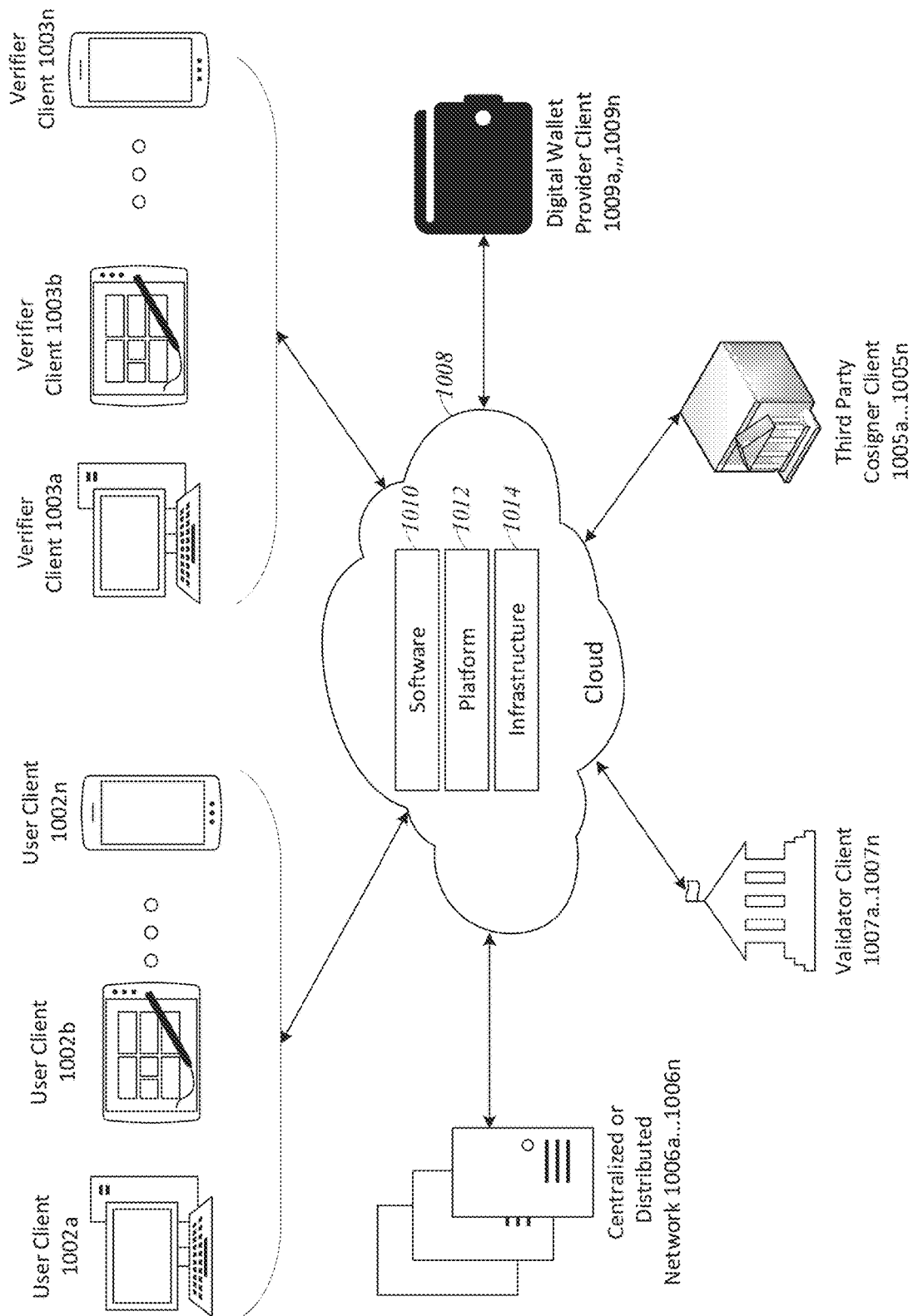
FIG. 10B is a block diagram depicting a cloud computing environment comprising users in communication with verifiers, digital wallet provider clients, third-party cosigners, validators, and one or more centralized or distributed ledger(s) via a cloud-based identity verification system, according to some implementations.

Referring to FIG. 10B, a cloud computing environment is depicted. A cloud computing environment may provide user client 1002, verifier client 1003, digital wallet provider client 1009, third-party cosigner client 1005, and validator client 1007 with one or more resources provided by a network environment. The cloud computing environment may include one or more user clients 1002a-1002n, one or more verifier clients 1003a-1003n, one or more digital wallet provider clients 1009a-1009n, one or more third-party cosigner clients 1005a-1005n, and one or more validator clients 1007a-1007n in communication with the cloud 1008 over one or more networks 1004. User clients 1002, verifier clients 1003, digital wallet provider clients 1009, third-party cosigner clients 1005, and validator clients 1007 may include, e.g., thick clients, thin clients, and zero clients. A thick client may provide at least some functionality even when disconnected from the cloud 1008 or servers providing the centralized or distributed ledgers 1006. A thin client or zero client may depend on the connection to the cloud 1008 or servers providing the centralized or distributed ledgers 1006 to provide functionality. A zero client may depend on the cloud 1008 or other networks 1004 or servers providing the centralized or distributed ledgers 1006 to retrieve operating system data for the user client device 1002, verifier client device 1003, digital wallet provider client device 1009, third-party cosigner client device 1005, and validator client device 1007. The cloud 1008 may include back end platforms, e.g., servers, storage, server farms or data centers.

The cloud 1008 may be public, private, or hybrid. Public clouds may include public servers that are maintained by third parties to the user client 1002, verifier client 1003, digital wallet provider client 1009, third-party cosigner client 1005, and validator client 1007, or the owners of the user client 1002, verifier client 1003, digital wallet provider client 1009, third-party cosigner client 1005, and validator client 1007. The servers may be located off-site in remote geographical locations as disclosed above or otherwise. Public clouds may be connected to servers over a public network. Private clouds may include private servers that are physically maintained by a user client 1002, verifier client 1003, digital wallet provider client 1009, third-party cosigner client 1005, and validator client 1007, or owners of a user client 1002, verifier client 1003, digital wallet provider client 1009, third-party cosigner client 1005, and validator client 1007. Private clouds may be connected to the servers over a private network 1004. Hybrid clouds may include both the private and public networks 1004 and servers.

The cloud 1008 may also include a cloud-based delivery, e.g. Software as a Service (SaaS) 1010, Platform as a Service (PaaS) 1012, and Infrastructure as a Service (IaaS) 1014. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

User clients 1002, verifier clients 1003, digital wallet provider clients 1009, third-party cosigner clients 1005, and validator clients 1007 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). User clients 1002, verifier clients 1003, digital wallet provider clients 1009, third-party cosigner clients 1005, and validator clients 1007 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. User clients 1002, verifier clients 1003, digital wallet provider clients 1009, third-party cosigner clients 1005, and validator clients 1007 may access SaaS resources through the use of web-based user interfaces, provided by a web browser (e.g. Google Chrome, Microsoft Internet Explorer, or Mozilla Firefox provided by Mozilla Foundation of Mountain View, Calif.). User clients 1002, verifier clients 1003, digital wallet provider clients 1009, third-party cosigner clients 1005, and validator clients 1007 may also access SaaS resources through smartphone or tablet applications, including e.g., Salesforce Sales Cloud, or Google Drive App. User clients 1002, verifier clients 1003, digital wallet provider clients 1009, third-party cosigner clients 1005, and validator clients 1007 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

User clients 1002, verifier clients 1003, digital wallet provider clients 1009, third-party cosigner clients 1005, validator clients 1007, and centralized or distributed ledgers 1006 may be deployed as and/or executed on any type and form of computing device, e.g., a computer, network device or appliance capable of communicating on any type and form of network and performing the operations described herein.

Figure 10C:
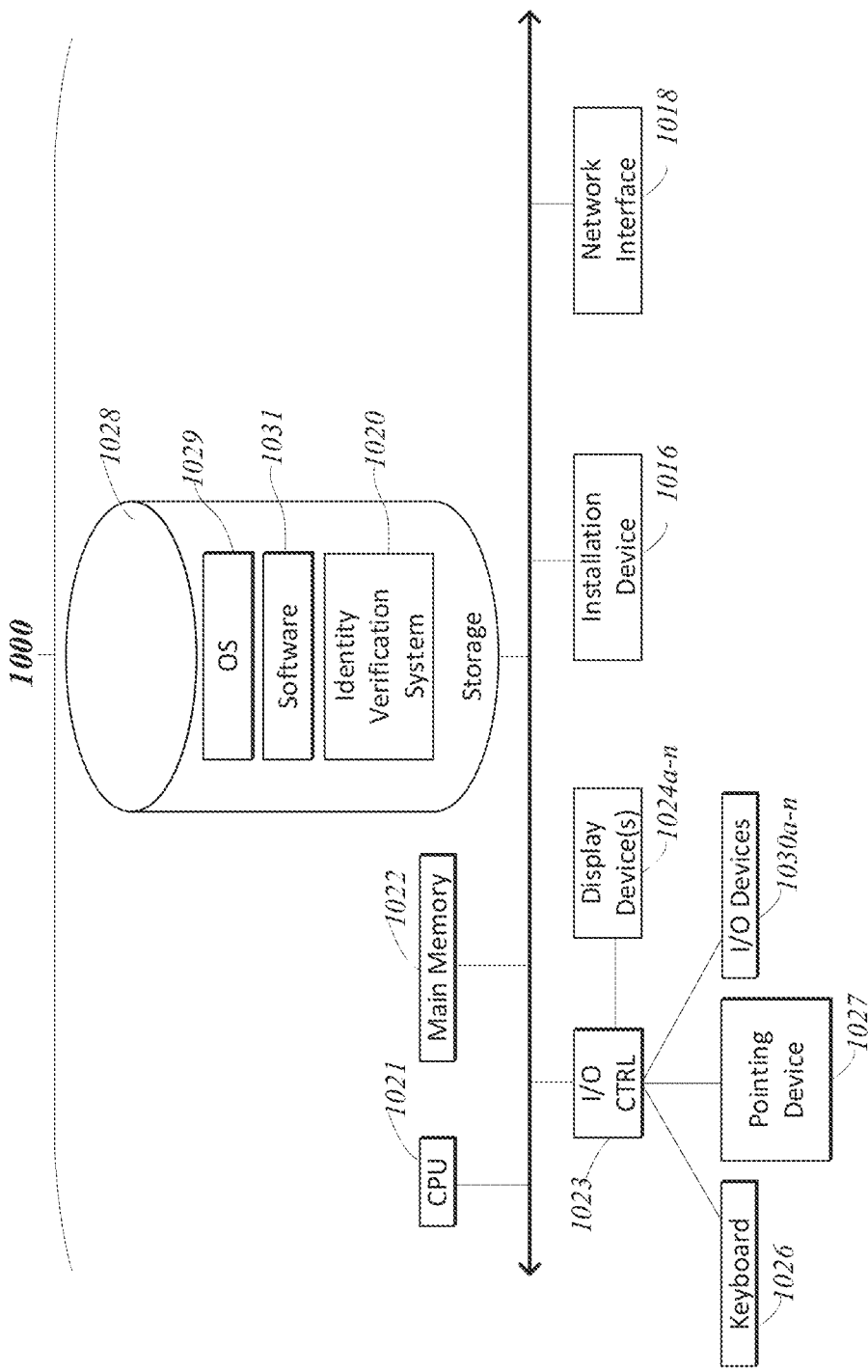
FIGS. 10C and 10D are block diagrams depicting embodiments of computing devices useful in connection with the methods and systems described herein.
Figure 10D:
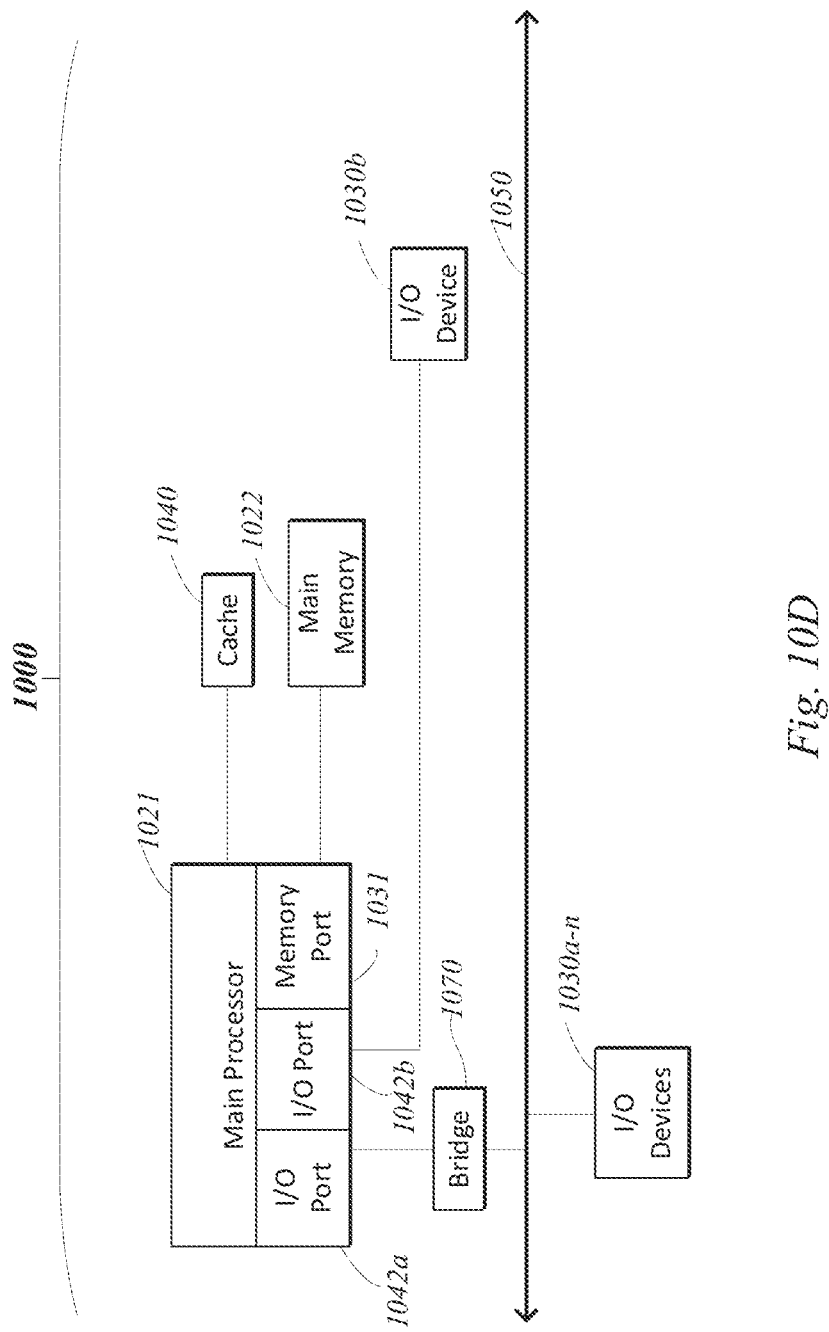

FIGS. 10C and 1D depict block diagrams of a computing device 10000 useful for practicing an embodiment of attestor clients 1001, user clients 1002, verifier clients 1003, digital wallet provider clients 1009, third-party cosigner clients 1005, or validator clients 1007. As shown in FIGS. 10C and 1D, each computing device 1000 includes a central processing unit 1021, and a main memory unit 1022. As shown in FIG. 10C, a computing device 10000 may include a storage device 1028, an installation device 1016, a network interface 1018, and I/O controller 1023, display devices 1024a-1024n, a keyboard 1026 and a pointing device 1027, e.g., a mouse. The storage device 1028 may include, without limitation, an operating system 1029, software 1031, and a software of a simulated phishing attack system 1020. As shown in FIG. 1D, each computing device 10000 may also include additional optional elements, e.g., a memory port 1031, a bridge 1070, one or more input/output devices 1030a-1030n (generally referred to using reference numeral 1030), and a cache memory 1040 in communication with the central processing unit 1021.

The central processing unit 1021 is any logic circuitry that responds to and processes instructions fetched from the main memory unit 1022. In many embodiments, the central processing unit 1021 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 10000 may be based on any of these processors, or any other processor capable of operating as described herein. The central processing unit 1021 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 1022 may include on or more memory chips capable of storing data and allowing any storage location to be directly accessed by the microprocessor 1021. Main memory unit 1022 may be volatile and faster than storage 1028 memory. Main memory units 1022 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 1022 or the storage 1028 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 1022 may be based on any of the above described memory chips, or any other available memory chips capable of operating as described herein. In the embodiment shown in FIG. 10C, the processor 1021 communicates with main memory 1022 via a system bus 1050 (described in more detail below). FIG. 1D depicts an embodiment of a computing device 1000 in which the processor communicates directly with main memory 1022 via a memory port 1031. For example, in FIG. 1D the main memory 1022 may be DRDRAM.

FIG. 1D depicts and embodiment in which the main processor 1021 communicates directly with cache memory 1040 via a secondary bus, sometimes referred to as a backside bus. In other embodiments, the main processor 1021 communicates with cache memory 1040 using the system bus 1050. Cache memory 1040 typically has a faster response time than main memory 1022 and is typically provided by SRAM, BSRAM, or EDRAM. In the embodiment shown in FIG. 1D, the processor 1021 communicates with various I/O devices 1030 via a local system bus 1050. Various buses may be used to connect the central processing unit 1021 to any of the I/O devices 1030, including a PCI bus, a PCI-X bus, or a PCI-Express bus, or a NuBus. For embodiments in which the I/O device is a video display 1024, the processor 1021 may use an Advanced Graphic Port (AGP) to communicate with the display 1024 or the I/O controller 1023 for the display 1024. FIG. 1D depicts and embodiment of a computer 1000 in which the main processor 1021 communicates directly with I/O device 1030b or other processors 1021' via HYPERTRANSPORT, RAPIDIO, or INFINIBAND communications technology. FIG. 1D also depicts an embodiment in which local busses and direct communication are mixed: the processor 1021 communicates with I/O device 1030a using a local interconnect bus while communicating with I/O device 1030b directly.

A wide variety of I/O devices 1030a-1030n may be present in the computing device 10000. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 1030a-1030n may include a combination of multiple input or output devices, including, e.g., Microsoft KINECT, Nintendo Wiimote for the WII, Nintendo WII U GAMEPAD, or Apple iPhone. Some devices 1030a-1030n allow gesture recognition inputs through combining some of the inputs and outputs. Some devices 1030a-1030n provide for facial recognition which may be utilized as an input for different purposes including authentication and other commands. Some devices 1030a-1030n provide for voice recognition and inputs, including, e.g., Microsoft KINECT, SIRI for iPhone by Apple, Google Now or Google Voice Search, and Alexa by Amazon.

Additional devices 1030a-1030n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 1030a-1030n, display devices 1024a-1024n or group of devices may be augmented reality devices. The I/O devices may be controlled by an I/O controller 1023 as shown in FIG. 10C. The I/O controller may control one or more I/O devices, such as, e.g., a keyboard 126 and a pointing device 1027, e.g., a mouse or optical pen. Furthermore, an I/O device may also provide storage and/or an installation medium 1016 for the computing device 1000. In still other embodiments, the computing device 1000 may provide USB connections (not shown) to receive handheld USB storage devices. In further embodiments, a I/O device 1030 may be a bridge between the system bus 1050 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 1024a-1024n may be connected to I/O controller 1023. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 1024a-1024n may also be a headmounted display (HMD). In some embodiments, display devices 1024a-1024n or the corresponding I/O controllers 1023 may be controlled through or have hardware support for OPENGL or DIRECTX API or other graphics libraries.

In some embodiments, the computing device 1000 may include or connect to multiple display devices 1024a-1024n, which each may be of the same or different type and/or form. As such, any of the I/O devices 1030a-1030n and/or the I/O controller 1023 may include any type and/or form of suitable hardware, software, or combination of hardware and software to support, enable or provide for the connection and use of multiple display devices 1024a-1024n by the computing device 1000. For example, the computing device 1000 may include any type and/or form of video adapter, video card, driver, and/or library to interface, communicate, connect or otherwise use the display devices 1024a-1024n. In one embodiment, a video adapter may include multiple connectors to interface to multiple display devices 1024a-1024n. In other embodiments, the computing device 1000 may include multiple video adapters, with each video adapter connected to one or more of the display devices 1024a-1024n. In some embodiments, any portion of the operating system of the computing device 1000 may be configured for using multiple displays 1024a-1024n. In other embodiments, one or more of the display devices 1024a-1024n may be provided by one or more other computing devices 1000a or 100b connected to the computing device 1000, via the network 1004. In some embodiments software may be designed and constructed to use another computer's display device as a second display device 1024a for the computing device 1000. For example, in one embodiment, an Apple iPad may connect to a computing device 1000 and use the display of the device 100 as an additional display screen that may be used as an extended desktop. One ordinarily skilled in the art will recognize and appreciate the various ways and embodiments that a computing device 1000 may be configured to have multiple display devices 1024a-1024n.

Referring again to FIG. 10C, the computing device 1000 may comprise a storage device 1028 (e.g. one or more hard disk drives or redundant arrays of independent disks) for storing an operating system or other related software, and for storing application software programs such as any program related to the software 120. Examples of storage device 1028 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 1028 may be non-volatile, mutable, or read-only. Some storage device 1028 may be internal and connect to the computing device 1000 via a bus 1050. Some storage device 1028 may be external and connect to the computing device 1000 via a I/O device 1030 that provides an external bus. Some storage device 1028 may connect to the computing device 1000 via the network interface 1018 over a network 1004, including, e.g., the Remote Disk for MACBOOK AIR by Apple. Some client devices 100 may not require a non-volatile storage device 1028 and may be thin clients or zero equipment clients 1002 and/or operator clients 1003. Some storage device 1028 may also be used as an installation device 1016 and may be suitable for installing software and programs. Additionally, the operating system and the software can be run from a bootable medium, for example, a bootable CD, e.g. KNOP-PIX, a bootable CD for GNU/Linux that is available as a GNU/Linux distribution from knoppix.net.

Client device 1000 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on attestor clients 1001, user clients 1002, verifier clients 1003, digital wallet provider clients 1009, third-party cosigner clients 1005, or validator clients. An application distribution platform may include a repository of applications on a server or a cloud 1008, which attestor clients 1001, user clients 1002, verifier clients 1003, digital wallet provider clients 1009, third-party cosigner clients 1005, or validator clients 1007 may access over a network 1004. An application distribution platform may include application developed and provided by various developers. A user of an attestor client 1001, user client 1002, verifier client 1003, digital wallet provider client 1009, third-party cosigner client 1005, or validator client 1007 may select, purchase and/or download an application via the application distribution platform.

Furthermore, the computing device 1000 may include a network interface 1018 to interface to the network 1004 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 1000 communicates with other computing devices 1000' via any type and/or form of gateway or tunneling protocol e.g. Secure Socket Layer (SSL) or Transport Layer Security (TLS), or the Citrix Gateway Protocol manufactured by Citrix Systems, Inc. The network interface 1018 may comprise a built-in network adapter, network interface card, PCMCIA network card, EXPRESSCARD network card, card bus network adapter, wireless network adapter, USB network adapter, modem or any other device suitable for interfacing the computing device 1000 to any type of network capable of communication and performing the operations described herein.

A computing device 1000 of the sort depicted in FIGS. 10B and 10C may operate under the control of an operating system, which controls scheduling of tasks and access to system resources. The computing device 1000 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computing device 1000 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1000 has sufficient processor power and memory capacity to perform the operations described herein. In some embodiments, the computing device 1000 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 1000 is a gaming system. For example, the computing device 1000 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 1000 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 1000 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 1000 is a tablet e.g. the IPAD line of devices by Apple; GALAXY TAB family of devices by Samsung; or KINDLE FIRE, by Amazon.com, Inc. of Seattle, Wash. In other embodiments, the computing device 1000 is an eBook reader, e.g. the KINDLE family of devices by Amazon.com, or NOOK family of devices by Barnes & Noble, Inc. of New York City, N.Y.

In some embodiments, attestor client 1001, user client 1002, verifier client 1003, digital wallet provider client 1009, third-party cosigner client 1005, or validator client 1007 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones.

In yet another embodiment, attestor client 1001, user client 1002, verifier client 1003, digital wallet provider client 1009, third-party cosigner client 1005, or validator client 1007 is a laptop or desktop computer equipped with a web browser and a microphone and speaker system, e.g. a telephony headset. In these embodiments, attestor client devices 1001a-1001n, user client devices 1002a-1002n, verifier client devices 1003a-1003n, digital wallet provider client devices 1009a-1009n, third-party cosigner client devices 1005a-1005n, or validator client devices 1007a-1007n are web-enabled and can receive and initiate phone calls. In some embodiments, a laptop or desktop computer is also equipped with a webcam or other video capture device that enables video chat and video call.

In some embodiments, the status of one or more machines 1001, 1002, 1003, 1005, 1007 and/or 1009 in the network 1004 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 11:
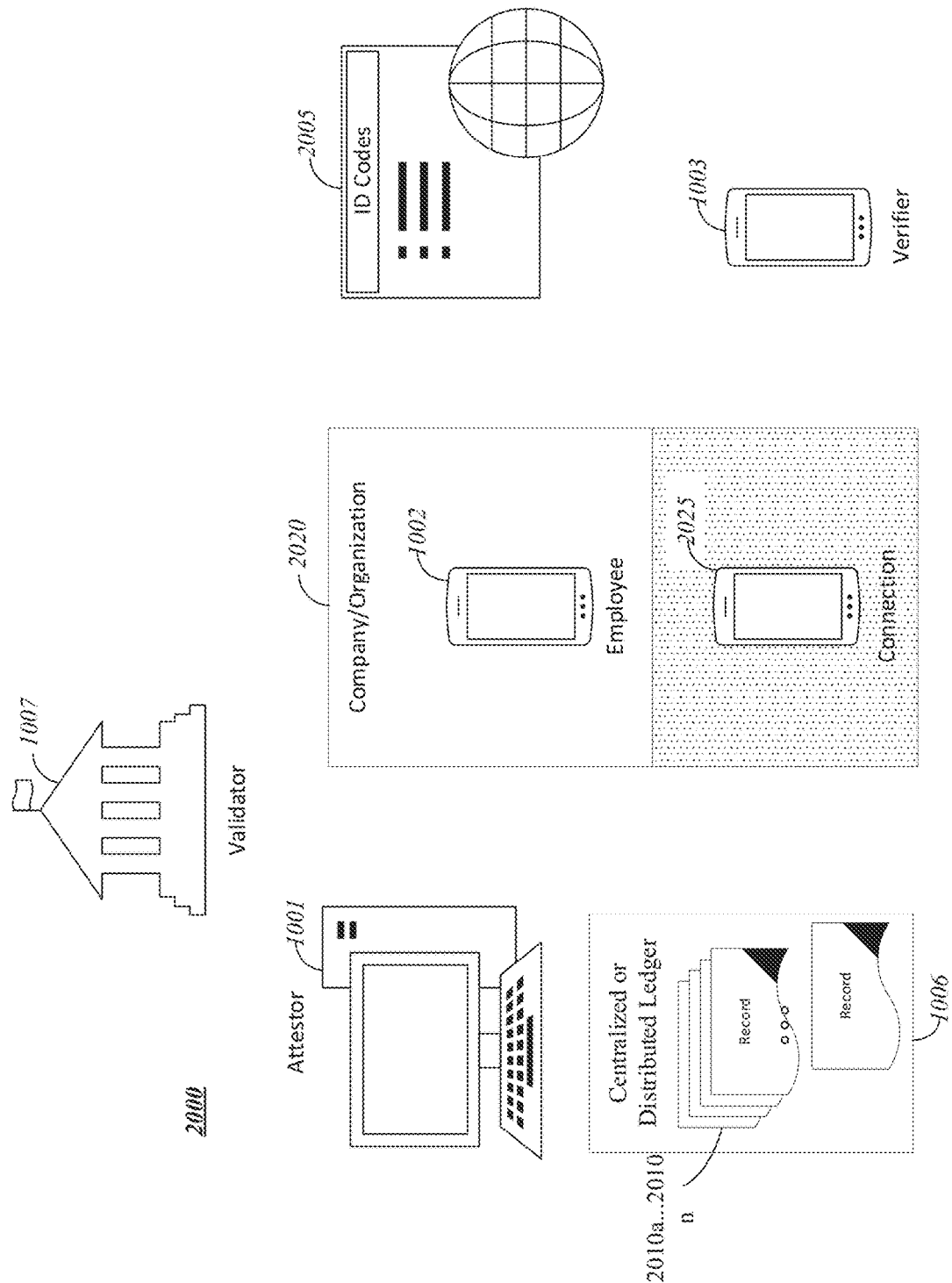
FIG. 11 depicts an implementation of some of the architecture of an identity verification platform used to generate ID codes for online verification.

In a general overview, FIG. 11 shows a digital identity platform 2000 that individuals may use to verify the legitimacy of a company and/or organization and/or entity and verify a users' relationship with the company and/or organization and/or entity. In examples, digital identity platform 2000 may include company/organization 2020. Company/organization 2020 includes one or more users 1002, which can be employees or representatives of company/organization 2020, such a user will hereafter be identified as "employee user 1002" to differentiate them from other users in digital identity platform 2000. In embodiments, company/organization 2020 may desire to form a relationship with one or more users 2025, which can be advisors, associates, or other users with a relationship with company/organization 2020 who are not employee users 1002, such a user will hereafter be identified as "connection user 2025" to differentiate them from other users in digital identity platform 2000. Digital identity platform 2000 may include one or more verifiers 1003, which can be any third-party individual wishing to verify a relationship between a connection user 2025 and a company/organization 2020. Digital identity platform 2000 may include one or more centralized or distributed ledgers 1006, each centralized or distributed ledger comprising a plurality of records 2010a-2010n. Digital identity platform 2000 may include attestor 1001, and validator 1007. In examples, digital identity platform 2000 includes ID codes platform 2005.

Referring to FIG. 11 in more detail, in some embodiments, digital identity platform 2000 includes one or more attestor 1001. Attestor 1001 may include, without limitation, a company, person, computer-implemented algorithm, decentralized computing system, a client-server application, a desktop application, or a mobile application. In embodiments, an attestor is accessed in digital identity platform 2000 through an attestor console available on a client or device. In examples, Attestor 1001 is configured to confirm, authenticate, and attest to information from an individual, a company/organization 2020, or any other entity and to create a record 2010 on centralized or distributed ledger 1006. In some embodiments, attestor 1001 may have a private and a public encryption key. In some embodiments, attestor 1001 may be integrated with or coupled to memory 1022. In some embodiments, memory 1022 may include any type and form of storage, such as a database or file system. Memory 1022 may store data such as parameters and scripts corresponding to the choices made by attestor 1001, e.g. as described above for authenticating and certifying information. Attestor 1001 may comprise a program, service, task, script, library, application or any type and form of executable instructions or code executable on one or more processors. Attestor 1001 may be combined or separated into one or more modules, applications, programs, services, tasks, scripts, libraries, applications, or executable code.

In examples, digital identity platform 2000 includes validator 1007. Validator 1007 may include without limitation an identity validation service provider, a biometric device, any entity who knows an individual or an entity personally, a notary, a credit reporting agency, a government, a school, a relative, another user, and the like. In some examples, a validator may include without limitation someone or something that confirms the validity, accuracy, ownership, or other proprietary aspect of information or property belonging to an entity. In some embodiments, validator 1007 may be integrated with or coupled to memory 1022. In some embodiments, memory 1022 may include any type and form of storage, such as a database or file system. Memory 1022 may store data such as parameters and scripts corresponding to the choices made by a validator 1007, e.g., as described above for confirming the validity, accuracy, ownership, or other propriety aspect of information. Validator 1007 may comprise a program, service, task, script, library, application or any type and form of executable instructions or code executable on one or more processors. Validator 1007 may be combined or separated into one or more modules, applications, programs, services, tasks, scripts, libraries, applications, or executable code.

Digital identity platform 2000 may include company/organization 2020. In embodiments, company/organization 2020 may be any individual, company, organization, group, team, group of individuals or entity with which any other any individual, company, organization, group, team, group of individuals or entity may have an association with. In some embodiments, company/organization 2020 has one or more associated domains, for example www.company.com, on which company/organization 2020 displays information. In some embodiments, company/organization may have one or more other virtual representations on the internet, for example company/organization 2020 may have a LinkedIn page (LinkedIn Corporation, Sunnyvale Calif.), or a twitter feed (Twitter Inc., San Francisco, Calif.), which may be used to verify the legitimacy of company/organization 2020. Company/organization 2020 may be a corporation, a limited liability company, a partnership, a group, a non-profit organization, a school, and institution, a college or university, a firm, or any other person or collection of people with a common purpose. Company/organization 2020 may have a physical location and address or may be virtual.

In some embodiments, company/organization 220 has individuals that are associated with company/organization 2020, for example employee 1002. Employee 1002 may be a member of company/organization 2020, a contractor for company/organization 2020, a representative of company/organization 2020, a principal or owner of company/organization 2020 or any other individual that is qualified, entitled, appointed, or agreed to represent aspects of company/organization 2020. Employee 1002 may also refer to a device of an employee or associated with an employee, such as a mobile device, laptop computer, portable computer, desktop computer, etc. or any other such device.

Digital identity platform 2000 may include connection client 2025 (also generally referred to as local connection machines(s) 2025, connection client(s) 2025, connection client node(s) 2025, connection client machine(s) 2025, connection client computer(s) 2025, connection client device(s) 2025, connection endpoint(s) 2025, or connection endpoint node(s) 2025. In examples, connection 2025 may wish, or been invited to, establish a relationship with company/organization 2020. In some embodiments, connection 2025 may be known as an expert in a field that is relevant to company/organization 2020, such that it would benefit company/organization 2020 to publicize the relationship between connection 2025 and company/organization 2020. In embodiments, it may benefit connection 2025 to be publicly associated with company/organization 2020. In embodiments, connection 2025 and company/organization agree that there is a relationship between connection 2025 and company/organization 2020. In some embodiments, connection 2025 is known to attestor 1001 and has had information previously attested to and certified on a centralized or distributed ledger by attestor 1001. In examples, connection 2025 is not known to attestor 101.

Digital identity platform 2000 may include centralized or distributed ledger 1006, together with one or more records 2010a-2010n. A digital ledger is a record of associations, for example between people and information or people and things. A centralized ledger or centralized database is a system where data is stored in a master database with a single point of control. A gatekeeper party acts on behalf of people to modify the state of the ledger. In a distributed ledger, any party on the network 1004 has access to the ledger. The distributed ledger is replicated among many different nodes in network 1004, and a consensus algorithm ensures that each node's copy of the ledger is identical to every other node's copy. In some embodiments, attestor 1001 must use cryptographic signatures to create records 2010 on a centralized or distributed ledger 1006.

In some embodiments, an attestation address is the address at which a record from attestor 1001 can be found on centralized or distributed ledger 1006. In examples, for a single signature record, a hash function, for example the P2PKH algorithm, maybe be applied to an input to create an attestation address. In examples, an attestation address may be a multisig attestation address, wherein an input is signed with public keys of all cosigners according to an "M of N" multisig redeem script cryptographic signing protocol. Potential cosigners can include, but are not limited to, digital wallet provider client 1009, attestor 1001, user client 1002, and third-party cosigner client 1005. Multi-signature records at an attestation address may be revoked if M-of-N cosigners sign a transaction "spending" the record from the attestation address. In implementations, a multisig attestation address comprises two or more public keys and is created using the Pay To Script Hash (P2SH) protocol.

In some embodiments, digital identity platform 2000 includes verifier 1003. Verifier 1003 may be any individual, business, advisor, connection, associate, company, organization, or any other entity that wishes to verify a relationship between connection 2025 and company/organization 2020. In some examples, verifier 1003 wishes to ascertain, for example for an individual displayed on a website of a company/organization 2020 and purported to have a relationship with the company/organization 2020, whether the individual is a genuine individual, and/or whether the individual truthfully holds the purported relationship with the company/organization 2020.

Digital identity platform 2000 includes ID codes platform 2005. In some examples, verifier 1003 will traverse to ID codes platform 2005 if they interact with an ID codes badge associated with connection 2025 on a website of company/organization 2020. In embodiments, ID codes platform 2005 is configured to display information about connection 2025, for example LinkedIn profile of connection 2025 and/or twitter account of connection 2025. In some examples, for a connection 2025, ID codes platform 2005 is configured to display information on one or more connections of connection 2025, which may, in some embodiments, include a role for the connection and/or a URL for the connection. In embodiments, ID codes platform 2005 is configured to display one or more verified connections of company/organization 2020. In embodiments, one or more verified connections of company/organization 220 are organized by relationship between connections 225 and company/organization 2020.

ID codes platform 2005 may comprise a program, service, task, script, library, application or any type and form of executable instructions or code executable on one or more processors. ID Codes platform 2005 may be combined or separated into one or more modules, applications, programs, services, tasks, scripts, libraries, applications, or executable code. In some embodiments, ID codes platform 2005 may be integrated with or coupled to memory 1022. In some embodiments, the memory may include any type and form of storage, such as a database or file system. Memory 1022 may store data such as parameters and scripts corresponding to the choices ID codes platform 2005.

In a general overview, FIG. 12 depicts a method in an identity verification platform used to generate user ID codes for online verification. In some embodiments, the system receives a request for registration of an entity from a company representative, who is a user of the system (step 1210). In embodiments, the system verifies the identity of the user and the relationship between the user and the identity (step 1220). In examples, the system may verify that the entity is legitimate (step 1230). The system may receive from the use an invitation for a relationship between the entity and an individual (step 1240). In embodiments, the system may transmit to the individual a request for approval of the relationship between the entity and the individual (step 1250). The system may receive approval of the relationship from the individual (step 1260). In some embodiments, the system transmits confirmation of the relationship to the user (step 1270). The system may create a custom badge representing the relationship between the individual and the entity in step 1280.

Figure 16:
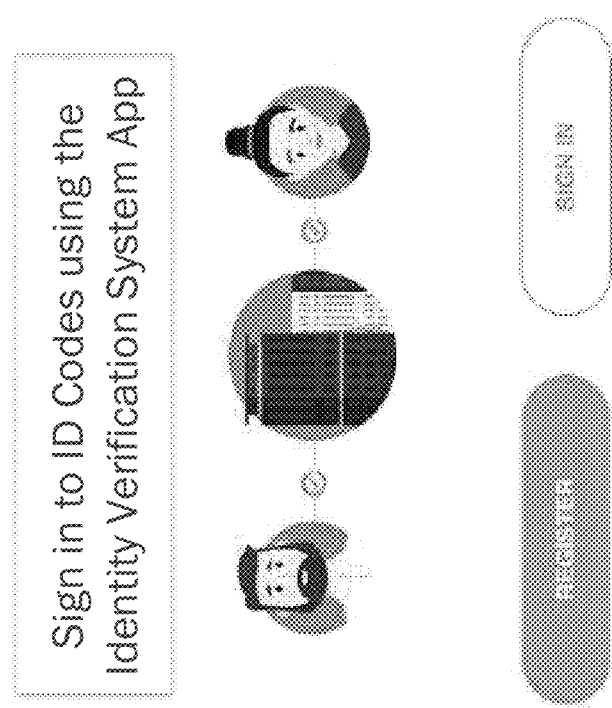
FIG. 16 illustrates an example of a user interface to sign in or register to use ID codes using an identity verification system application, according to some implementations.

Referring to FIG. 12 in more detail, in step 1210, a company representative (also known as user 1002) sends a request to identity verification platform 2000 to register the company/organization 2020 (also known as the entity). In examples, user 1002 must first sign on to an identity verification system to send the request to register company/organization 2020. User 1002 may be presented with a user interface, such as the user interface shown in FIG. 16, in order to sign in to the identity verification platform 2000. In some embodiments, user 1002 is not registered with the identity verification system, and to proceed to use identity verification platform 2000, user 1002 must interact with the user interface in order to register with the identify verification system. In some embodiments, user 1002 may be presented with a QR code, for example a QR code similar to that shown in FIG. 17, which user 1002 can scan with their phone in order to be directed to a website to register with the identity verification system, or in order to be prompted to install an application e.g. on a mobile device, required to register user 1002 with the identity verification system. In some embodiments, when user 1002 chooses to register with the identity verification system, user 1002 will be taken to an interface where user 1002 can input personal information required for the identity verification system to verify the user. In some embodiments, if user 1002 is registered with the identity verification system, user 1002 is prompted by identity verification platform 2000 to complete their profile information to be storage and used by identity verification platform 2000. In some examples, user 1002 may be presented with a graphical user interface requesting the profile information requested by identity verification platform 2000. In some embodiments, FIG. 18 is an illustrative example of a graphical user interface that may be presented to user 1002 to create a personal profile in identity verification platform 2000.

In step 1220, identity verification platform 2000 verifies the identity of user 1002 that sent the request to identity verification platform 2000 to register the company/organization 2020. In some embodiments, identity verification platform 2000 may request that user 1002 sign into the identity verification system, and if user 1002 has a valid log in to the identity verification system, identity verification platform 2000 ascertains that user 1002 has been previously verified by the identity verification system. In step 1220, once identity verification platform 2000 has verified user 1002, identity verification platform 2000 additionally verifies the relationship between user 1002 and company/organization 2020. In some embodiments, identity verification platform 2000 searches one or more databases, social media networks, registers, lists, or other sources of information to verify the relationship between user 1002 and company/organization 2020. For example, identity verification platform 2000 may search on LinkedIn (LinkedIn Corporation, Palo Alta, Calif.) to see if user 1002 list company/organization 2020 as their current employer. In some examples, identity verification platform 2020 may search the company/organization 2020's website to determine if user 1002 is listed as an employee or team member of the company on that website.

In step 1230, identity verification platform 2000 verifies that company/organization 2020 is a legitimate company. In some embodiments, information which may be used to verify the legitimacy of company/organization 2020 may be available from trusted sources such as Bloomberg, Inc. (Bloomberg, New York City, N.Y.), GlobeData (The Globe Program, Boulder, Colo.), ICD Research (ICD Research Limited, London, UK), MarketLine (MarketLine, Manchester, UK) PrivCo (PrivCo, New York City, N.Y.), SGA (SGA, Boston, Mass.), ExecutiveTracker (Executive Trackers LLC, Los Gatos, Calif.), Timetric (Trimeric, London, UK), and World Market Intelligence (World Market Intelligence Limited, London, UK). In some embodiments, identity verification platform 2000 may verify that a company or organization is legitimate via a certificate exchange with a trusted authority that identifies the company or organization as legitimate. In some embodiments, identity verification platform 2000 may verify that a company or organization is legitimate based on the presence of a record in a distributed or centralized ledger corresponding to the company or organization, and, in some implementations, that the record is associated with a non-zero currency value. In some embodiments, once identity verification platform 2000 verifies that company/organization 2020 is legitimate, identity verification platform 2000 creates a record of the company in a database or storage.

Figure 29:
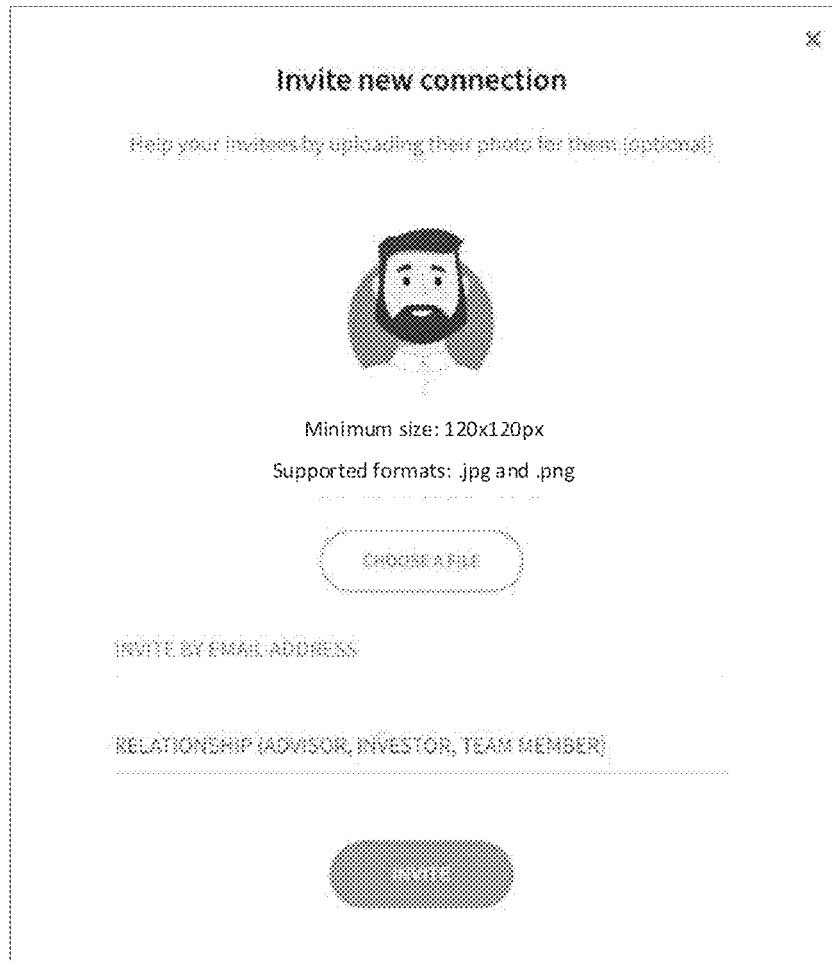
FIG. 29 illustrates an interface for inviting new connections in an identity verification platform, according to some implementations.

In step 1240, user 1002 creates a request to invite connection 2025 to have a given relationship to or with company/organization 2020. In embodiments, user 1002 may create a request to invite existing or new employees to be team members of company/organization 2020. In some examples, user 1002 may create a request to invite connections 2025 to be advisors of company/organization 2020. In some embodiments, user 1002 may be presented with a graphical user interface, for example as shown in FIG. 29, that may be used to invite a new connection. User 1002 may upload a photo of the new connection, for example from a file from a device of user 1002 or from a cloud storage. In examples, user 1002 may invite connection 2025 using the email address of connection 2025. User 1002 may, as part of the invitation to connection 2025, specify the relationship of connection 2025 with company/organization 2020. In some examples, user 1002 may interact with a selection on a graphical user interface in order to cause identity verification platform 2000 to receive a request to invite connection 2025. For example, user 1002 may click with an "invite" button on a graphical user interface on user 1002's device.

In step 1250, responsive to receiving a request from user 1002 to invite connection 2025 to company/organization 2020, identity verification platform 2020 may transmit to connection 2025, a request for approval of the relationship between the company/organization 2020 and connection 2025. In some embodiments, identity verification platform 2000 sends a message to connection 2025 using the email address for connection 2025 that was provided by user 1002. In some examples, identity verification platform 2000 raises an alert or causes a notification to be sent from an application on connection 2025s device, for example on an identity verification system application on the device of connection 2025. In embodiments, connection 2025 has already registered with the identity verification system and has an authenticated profile with the identity verification system. Connection 2025 may then be prompted by a message, such as an email message, a text message, or an in-app message, to log into the identity verification system to view the invitation. In examples, connection 2025 has not registered with the identity verification system. Connection 2025 may then be prompted with a message, such as an email message or a text message, to download the application for the identity verification system of the device of connection 2025 or may be presented with a link that connection 2025 can click on to traverse to a website of the identity verification system in order to register with the identity verification system and have their identity verified. In some embodiments, connection 2025 may only see the invitation from user 1002 once connection 2025 has been fully authenticated by the identity verification system.

In step 1260, connection 2025 may review the invitation from user 1002. In examples, connection 2025 may sign in to the identity verification system and see the invitation as a message or alert in identity verification system. In examples, when connection 2025 opens or selects the message or alert in the identity verification system, connection 2025 traverses to a website for identity verification platform 2000. In some examples, when connection 20205 opens or selects the message or alert in the identity verification system, an application for identity verification platform 2000 opens on connection 2025's device, and connection 2025 may view the invitation from user 1002 in the application. Connection 2025 may be able to select or open the invitation to view parameters and/or details of the invitation. In some examples, connection 2025 may be presented with the details of the relationship to the company/organization (for example, team member, advisor, employee, etc.), and the name of the user 1002 that invited connection 2025 to have a relationship with company/organization 2020. In embodiments, connection 2025 may approve or reject the relationship invitation from user 1002 with company/organization 2020. In embodiments, when connection 2025 approves or rejects the relationship invitation from user 1002, a message representing the approval or rejection is sent to identity verification platform 2000.

In step 1270, responsive to receiving the approval or rejection of the relationship with company/organization 2020 from connection 2025, identity verification platform 2000 transmits confirmation of the relationship of connection 2025 with company/organization 2020 to user 1002. In some embodiments, the confirmation is sent to user 1002 via the identity verification platform 2000 console and/or dashboard for the company/organization. In examples, identity verification platform 2000 may send a message to user 1002, for examples, and email message, a text message, or a message that triggers a notification on a device of user 1002, requesting that the user log on to identity verification platform 2000. In some embodiments, message to user 1002 may have a link that user 1002 may click on to be directed to the web dashboard for company/organization 2020 on identity verification platform 2000.

Figure 27:
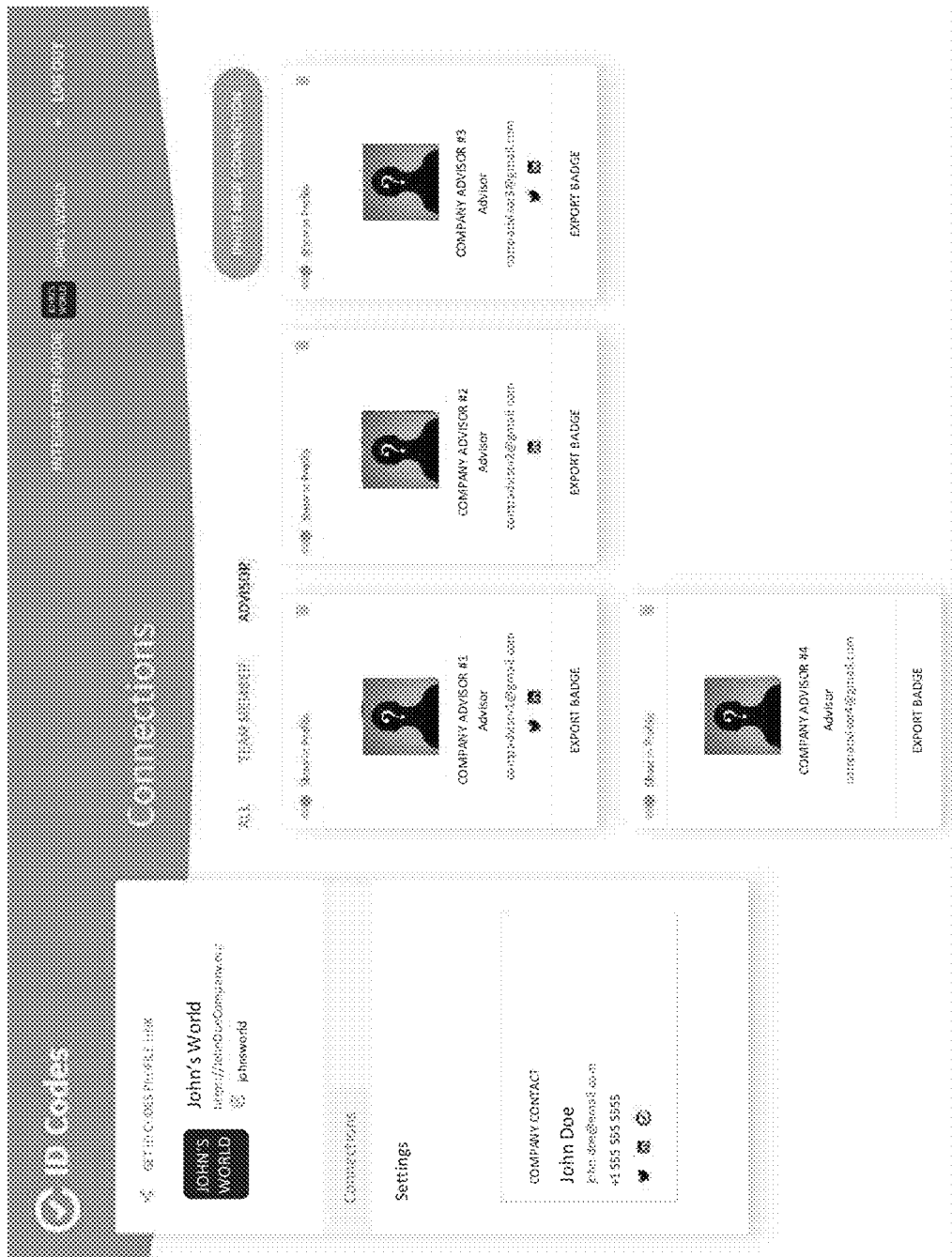
FIG. 27 illustrates an entity dashboard in an identity verification platform illustrating connections of an entity, according to some implementations.

In step 1280, identity verification platform 2000 creates a custom badge representing the approved relationship between connection 2025 and company/organization 2020. In some embodiments, the badge may be rendered on a company/organization 2020 webpage, dashboard, or console on identity verification platform 2000. In some embodiments, FIG. 27 shows an illustration of badges for connections for company/organization 2020 rendered on identity verification platform 2020. In some examples, user 1002 of company/organization 2020 may export a badge of connection 2025, for example by clicking on the badge for connection 2025. In embodiments, the rendered badge on identity verification platform 2020 shows a picture for connection 2025, the name of connection 2025, the relationship between connection 2025 and company/organization 2020, the email address for connection 2025, and optionally any other profile information for connection 2025, for example a link to connection 2025's LinkedIn profile, or twitter feed, or any other social network feed for connection 2025. In embodiments, connections 2025 of company/organization 2020 may be organized on different pages according to the type of connection. For example, connections that are advisors to company/organization 2020 may be shown on one page, and connections that are team members of company/organization 2020 may be shown on a second page, and all connections of company/organization 2020 may be shown on a third page.

In a general overview, FIG. 13 depicts a method for creating and exporting a verified individual's badge on a company/organization 2020's website. User 1002 may send an invitation for a relationship between company/organization 2020 and connection 2025 (step 1310). User 1002 may receive an approval notification of the relationship between company/organization 2020 and connection 2025 (step 1320). In step 1330, user 1002 may export code for connection 2025 from the badge for connection 2025. User 1002 may import the code exported from the badge for connection 2025 to a website of company/organization 2020 (step 1340). In step 1350, connection 2025's badge representing the relationship between connection 2025 and company/organization 2020 may render on a website of company/organization 2020.

Referring to FIG. 13 in more detail, in step 1330, user 1002 may export code for connection 2025 from the badge for connection 2025, for example by clicking on the badge of connection 2025 on a dashboard or company console of identity verification platform 2000. In some examples, clicking on the badge of connection 2025 causes the download of code to a device of user 1002. In some examples, the downloaded code for the badge may include an html object tag, and Iframe, a flash object, or java code. User 1002 may import the exported code from the badge for connection 2025 to a website of company/organization 2020 (step 1340). In some examples, user 1002 may associate the exported badge code with a picture, a name, a biography, a description, and/or any other identification of connection 2025 on the website of company/organization. In step 1350, connection 2025's badge representing the relationship between connection 2025 and company/organization 2020 may render on a website of company/organization 2020. In some embodiments, connection 2025's badge will only render if the domain of the website that the code has been imported to matches the one or more domains that user 1002 registered as being associated with company/organization 2020, and which identity verification platform 2000 verified as being associated with company/organization 2020.

Figure 14:
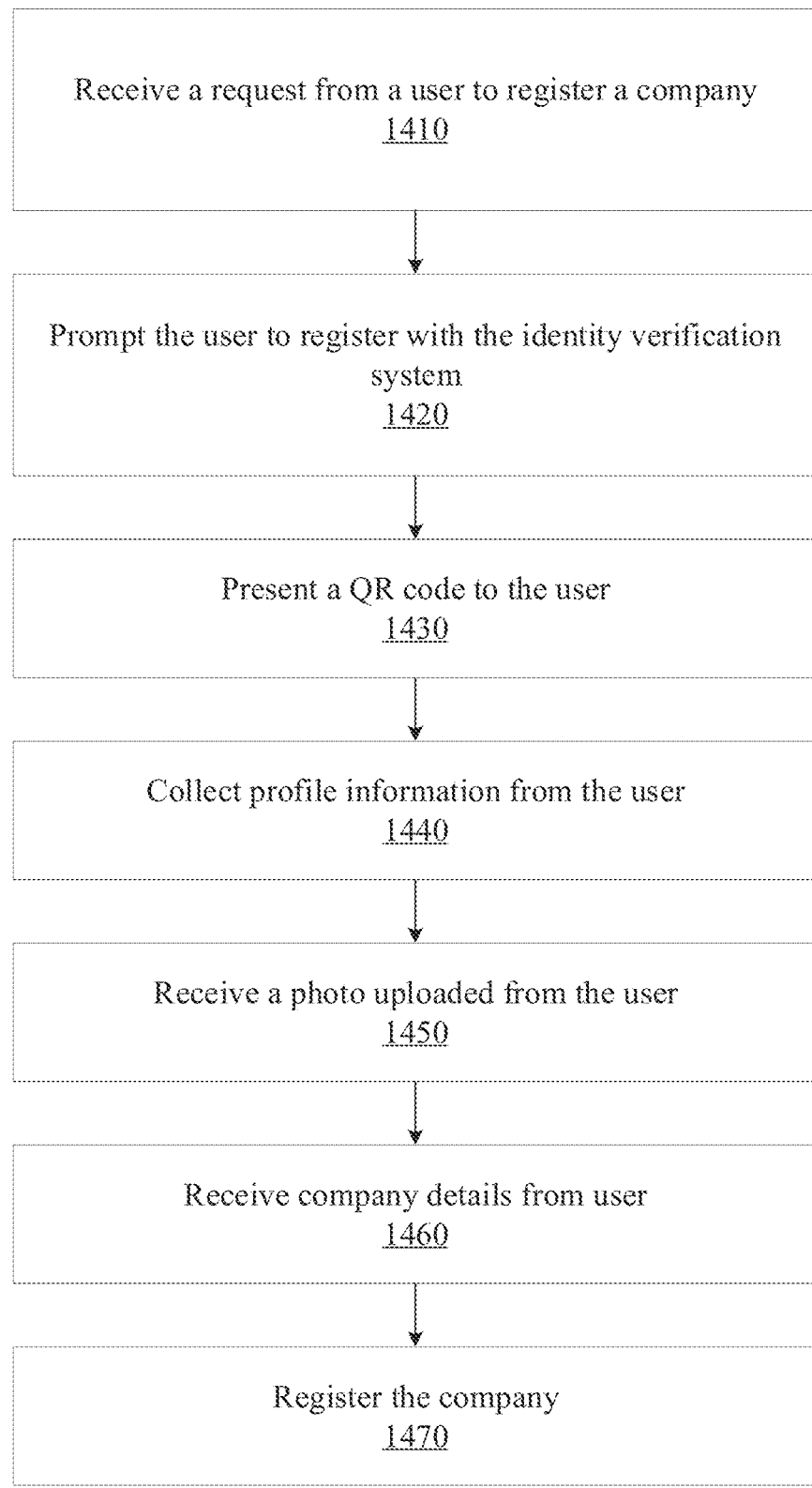
FIG. 14 depicts a method for registering a company with an online verification system, according to some implementations.
Figure 17:
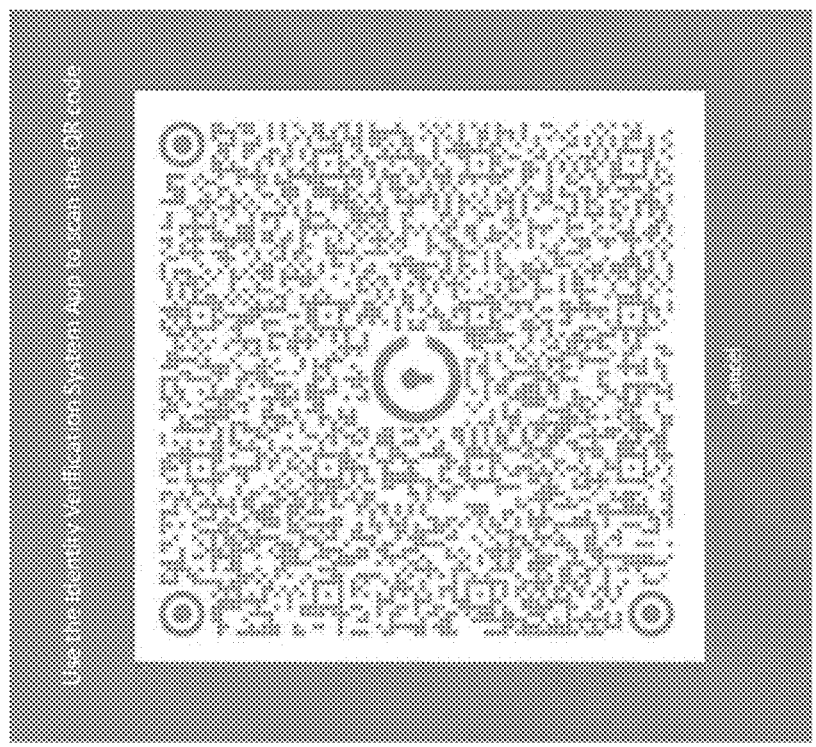
FIG. 17 illustrates an example of a QR code that a user can scan in order to download an identity verification system application, according to some implementations.
Figure 19:
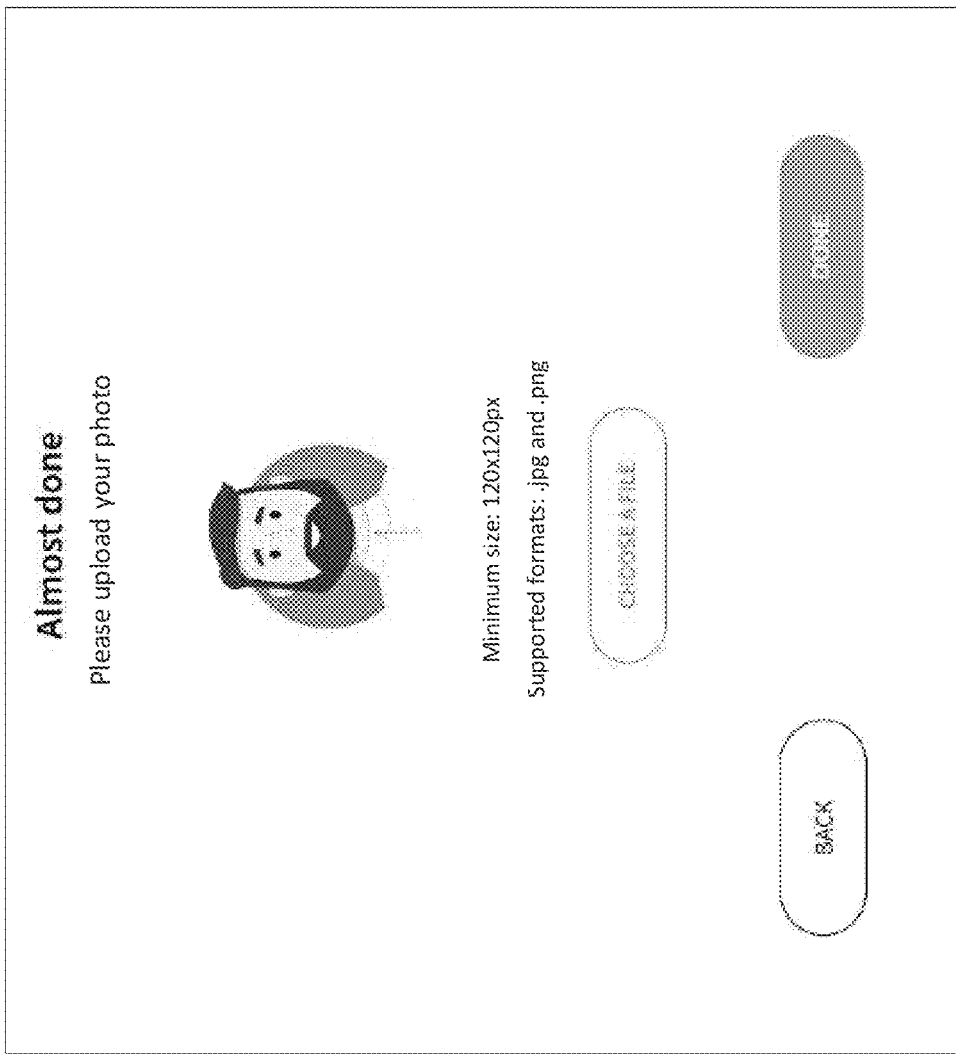
FIG. 19 illustrates an interface for a user to upload a photo using for a profile using an identity verification platform, according to some implementations.
Figure 20:
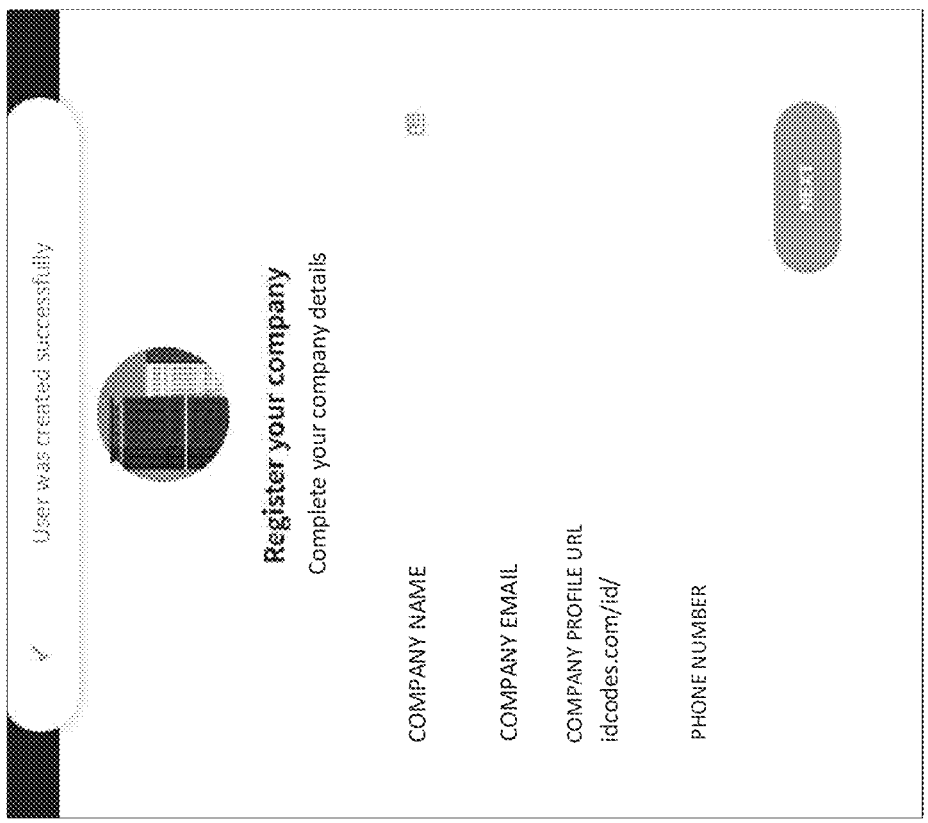
FIG. 20 illustrates an interface for a user to register an entity using an identity verification platform, according to some implementations.
Figure 21:
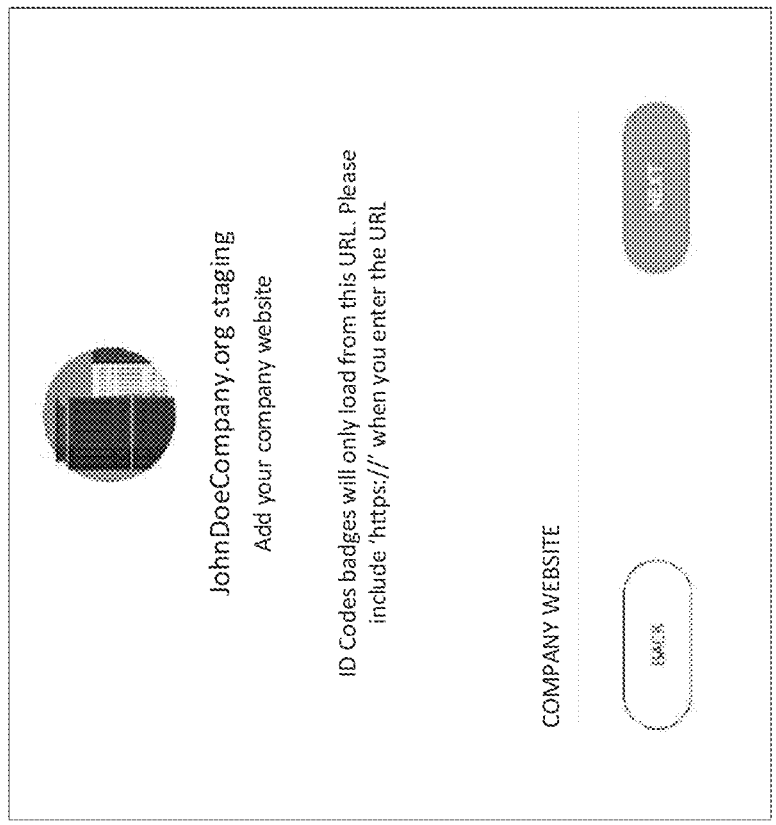
FIG. 21 illustrates an interface for a user to register one or more entity domains to be associated with the entity using an identification verification platform, according to some implementations.

FIG. 14 depicts a method for registering a company with an identity verification platform. Identity management platform 2000 receives a request from user 1002 to register company/organization 2020 and ascertains that user 1002 does not have an account with the identity verification system. Identity verification platform 2000 prompts user 1002 to register with the identity verification system (step 1410). In some examples, identity verification platform 2000 presents a QR code to user 1002 (step 1420), for example a QR code as illustrated in FIG. 17. In step 1430, user 1002 submits profile information to identity verification platform 2000, for example using a graphical user interface such as is illustrated in FIG. 18. In some embodiments, user 1002 submits their profile information to the identity verification system instead of the identity verification platform 2000. In some examples, user 1002 uploads a photo to identity verification platform 2000, for example using a graphical user interface such as is illustrated in FIG. 19. (step 1440). In some embodiments, user 1002 submits their photo to the identity verification system instead of the identity verification platform 2000. The identity verification platform 2000 receives a request from user 1002 to register company/organization 2020 (step 1450), for example using a graphical user interface such as is illustrated in FIG. 20 and in FIG. 21 and receives company details from user 1002 (step 1460). In some embodiments, user 1002 enters one or more of the name of company/organization 2020, an email address of company/organization 2020, a subdomain for a company profile URL that is based on the identity verification platform URL, and a phone number for company/organization 2020. Once the identity verification system has authenticated the user (step 1470), then the identity verification platform 2000 proceeds to verify and register the company/organization 2020 (step 1480).

Figure 15:
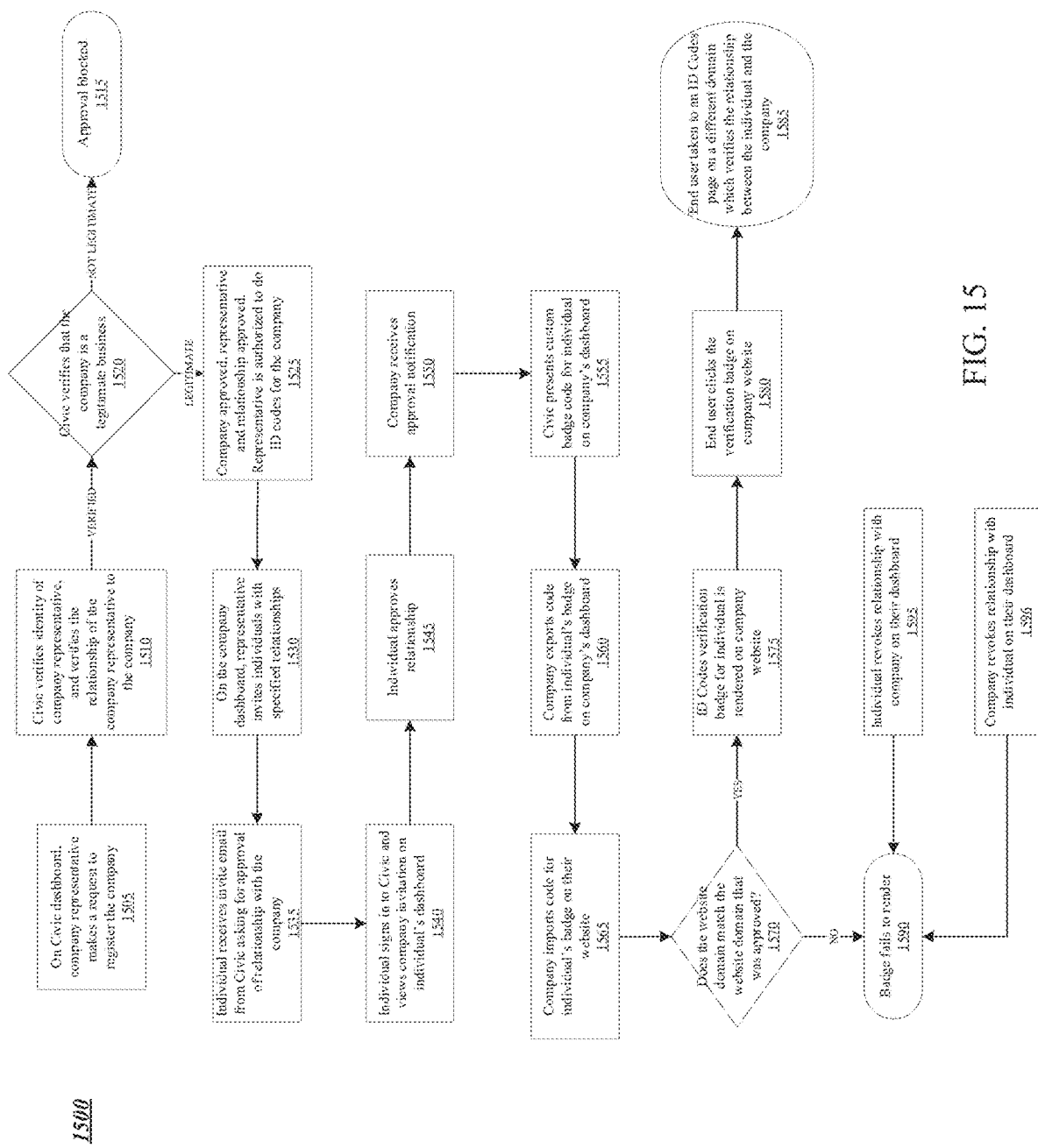
FIG. 15 depicts some of the functions of an example of a system for online verification, according to some implementations.

In general overview, FIG. 15 illustrates an online verification system. In step 1505, a company representative (for example, user 1002) makes a request to register the company (for example, company/organization 2020) on identity verification platform 2000 dashboard. The request may be transmitted by a first device to a second device (e.g. from a mobile device, laptop computer, desktop computer, or other such device of the company representative, to a server or other device hosting identity verification platform 2000). In step 1510, identity verification platform 2000 verifies the identity of the company representative and verifies the relationship of the company representative to the company. The identity verification platform 2000 verifies that the company is a legitimate business in step 1520. As discussed above, verification of the identity of the representative, the relationship, and the legitimacy of the business may be performed via a certificate exchange with a trusted authority, identifying a record in a distributed or centralized ledger corresponding to the representative and/or business, via a web search for a social media profile or other profile associated with the representative or business, or by other such means. If the company is not a legitimate business the approval is blocked in step 1515. In step 1525, the company is approved, the company representative is approved, and the relationship between the company representative and the company is approved, and the company representative is authorized to do ID codes for the company. In step 1530, the company representative invites individuals with specified relationships to the company to be connections of the company. Upon receiving the invitation, the individual signs in to the identity verification platform and views the company's invitation in step 1540 and approves the relationship in step 1545. In step 1550, the company receives the approval notification. In some embodiments, invites with the claimed relationship between the company and individual are sent via email to specific individuals. In other embodiments, invites may be provided via push notifications to mobile devices, via a web page visited by the individuals, or any other such method. In examples, claimed relationships include but are not limited to advisor, investor, employee etc. In some embodiments, the individual creates their own biography in identity verification platform 2000 with such as their verified legal name.

In step 1555, identity verification platform 2000 generates customized code in the form of a badge for the individual. The company exports code from the individual's badge on the company dashboard of identity verification platform 2000 in step 1560. In step 1565, the company imports the code for the individual's badge on its website to enable verification that the claimed relationship to the individual is genuine. When a company attempts to render a badge, the identity verification platform verifies that the domain matches what was approved in step 1570. The badge can only be rendered on the web site within the domain or domains belonging to the company. In some embodiments, the identity verification platform is responsible for maintaining a list of domains that each badge is authorized to be rendered on. In step 1575, if the domain matches what was approved, the ID Codes verification badge for the individual is rendered on the company website. In step 1580, the third-party end user can click on the verification badge on the company website and in step 1585 the end user is traversed to an ID codes page on a different domain which verifies the relationship between the individual and the company. In examples, the ID codes page on the different domain is only valid for a short period of times, for example for 5 minutes, 10 minutes, 15 minutes, 30 minutes, 60 minutes, 2 hours, 12 hours, 24 hours, or any other time limited period, after which the page expires and cannot be viewed without the third-party end user again clicking on the ID codes verification badge for the individual on the company website. In some embodiments, the third-party user can see the individual's verified bio showing the company relationship. In step 1590, if the domain doesn't match what was approved, the badge fails to render.

Either the individual in step 1595 or the company in step 1596 may revoke the relationship at any time and as a consequence the badge will no longer render as shown in step 1590. All participants are notified if the relationship is revoked.

In some examples, JavaScript or other executable code that may be rendered by a web browser can be used for badge code. In some examples, an identity verification platform can automate various mechanisms to verify if a company is legitimate.

A system according to the current disclosure is particularly useful for an ICO or initial currency offering. In an ICO, the people that are behind the company offering the ICO are very important to the credibility of the offer. When a prospectus is produced for such an IPO, typically the board members or other high-profile members of the group putting the ICO together are displayed on the company's website that is doing the ICO. Just the association of important people with the ICO may encourage people to buy in, raising a significant amount of money for the company.

In some instances, companies may falsely represent that important people are associated with the ICO when they are not and have not agreed to be associated with the ICO. The company can put the people's pictures up on the website, and the general public has no way to know if this person's involvement is true or not.

The present disclosure can be used to verify that the person is associated with the company, or with the ICO, or more generally with any offering that is done online.

In some embodiments a company may register with an identity verification system. A validator will verify information about the company and attest to information about the company. The company may also invite people into the company, in whatever capacity the person would be related to the company. For example, the company may invite a person as a board member, or as an advisor, or as an auditor, or as a CEO. The validator will verify all of the people that are invited to the company, both individually in their own right, and also in their association with the company. The validator will then be able to attest that the person is who they say they are, and also that they perform the function in the company that they were invited to.

Once the validator has attested to this information, the company is issued an ID code or badge for that individual. The company may display the ID code of badge on their website. In some embodiments, the ID code or badge may only be displayed on their website, or on a website associated with the company. In some embodiments, the validator has additionally validated the domains or URLs that are associated with the company, and the badge will only work on those URLs.

In some examples, the company may put a picture of the individual on the website and the picture may appear with a check mark beside it, or a badge icon, or any other representation, visual or audio, that indicates to a viewer of the website that that person has been authenticated by a validator. In some embodiments, a viewer of the website may click on the picture or click on the indication of validation, and the viewer may be taken to a webpage where they can read all the essential information about the individual. In some examples, the viewer can click on the indication of validation and be taken to the validator's website to view the information on the individual and to view the individual's association with the company that the validator has attested to. In some embodiments, the website viewer may be directed to another website where the ID codes are accessible, for example a website such as IDcodes.com.

Figure 22:
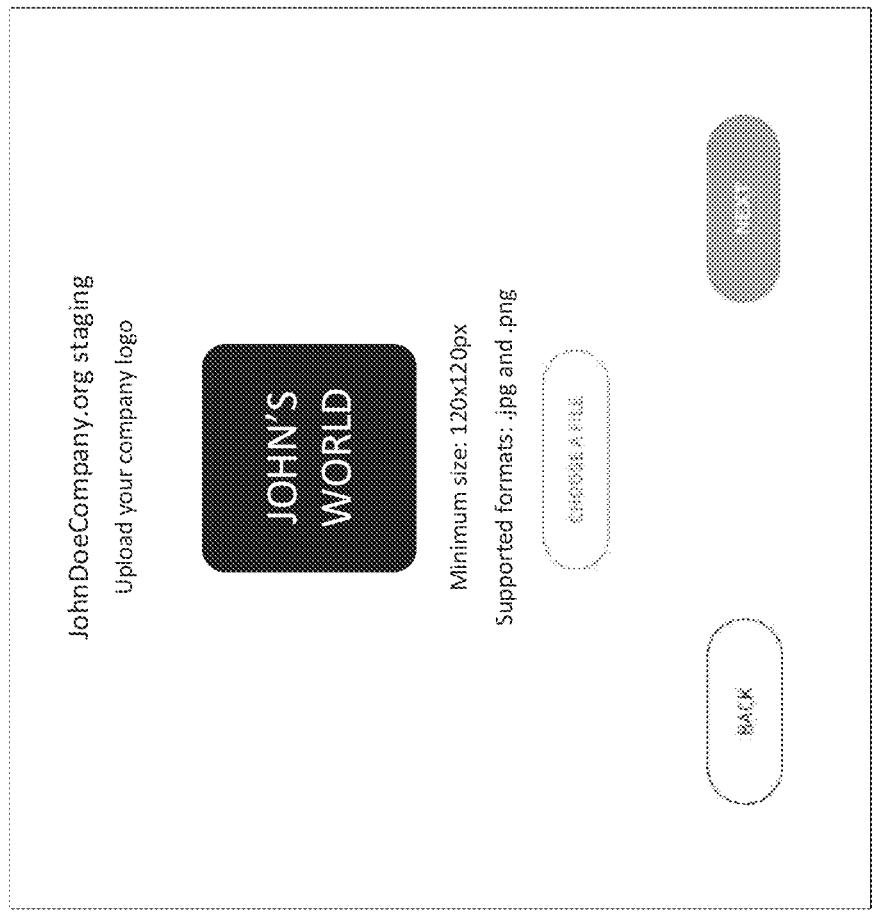
FIG. 22 illustrates an interface for a user to upload a logo of an entity to be associated with the entity using an identification verification platform, according to some implementations.

FIG. 22 illustrates an example of a graphical user interface via which user 1002 may upload a logo of company/organization 2020, to become part of the profile for company/organization 2020.

Figure 23:
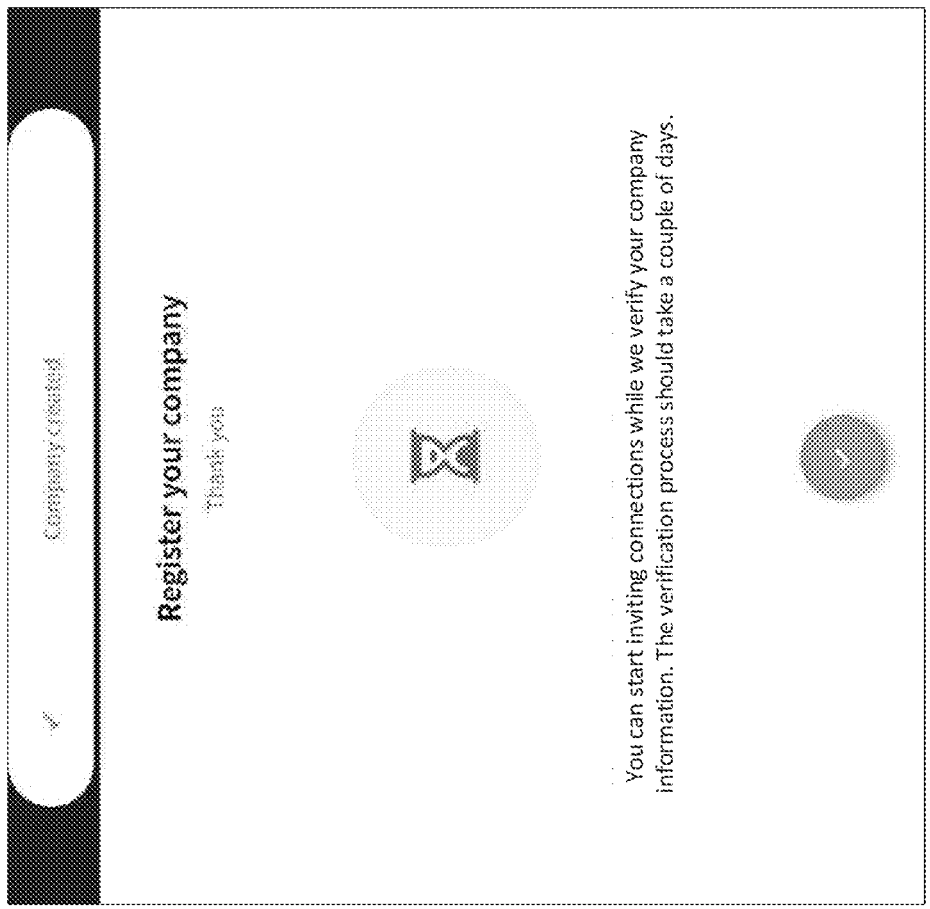
FIG. 23 illustrates an interface to provide verification to a user that an entity registration process is complete and entity verification is pending, using an identification verification platform, according to some implementations.

FIG. 23 illustrates an example of a graphical user interface that user 1002 may see after information for company/organization 2020 has been entered into identity verification platform 2000, indicating that user 1002 may start inviting connections while identity verification platform 2000 verifies the company/organization information.

Figure 24:
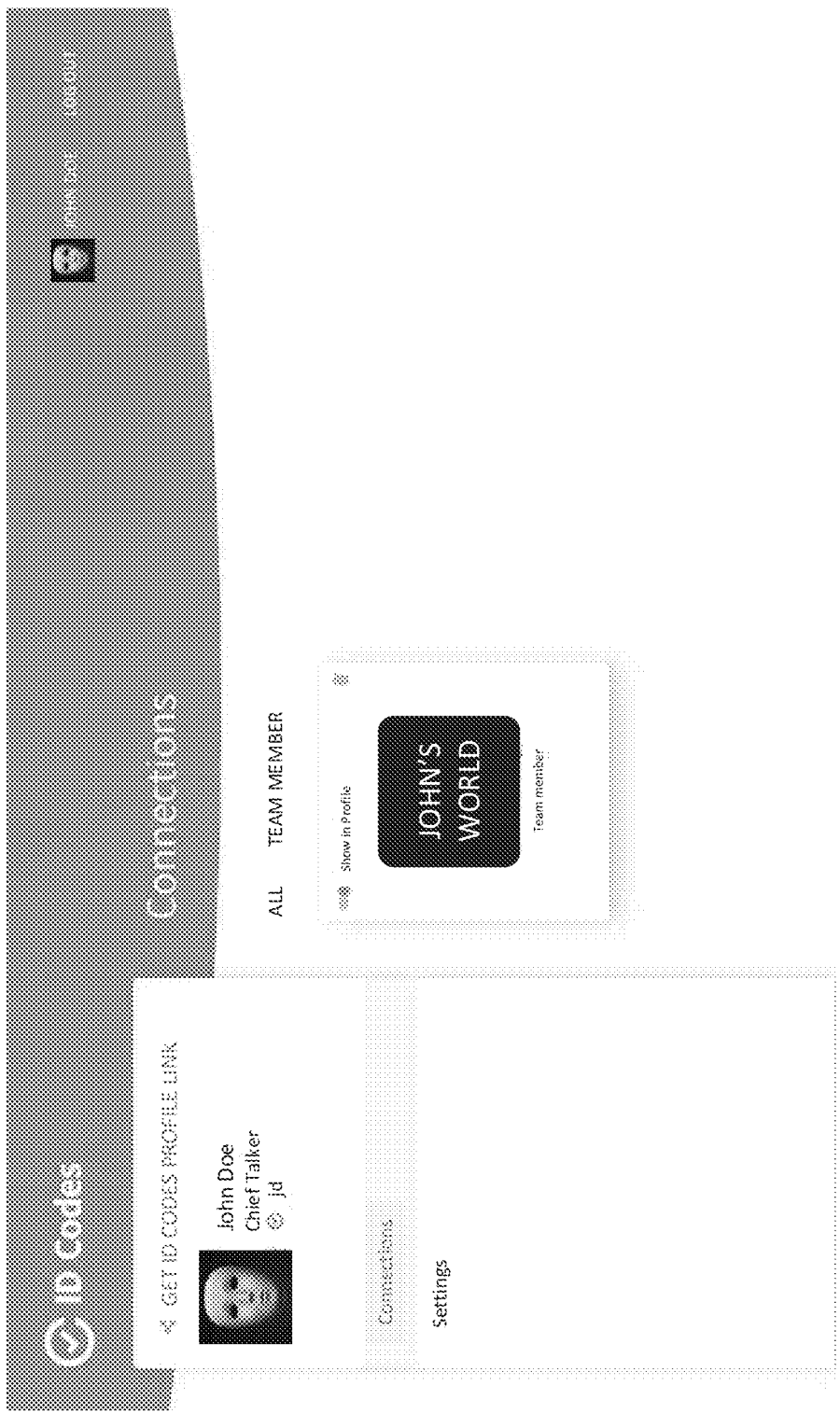
FIG. 24 illustrates an interface showing a user's personal connections in an identity verification platform, according to some implementations.

FIG. 24 is an illustration of an example of a graphical user interface displaying a dashboard for a user of identity verification platform 2000. In some embodiments, a user's dashboard displays the user's name, role of job title, and user's handle. The user may view their connections via the user dashboard. In some examples, the user may get, send, or share a link to their information verification platform 2000 profile.

Figure 25:
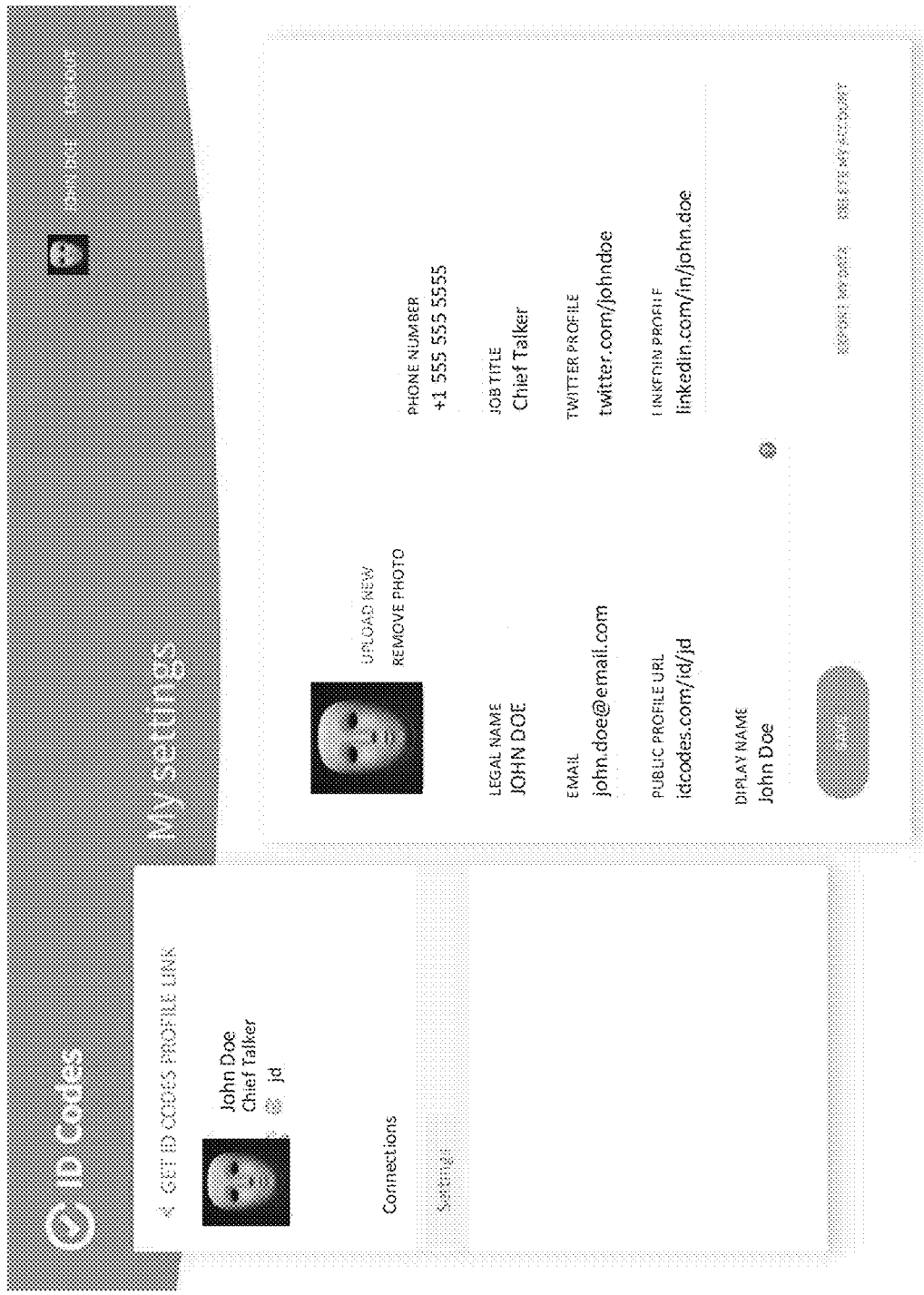
FIG. 25 illustrates an interface for user settings in an identity verification platform, according to some implementations.

FIG. 25 is an illustration of an example of a graphical user interface displaying a dashboard for a user of identity verification platform 2000, showing settings of the user. In some embodiments, a user may change their photo or remove their photo. In some embodiments, the user may export their data. In some examples, the user may delete their account. If a user deletes their account, all connections between that user and any other user will be automatically removed, and any badges inserted on websites of company/organizations 2020 will no longer render.

Figure 26:
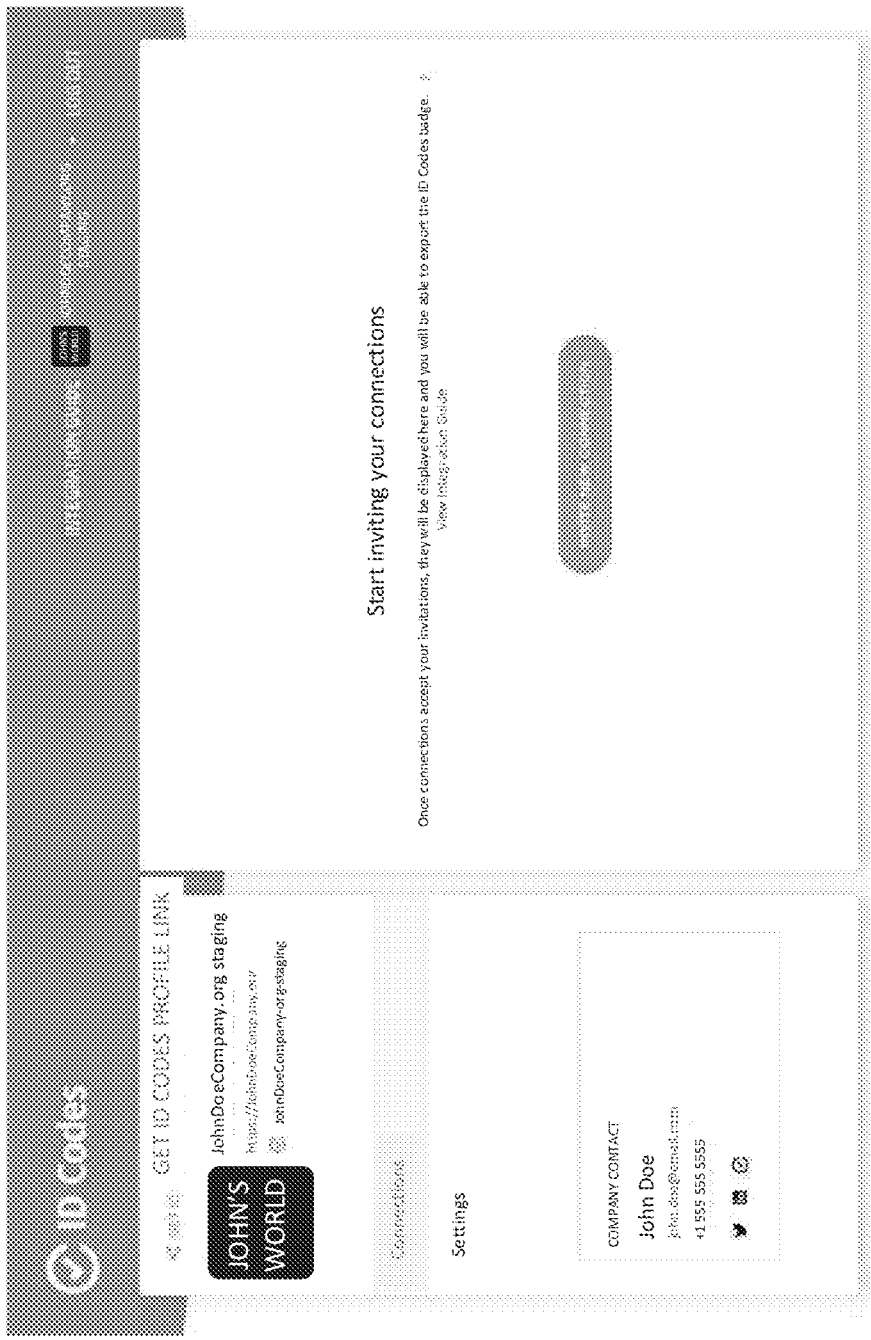
FIG. 26 illustrates an entity dashboard in an identity verification platform that is operable to enable a user to invite new connections to the entity, according to some implementations.

FIG. 26 is an illustration of an example of a graphical user interface displaying a dashboard for a company/organization 2020 of identity verification platform 2000, showing an invitation page where the user 1002 for company/organization 2020 may invite new connections. User 1002 that had their relationship with company/organization 2020 verified by identity verification platform 200 may be highlighted on the dashboard, for example identifying user 1002 as a company contact and giving their name, email address, phone number, links to their social media accounts, and links to their badge with the identity verification platform 2000. In some embodiments, the logo of company/organization 2020 is displayed on the page, along with the verified domain of company/organization, and the ID codes badge for company/organization.

FIG. 27 is an illustration of an example of a graphical user interface displaying a dashboard for a company/organization 2020 of identity verification platform 2000, showing connections for company/organization 2020. In some embodiments, company/organization 2020 may display names and/or images of employees or people that have an association with company/organization 2020 on one or more domains associated with company/organization 2020. In some examples, company/organization 2020 displays names and/or images of individuals in leadership positions with company/organization 2020. In some examples, company/organization 2020 displays names and/or images of individuals in advisory roles with company/organization 2020.

Figure 28:
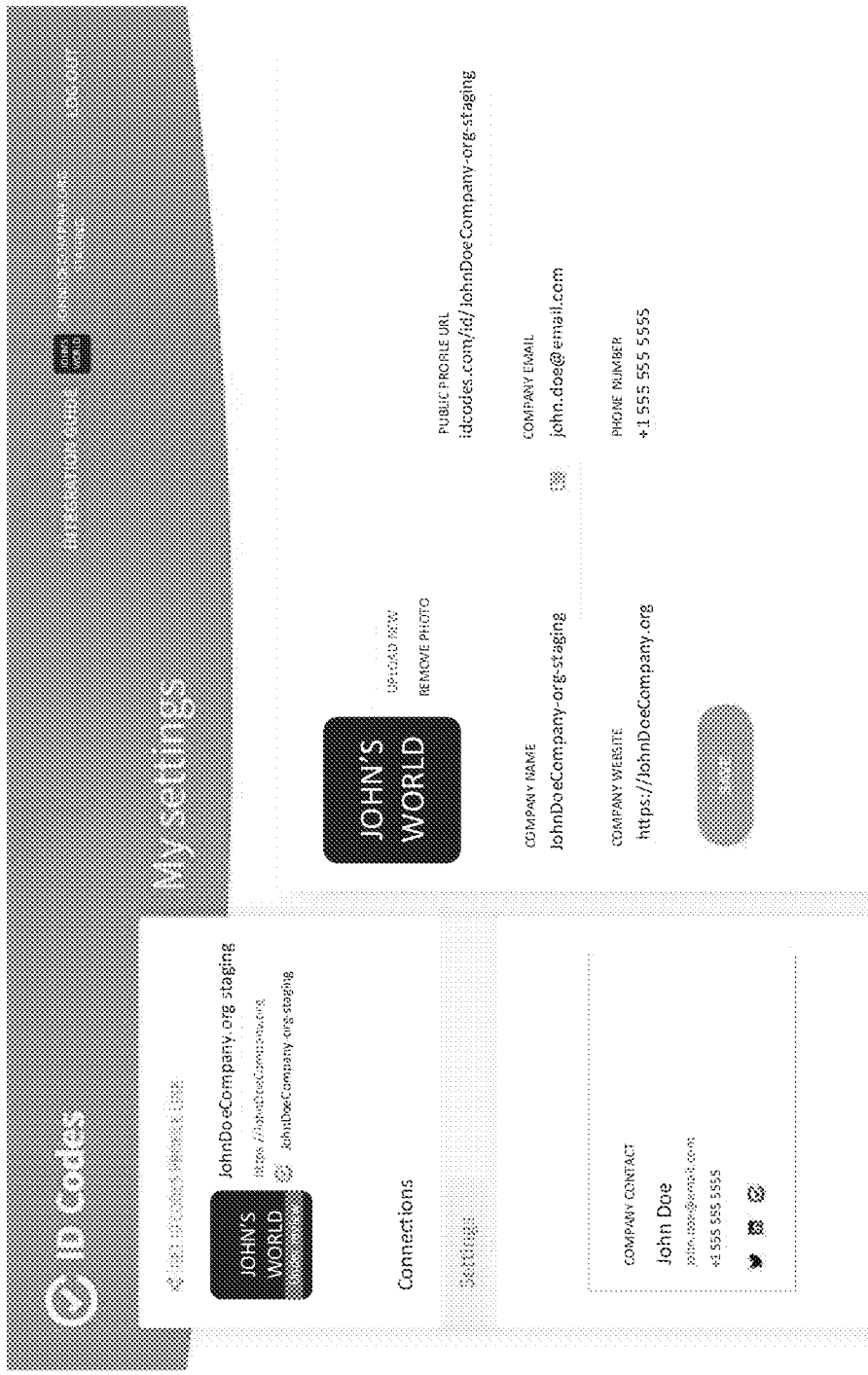
FIG. 28 illustrates an entity dashboard in an identification verification platform illustrating settings of an entity, according to some implementations.

FIG. 28 is an illustration of an example of a graphical user interface displaying a dashboard for a company/organization 2020 of identity verification platform 2000, showing settings for company/organization 2020. In some embodiments, a company representative user 1002 may change the company photo or remove the company photo. In some embodiments, if the company is still under review by the identity verification platform 2000, and indication of this will be displayed with the information for the company/organization 2020.

Figure 30:
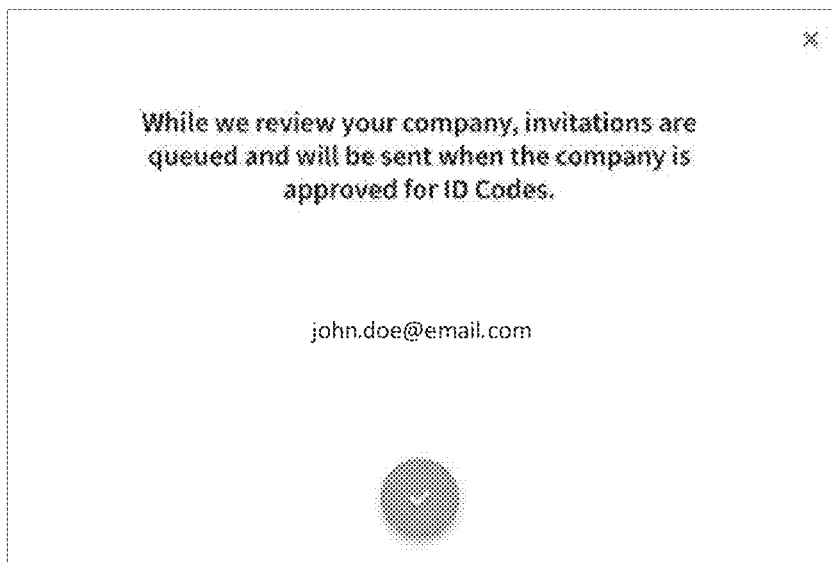
FIG. 30 illustrates an indication displayed to a user on an entity dashboard indicated that invitations are queued until the entity is verified, according to some implementations.
Figure 31:
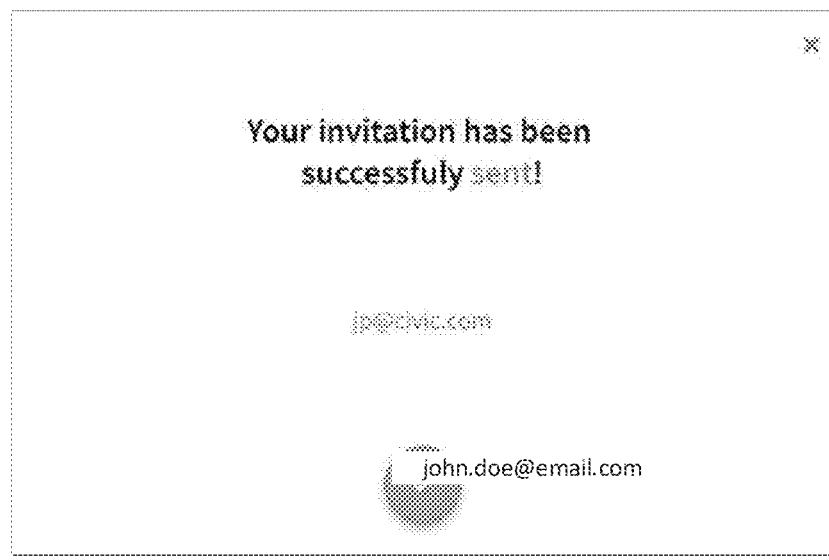
FIG. 31 illustrates an indication displayed to a user on an entity dashboard when an invitation is sent, according to some implementations.

FIG. 30 illustrates an indication displayed to a user 1002 on a dashboard for company/organization 2020 indicating that invitations are queued until company/organization 2020 is verified. FIG. 31 illustrates an indication displayed to a user on an entity dashboard when an invitation is sent, highlighting the email address to which the invitation was sent.

Figure 32:
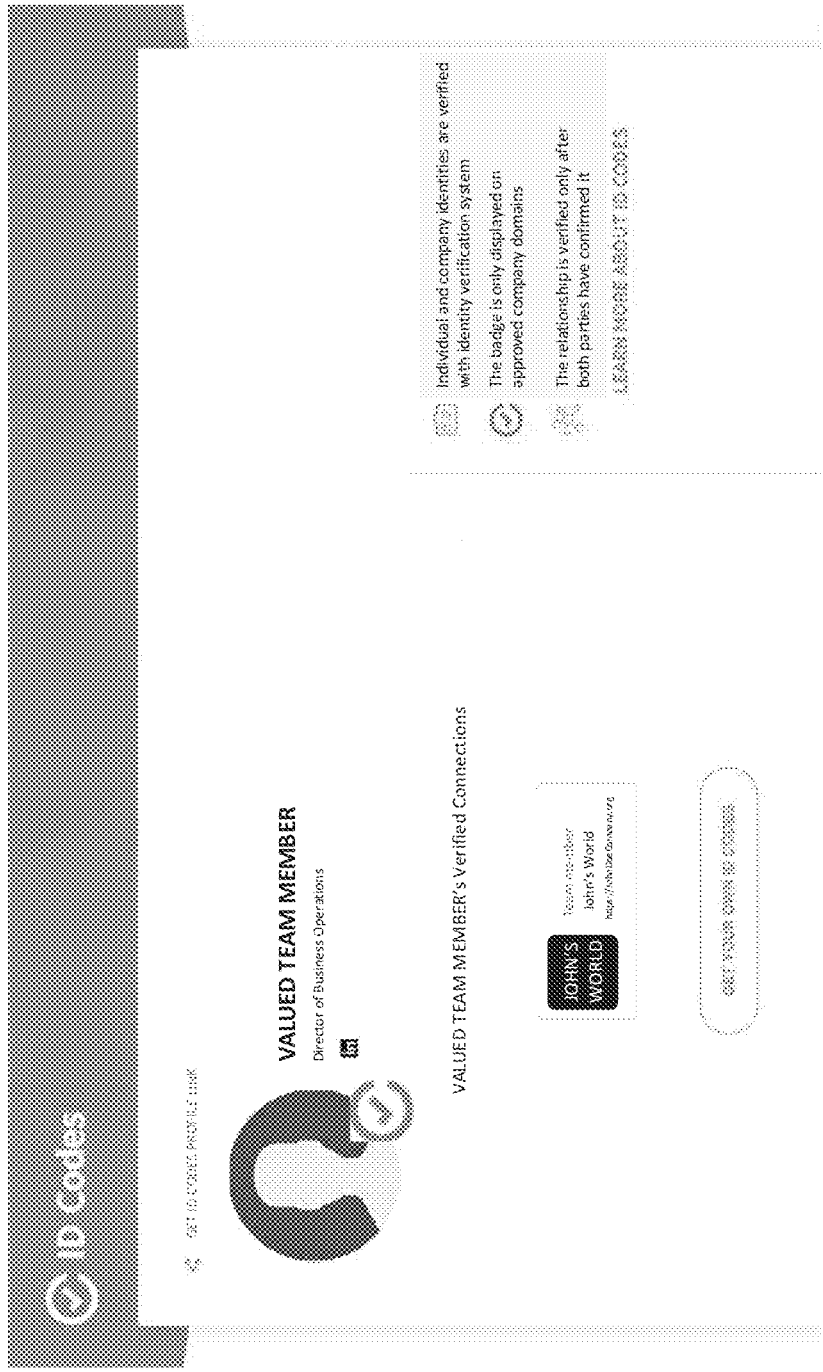
FIG. 32 illustrates a public profile for an individual in an identity verification platform, according to some implementations.
Figure 33:
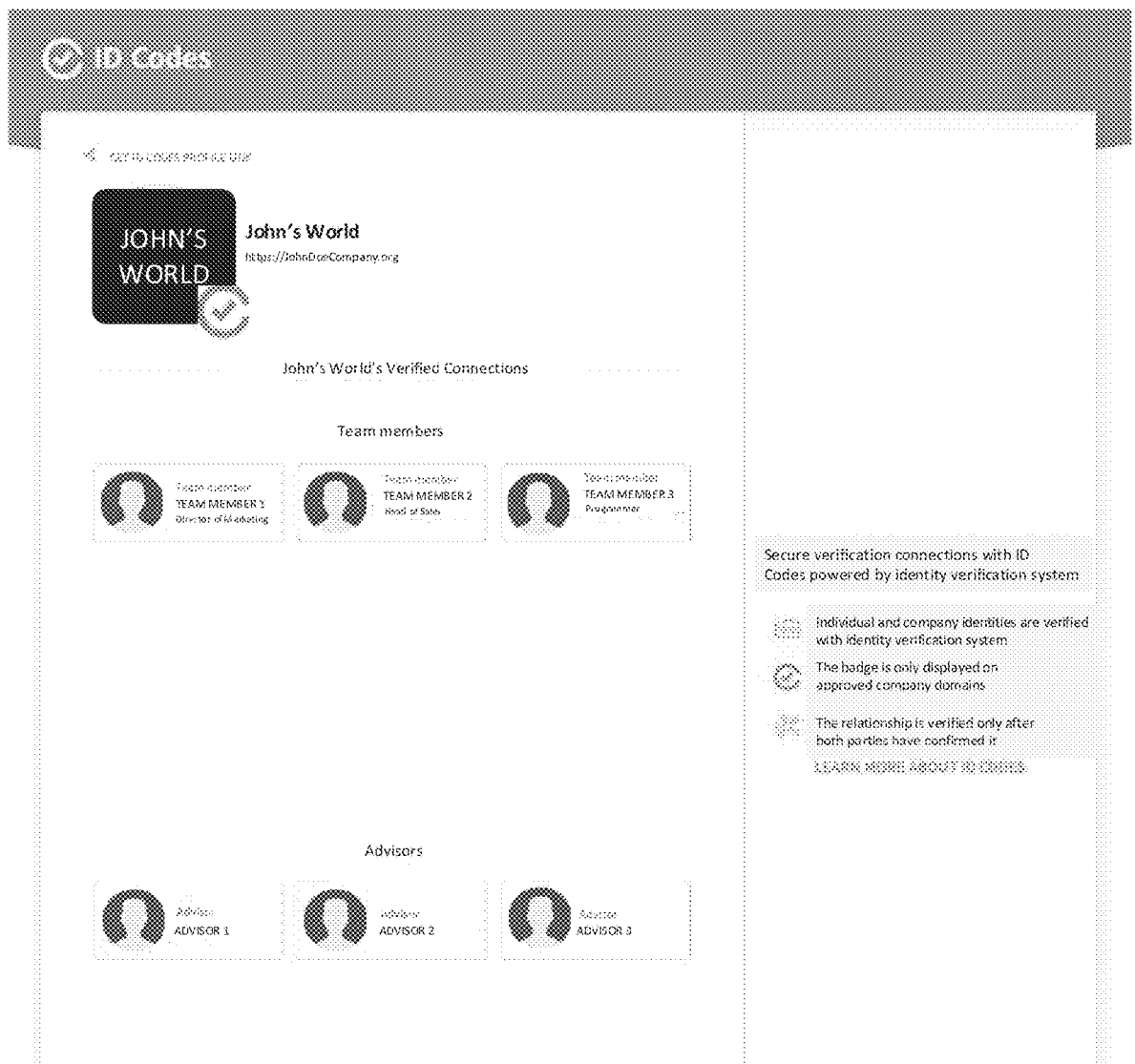
FIG. 33 illustrates a public profile for an entity in an identity verification platform, according to some implementations.

FIG. 32 illustrates a public profile for connection 2025 in an identity verification platform 2000, indicating the role of the connection 2025 and the verified associations of the connection 2025. FIG. 33 illustrates a public profile for company/organization 2020 in an identity verification platform 2000 and shows the connection 2025 of the company/organization 2020 and their relationships with company/organization 2020.

Figure 34:
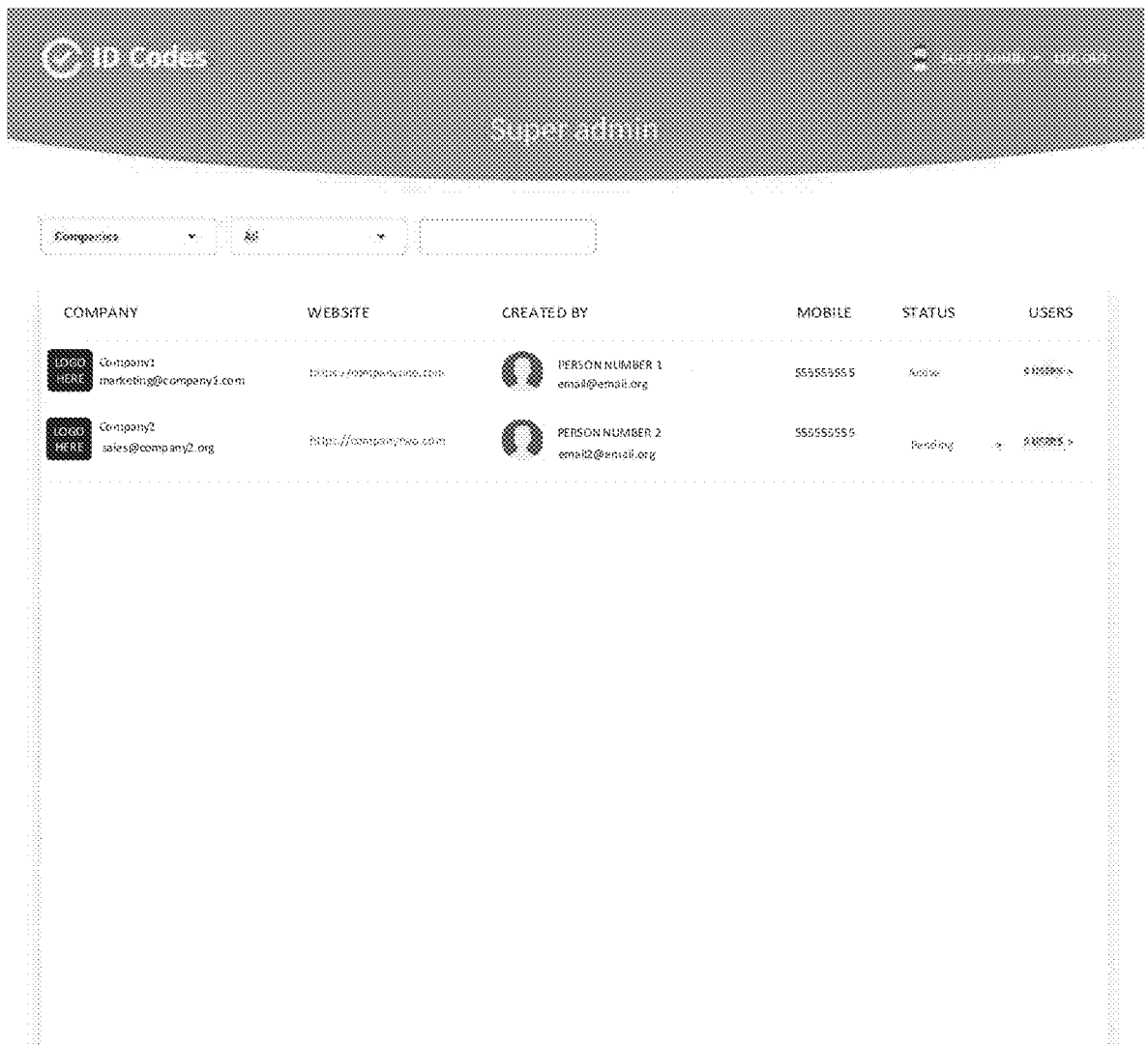
FIG. 34 illustrates an administrative portal for an identity verification platform, according to some implementations.

FIG. 34 illustrates an administrative portal for an identity verification platform 2000, which allows and administrator of the identity management platform 2000 to view all users of the platform.

Accordingly, in one aspect, the present disclosure is directed to a method of establishing a chain of relationships. The method includes receiving, by an identity verification platform from a device of a first user, a first request for registration comprising an identification of the first user, identification of an entity, and a relationship between the first user and the entity. The method also includes verifying, by the identity verification platform responsive to receipt of the first request, the identity of the first user and the relationship between the first user and the entity. The method also includes verifying, by the identity verification platform, that the entity is legitimate. The method also includes receiving, by the identity verification platform from the first user, a first invitation for a relationship between a first individual and the entity. The method also includes transmitting to a device of the first individual, by the identity verification platform responsive to receiving the invitation for the relationship from the device of the first user, a second request for approval of the relationship between the first individual and the entity. The method also includes receiving, by the identity verification platform from the device of the first individual, approval of the relationship between the first individual and the entity. The method also includes transmitting, by the identity verification platform to the device of the first user, confirmation of the relationship between the first individual and the entity. The method also includes creating, by the identity verification platform, a custom badge for display on the entity's website, the custom badge representing the relationship between the first individual and the entity and valid for one or more domains associated with the verified entity. The method also includes receiving, by the identity verification platform, an identification of a selection by an end user of the custom badge. The method also includes, responsive to receiving the identification of the selection, rendering, by the identity verification platform, on a domain controlled by the identity verification platform, a verification that the relationship between the first individual and the entity is valid.

In some implementations, the method includes verifying the identity of the first user and the relationship between the first user and the entity by verifying the existence of a record in a centralized or distributed ledger at an address corresponding to the entity. In some implementations, the method includes generating a transaction for recordation in a centralized or distributed ledger at an address based on the entity and the first individual, the presence of the first transaction in the centralized or distributed ledger indicating that the relationship between the first individual and the entity is legitimate. In a further implementation, the method includes generating the transaction by adding a non-zero value to a record in the centralized or distributed ledger at the address based on the entity and the first individual.

In some implementations, the method includes verifying the relationship between the first user and the entity by receiving a confirmation of the relationship between the first user and the entity via a communication channel separate from a communication channel via which the first request was received. In some implementations, the method includes rendering the verification that the relationship between the first individual and the entity is valid responsive to determining that validity of the relationship has not been revoked. In a further implementation, the method includes determining that validity of the relationship has not been revoked responsive to identifying a record in a centralized or distributed ledger at an address based on the entity and the first individual having a non-zero value.

In another aspect, the present disclosure is directed to a system for establishing a chain of relationships. The system includes a device, in communication with a device of a first user and a device of a first individual, comprising a network interface and a processor executing an identity verification platform. The network interface is configured to receive, from the device of the first user, a first request for registration comprising an identification of the first user, identification of an entity, and a relationship between the first user and the entity. The identity verification platform is configured to: verify, responsive to receipt of the first request, the identity of the first user and the relationship between the first user and the entity and verify that the entity is legitimate. The network interface is further configured to: receive, from the device of the first user, a first invitation for a relationship between the first individual and the entity; transmit to the device of the first individual, responsive to receiving the invitation for the relationship from the device of the first user, a second request for approval of the relationship between the first individual and the entity; receive, from the device of the first individual, approval of the relationship between the first individual and the entity; and transmit, to the device of the first user, confirmation of the relationship between the first individual and the entity. The identity verification platform is further configured to create a custom badge for display on the entity's website, the custom badge representing the relationship between the first individual and the entity and valid for one or more domains associated with the verified entity; and responsive to receiving an identification of a selection by an end user of the custom badge, the event, render, on a domain controlled by the identity verification platform, a verification that the relationship between the first individual and the entity is valid.

In some implementations, the identity verification platform is further configured to verify the identity of the first user and the relationship between the first user and the entity responsive to the existence of a record in a centralized or distributed ledger at an address corresponding to the entity. In some implementations, the identity verification platform is further configured to generate a transaction for recordation in a centralized or distributed ledger at an address based on the entity and the first individual, the presence of the first transaction in the centralized or distributed ledger indicating that the relationship between the first individual and the entity is legitimate. In a further implementation, the identity verification platform is further configured to add a non-zero value to a record in the centralized or distributed ledger at the address based on the entity and the first individual. In some implementations, the identity verification platform is further configured to receive a confirmation of the relationship between the first user and the entity via a communication channel separate from a communication channel via which the first request was received. In some implementations, the identity verification platform is further configured to render the verification that the relationship between the first individual and the entity is valid responsive to determining that validity of the relationship has not been revoked. In a further implementation, the identity verification platform is further configured to determine that validity of the relationship has not been revoked responsive to identifying a record in a centralized or distributed ledger at an address based on the entity and the first individual having a non-zero value.

In another aspect, the present application is directed to a method for verification of a chain of trust via a distributed or centralized ledger. The method includes receiving a request, by a validation system from a first device, for a validation badge, the request identifying a user and an entity. The method also includes retrieving, by the validation system, a record in a centralized or distributed ledger at an address corresponding to the user and entity. The method also includes determining, by the validation system, that a relationship between the user and the entity is existent based on the retrieved record in the centralized or distributed ledger. The method also includes transmitting, by the validation system to the first device, the requested validation badge, responsive to the determination that the relationship is existent, an application of the first device rendering the validation badge for display.

In some implementations, the method includes retrieving a parent record at an address corresponding to the entity; identifying, in the parent record, a second address corresponding to the user and the entity; and retrieving the record in the centralized or distributed ledger at the second address.

In some implementations, the method includes determining that the relationship between the user and the entity is existent responsive to identifying the presence of a non-zero value stored with the retrieved record in the centralized or distributed ledger.

In some implementations, the validation badge comprises executable code that, upon interaction with the validation badge, causes the application of the first device to transmit a second request for information about the relationship between the user and the entity from the validation system. In a further implementation, the method includes receiving the second request, by the validation system from the first device, the second request comprising an identification of a domain; determining, by the validation system, that the domain is associated with the entity; and transmitting a response to the second request comprising the information about the relationship between the user and the entity, by the validation system to the first device, responsive to the determination that the domain is associated with the entity. In a still further implementation, the method includes receiving the second request, by the validation system from the first device, the second request comprising an identification of a domain; determining, by the validation system, that the domain is not associated with the entity; and transmitting a response to the second request comprising an indication that the validation badge is invalid, by the validation system to the first device, responsive to the determination that the domain is not associated with the entity.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method of establishing a chain of relationships, comprising:

receiving, by an identity verification platform from a device of a first user, a first request for registration comprising an identification of the first user, identification of an entity, and a relationship between the first user and the entity;

verifying, by the identity verification platform responsive to receipt of the first request, the identity of the first user and the relationship between the first user and the entity by verifying the existence of a record comprising an identification of the first user in a centralized or distributed ledger at an address corresponding to the entity;

verifying, by the identity verification platform, that the entity is legitimate;

receiving, by the identity verification platform from the first user, a first invitation for a relationship between a first individual and the entity;

transmitting to a device of the first individual, by the identity verification platform responsive to receiving the invitation for the relationship from the device of the first user, a second request for approval of the relationship between the first individual and the entity;

receiving, by the identity verification platform from the device of the first individual, approval of the relationship between the first individual and the entity;

transmitting, by the identity verification platform to the device of the first user, confirmation of the relationship between the first individual and the entity;

creating, by the identity verification platform, a custom badge for display on the entity's website, the custom badge representing the relationship between the first individual and the entity and valid for one or more domains associated with the verified entity;

receiving, by the identity verification platform, an identification of a selection by an end user of the custom badge;

responsive to receiving the identification of the selection, rendering, by the identity verification platform, on a domain controlled by the identity verification platform, a verification that the relationship between the first individual and the entity is valid.

2. The method of claim 1, further comprising generating a transaction for recordation in a centralized or distributed ledger at an address based on the entity and the first individual, the presence of the transaction in the centralized or distributed ledger indicating that the relationship between the first individual and the entity is legitimate.

3. The method of claim 2, wherein generating the transaction comprises adding a non-zero value to a record in the centralized or distributed ledger at the address based on the entity and the first individual.

4. The method of claim 1, wherein verifying the relationship between the first user and the entity further comprises receiving a confirmation of the relationship between the first user and the entity via a communication channel separate from a communication channel via which the first request was received.

5. The method of claim 1, wherein rendering the verification that the relationship between the first individual and the entity is valid further comprises determining that validity of the relationship has not been revoked.

6. The method of claim 5, wherein determining that validity of the relationship has not been revoked further comprises identifying a record in a centralized or distributed ledger at an address based on the entity and the first individual having a non-zero value.

7. The method of claim 1, wherein verifying the existence of the record in the centralized or distributed ledger further comprises identifying a value associated with the record in the centralized or distributed ledger, and wherein verifying the identity of the first user and the relationship between the first user and the entity is performed responsive to determining that the value is non-zero.

8. The method of claim 1, wherein verifying the existence of the record in the centralized or distributed ledger further comprises deriving an address in the centralized or distributed ledger for retrieving the record from the identification of the first user.

9. The method of claim 1, wherein rendering the verification that the relationship between the first individual and the entity is valid further comprises determining, by the identity verification platform, that the custom badge is displayed via embedded code on a web page corresponding to a domain of the one or more domains associated with the verified entity.

10. The method of claim 1, wherein verifying that the entity is legitimate further comprises performing a certificate exchange with a trusted authority that identifies the entity as legitimate.

11. A system for establishing a chain of relationships, comprising:

a device, in communication with a device of a first user and a device of a first individual, comprising a network interface and a processor executing an identity verification platform;

wherein the network interface is configured to receive, from the device of the first user, a first request for registration comprising an identification of the first user, identification of an entity, and a relationship between the first user and the entity;

wherein the identity verification platform is configured to:
verify, responsive to receipt of the first request, the identity of the first user and the relationship between the first user and the entity by verifying the existence of a record comprising an identification of the first user in a centralized or distributed ledger at an address corresponding to the entity, and
verify that the entity is legitimate;

wherein the network interface is further configured to:
receive, from the device of the first user, a first invitation for a relationship between the first individual and the entity,
transmit to the device of the first individual, responsive to receiving the invitation for the relationship from the device of the first user, a second request for approval of the relationship between the first individual and the entity,
receive, from the device of the first individual, approval of the relationship between the first individual and the entity, and
transmit, to the device of the first user, confirmation of the relationship between the first individual and the entity; and wherein the identity verification platform is further configured to:
create a custom badge for display on the entity's website, the custom badge representing the relationship between the first individual and the entity and valid for one or more domains associated with the verified entity, and
responsive to receiving an identification of a selection by an end user of the custom badge, render, on a domain controlled by the identity verification platform, a verification that the relationship between the first individual and the entity is valid.

12. The system of claim 11, wherein the identity verification platform is further configured to generate a transaction for recordation in a centralized or distributed ledger at an address based on the entity and the first individual, the presence of the first transaction in the centralized or distributed ledger indicating that the relationship between the first individual and the entity is legitimate.

13. The system of claim 12, wherein the identity verification platform is further configured to add a non-zero value to a record in the centralized or distributed ledger at the address based on the entity and the first individual.

14. The system of claim 11, wherein the identity verification platform is further configured to receive a confirmation of the relationship between the first user and the entity via a communication channel separate from a communication channel via which the first request was received.

15. The system of claim 11, wherein the identity verification platform is further configured to render the verification that the relationship between the first individual and the entity is valid responsive to determining that validity of the relationship has not been revoked.

16. The system of claim 15, wherein the identity verification platform is further configured to determine that validity of the relationship has not been revoked responsive to identifying a record in a centralized or distributed ledger at an address based on the entity and the first individual having a non-zero value.

17. The system of claim 11, wherein the identity verification platform is further configured to identify a value associated with the record in the centralized or distributed ledger, and wherein verifying the identity of the first user and the relationship between the first user and the entity is performed responsive to determining that the value is non-zero.

18. The system of claim 11, wherein the identity verification platform is further configured to derive an address in the centralized or distributed ledger for retrieving the record from the identification of the first user.

19. The system of claim 11, wherein the identity verification platform is further configured to render the verification that the relationship between the first individual and the entity is valid responsive to determining that the custom badge is displayed via embedded code on a web page corresponding to a domain of the one or more domains associated with the verified entity.

20. The system of claim 11, wherein the identity verification platform is further configured to perform a certificate exchange with a trusted authority that identifies the entity as legitimate.

* * * * *